(12) United States Patent
Xi et al.

(10) Patent No.: US 9,143,213 B2
(45) Date of Patent: *Sep. 22, 2015

(54) METHOD AND APPARATUS FOR MULTI-ANTENNA TRANSMISSION IN UPLINK

(71) Applicant: InterDigital Patent Holdings, Inc., Wilmington, DE (US)

(72) Inventors: Fengjun Xi, Huntington Station, NY (US); Lujing Cai, Morganville, NJ (US); Hong Zhang, Manalapan, NJ (US); Benoit Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,615

(22) Filed: Feb. 4, 2014

(65) Prior Publication Data

US 2014/0153668 A1    Jun. 5, 2014

Related U.S. Application Data

(63) Continuation of application No. 13/718,177, filed on Dec. 18, 2012, now Pat. No. 8,665,990, which is a continuation of application No. 12/894,556, filed on Sep. 30, 2010, now Pat. No. 8,355,424.

(Continued)

(51) Int. Cl.
*H04B 1/38* (2015.01)
*H04B 7/06* (2006.01)
(Continued)

(52) U.S. Cl.
CPC ............. *H04B 7/06* (2013.01); *H04B 7/0404* (2013.01); *H04B 7/0456* (2013.01);

(Continued)

(58) Field of Classification Search
None
See application file for complete search history.

(56) References Cited

U.S. PATENT DOCUMENTS

| | | |
|---|---|---|
| 6,577,273 B2 | 6/2003 | Hamada et al. |
| 7,324,828 B2 | 1/2008 | Nagaoka et al. |

(Continued)

FOREIGN PATENT DOCUMENTS

| | | |
|---|---|---|
| EP | 1 478 105 | 11/2004 |
| GB | 2 457 260 | 8/2009 |

(Continued)

OTHER PUBLICATIONS

Alamouti, "A Simple Transmit Diversity Technique for Wireless Communications," IEEE Journal on Selected Areas in Communications, vol. 16, No. 8 (Oct. 1998).

(Continued)

*Primary Examiner* — Adolf Dsouza
(74) *Attorney, Agent, or Firm* — Volpe and Koenig, P.C.

(57) ABSTRACT

Method and apparatus for uplink transmission using multiple antennas are disclosed. A wireless transmit/receive unit (WTRU) performs space time transmit diversity (STTD) encoding on an input stream of a physical channel configured for STTD. Each physical channel may be mapped to either an in-phase (I) branch or a quadrature-phase (Q) branch. The WTRU may perform the STTD encoding either in a binary domain or in a complex domain. Additionally, the WTRU may perform pre-coding on at least one physical channel including the E-DPDCH with the pre-coding weights, and transmitting the pre-coded output streams via a plurality of antennas. The pre-coding may be performed either after or before spreading operation.

6 Claims, 39 Drawing Sheets

Related U.S. Application Data

(60) Provisional application No. 61/247,123, filed on Sep. 30, 2009, provisional application No. 61/248,313, filed on Oct. 2, 2009, provisional application No. 61/356,320, filed on Jun. 18, 2010.

(51) Int. Cl.
    *H04L 1/06*         (2006.01)
    *H04L 27/36*       (2006.01)
    *H04B 7/04*        (2006.01)

(52) U.S. Cl.
    CPC ........... *H04B 7/0617* (2013.01); *H04B 7/0623* (2013.01); *H04B 7/0669* (2013.01); *H04L 1/0625* (2013.01); *H04L 1/0668* (2013.01); *H04L 27/362* (2013.01)

(56) References Cited

U.S. PATENT DOCUMENTS

| | | |
|---|---|---|
| 2003/0220122 A1 | 11/2003 | Lim et al. |
| 2004/0131007 A1 | 7/2004 | Smee et al. |
| 2005/0068918 A1 | 3/2005 | Mantravadi et al. |
| 2006/0056278 A1 | 3/2006 | Le Bars |
| 2006/0072682 A1 | 4/2006 | Kent et al. |
| 2008/0043867 A1* | 2/2008 | Blanz et al. ............... 375/260 |
| 2008/0165969 A1 | 7/2008 | Khandekar et al. |
| 2009/0201794 A1 | 8/2009 | Luo et al. |
| 2010/0238829 A1* | 9/2010 | Sambhwani et al. ......... 370/252 |
| 2014/0086057 A1* | 3/2014 | Sgfors et al. ................. 370/235 |

FOREIGN PATENT DOCUMENTS

| | | |
|---|---|---|
| WO | 2007/049208 | 5/2007 |
| WO | 2007/149722 | 12/2007 |
| WO | 2009/055804 | 4/2009 |

OTHER PUBLICATIONS

Tarokh et al., "Space-Time Block Codes from Orthogonal Designs," IEEE Transactions on Information Theory, vol. 45, No. 5 (Jul. 1999).

Third Generation Partnership Project, "3rd Generation Partnership Project; Technical Specification Group Radio Access Network; Multiplexing and channel coding (FDD) (Release 1999)," 3GPP TS 25.212 V3.11.0 (Sep. 2002).

Third Generation Partnership Project, "3rd Generation Partnership Project; Technical Specification Group Radio Access Network; Multiplexing and channel coding (FDD) (Release 4)," 3GPP TS 25.212 V4.6.0 (Sep. 2002).

Third Generation Partnership Project, "3rd Generation Partnership Project; Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Medium Access Control (MAC) Protocol Specification (Release 7)," 3GPP TS 25.321 v7.14.0, Sep. 2009.

Third Generation Partnership Project, "Technical Specification Group Radio Access Network; Medium Access Control (MAC) Protocol Specification (Release 7)," 3GPP TS 25.321 v7.17.0, Jun. 2010.

Third Generation Partnership Project, "Technical Specification Group Radio Access Network; Medium Access Control (MAC) Protocol Specification (Release 8)," 3GPP TS 25.321 v8.7.0, Sep. 2009.

Third Generation Partnership Project, "Technical Specification Group Radio Access Network; Medium Access Control (MAC) Protocol Specification (Release 8)," 3GPP TS 25.321 v8.10.0, Jun. 2010.

Third Generation Partnership Project, "Technical Specification Group Radio Access Network; Medium Access Control (MAC) Protocol Specification (Release 9)," 3GPP TS 25.321 v9.0.0, Sep. 2009.

Third Generation Partnership Project, "Technical Specification Group Radio Access Network; Medium Access Control (MAC) Protocol Specification (Release 9)," 3GPP TS 25.321 v9.3.0, Jun. 2010.

Third Generation Partnership Project, "Technical Specification Group Radio Access Network; Multiplexing and Channel Coding (FDD) (Release 7)," 3GPP TS 25.212 v7.11.0, Sep. 2009.

Third Generation Partnership Project, "Technical Specification Group Radio Access Network; Multiplexing and Channel Coding (FDD) (Release 8)," 3GPP TS 25.212 v8.6.0, Sep. 2009.

Third Generation Partnership Project, "Technical Specification Group Radio Access Network; Multiplexing and Channel Coding (FDD) (Release 9)," 3GPP TS 25.212 v9.0.0, Sep. 2009.

Third Generation Partnership Project, "Technical Specification Group Radio Access Network; Multiplexing and Channel Coding (FDD) (Release 9)," 3GPP TS 25.212 v9.2.0, Mar. 2010.

Third Generation Partnership Project, "Technical Specification Group Radio Access Network; Physical Channels and Mapping of Transport Channels onto Physical Channels (FDD) (Release 6)," 3GPP TS 25.211 v6.10.0, Sep. 2009.

Third Generation Partnership Project, "Technical Specification Group Radio Access Network; Physical Channels and Mapping of Transport Channels onto Physical Channels (FDD) (Release 7)," 3GPP TS 25.211 v7.8.0, Sep. 2009.

Third Generation Partnership Project, "Technical Specification Group Radio Access Network; Physical Channels and Mapping of Transport Channels onto Physical Channels (FDD) (Release 7)," 3GPP TS 25.211 v7.9.0, Dec. 2009.

Third Generation Partnership Project, "Technical Specification Group Radio Access Network; Physical Channels and Mapping of Transport Channels onto Physical Channels (FDD) (Release 8)," 3GPP TS 25.211 v8.5.0, Sep. 2009.

Third Generation Partnership Project, "Technical Specification Group Radio Access Network; Physical Channels and Mapping of Transport Channels onto Physical Channels (FDD) (Release 8)," 3GPP TS 25.211 v8.6.0, Dec. 2009.

Third Generation Partnership Project, "Technical Specification Group Radio Access Network; Physical Channels and Mapping of Transport Channels onto Physical Channels (FDD) (Release 9)," 3GPP TS 25.211 v9.0.0, Sep. 2009.

Third Generation Partnership Project, "Technical Specification Group Radio Access Network; Physical Channels and Mapping of Transport Channels onto Physical Channels (FDD) (Release 9)," 3GPP TS 25.211 v9.1.0. Dec. 2009.

Third Generation Partnership Project, "Technical Specification Group Radio Access Network; Physical Layer Procedures (FDD) (Release 8)," 3GPP TS 25.214 v8.7.0, Sep. 2009.

Third Generation Partnership Project, "Technical Specification Group Radio Access Network; Physical Layer Procedures (FDD) (Release 8)," 3GPP TS 25.214 v8.9.0, Mar. 2010.

Third Generation Partnership Project, "Technical Specification Group Radio Access Network; Physical Layer Procedures (FDD) (Release 9)," 3GPP TS 25.214 v9.0.0, Sep. 2009.

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).

Third Generation Partnership Project, "Technical Specification Group Radio Access Network; Multiplexing and channel coding (FDD) (Release 6)," 3GPP TS 25.212 V6.10.0 (Dec. 2006).

Third Generation Partnership Project, "Technical Specification Group Radio Access Network; Multiplexing and channel coding (FDD) (Release 5)," 3GPP TS 25.212 V5.10.0 (Jun. 2005).

Third Generation Partnership Project, "Technical Specification Group Radio Access Network; Spreading and modulation (FDD) (Release 1999)," 3GPP TS 25.213 V3.9.0 (Dec. 2003).

Third Generation Partnership Project, "Technical Specification Group Radio Access Network; Spreading and modulation (FDD) (Release 4)," 3GPP TS 25.213 V4.4.0 (Dec. 2003).

(56) References Cited

OTHER PUBLICATIONS

Third Generation Partnership Project, "Technical Specification Group Radio Access Network; Spreading and modulation (FDD) (Release 5)," 3GPP TS 25.213 V5.6.0 (Jun. 2005).
Third Generation Partnership Project, "Technical Specification Group Radio Access Network; Spreading and modulation (FDD) (Release 6)," 3GPP TS 25.213 V6.5.0 (Mar. 2006).
Third Generation Partnership Project, "Technical Specification Group Radio Access Network; Spreading and modulation (FDD) (Release 7)," 3GPP TS 25.213 V7.6.0 (Sep. 2008).
Third Generation Partnership Project, "Technical Specification Group Radio Access Network; Spreading and modulation (FDD) (Release 8)," 3GPP TS 25.213 V8.5.0 (Dec. 2009).
Third Generation Partnership Project, "Technical Specification Group Radio Access Network; Spreading and modulation (FDD) (Release 7)," 3GPP TS 25.213 V7.7.0 (Dec. 2009).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.11.0 (Jun. 2005).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Physical layer procedures (FDD) (Release 7)," 3GPP TS 25.214 V7.15.0 (Mar. 2010).
Third Generation Partnership Project, "Technical Specification Group Radio Access Network; Physical layer procedures (FDD) (Release 9)," 3GPP TS 25.214 V9.2.0 (Mar. 2010).
Third Generation Partnership Project, "Technical Specification Group Radio Access Network; Medium Access Control (MAC) protocol specification (Release 1999)," 3GPP TS 25.321 V3.17.0 (Jun. 2004).
Third Generation Partnership Project, "Technical Specification Group Radio Access Network; Medium Access Control (MAC) protocol specification (Release 4)," 3GPP TS 25.321 V4.10.0 (Jun. 2004).
Third Generation Partnership Project, "Technical Specification Group Radio Access Network; Medium Access Control (MAC) protocol specification (Release 6)," 3GPP TS 25.321 V6.18.0 (Mar. 2009).
Third Generation Partnership Project, "Technical Specification Group Radio Access Network; Medium Access Control (MAC) protocol specification (Release 5)," 3GPP TS 25.321 V5.14.0 (Sep. 2008).
Third Generation Partnership Project, "Technical Specification Group Radio Access Network; Spreading and modulation (FDD) (Release 9)," 3GPP TS 25.213 V9.0.0 (Sep. 2009).
Third Generation Partnership Project, "Technical Specification Group Radio Access Network; Spreading and modulation (FDD) (Release 9)," 3GPP TS 25.213 V9.1.0 (Dec. 2009).
Third Generation Partnership Project, "Technical Specification Group Radio Access Network; Spreading and modulation (FDD) (Release 8)," 3GPP TS 25.213 V8.4.0 (Mar. 2009).
Third Generation Partnership Project, "Technical Specification Group Radio Access Network; Physical layer procedures (FDD) (Release 7)," 3GPP TS 25.214 V7.13.0 (Sep. 2009).
Third Generation Partnership Project, "Technical Specification Group Radio Access Network; Feasibility Study for Enhanced Uplink for UTRA FDD (Release 6)," 3GPP TR 25.896 V6.0.0 (Mar. 2004).
Zhong et al., "Full-Rate Orthogonal Space-Time Block Code with Pulse-Shaped Offset QAM for Four Transmit Antennas," IEEE Transactions on Wireless Communications, vol. 6, No. 4, pp. 1551-1559 (Apr. 2007).
Zummo et al., "Design of 16-QAM Space-Time Codes for Rapid Rayleigh Fading Channels," Proceedings of the $10^{th}$ Virginia Tech Symposium of Wireless Personal Communications, pp. 1-10 (Jun. 2000).
Zummo et al., "Space-time coded QPSK for rapid fading channels," The $11^{th}$ IEEE International Symposium on Personal, Indoor, and Mobile Radio Communications, vol. 1, pp. 504-508 (Sep. 2000).

\* cited by examiner

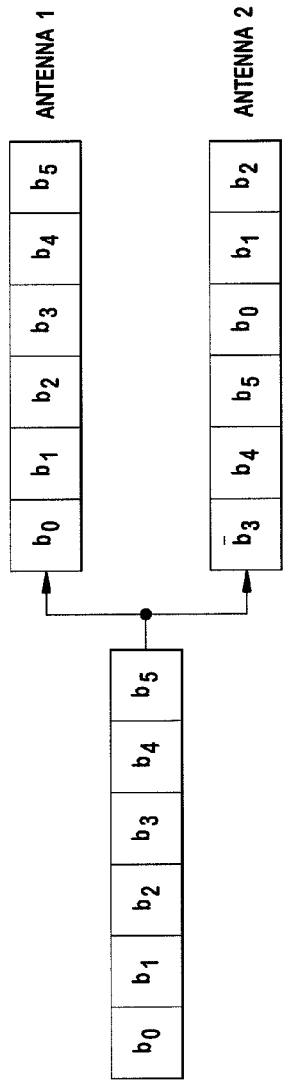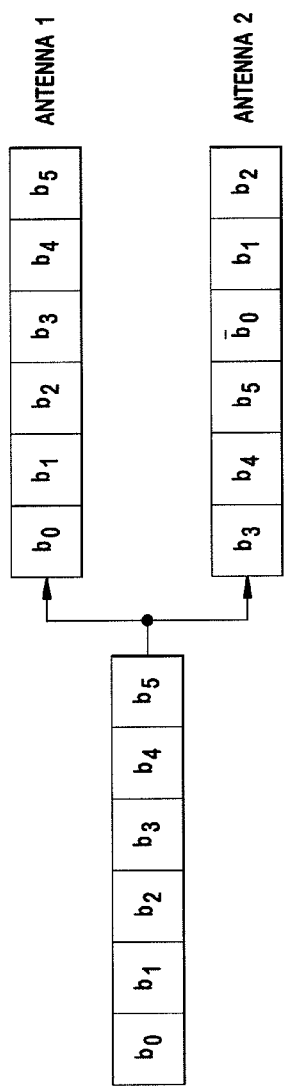

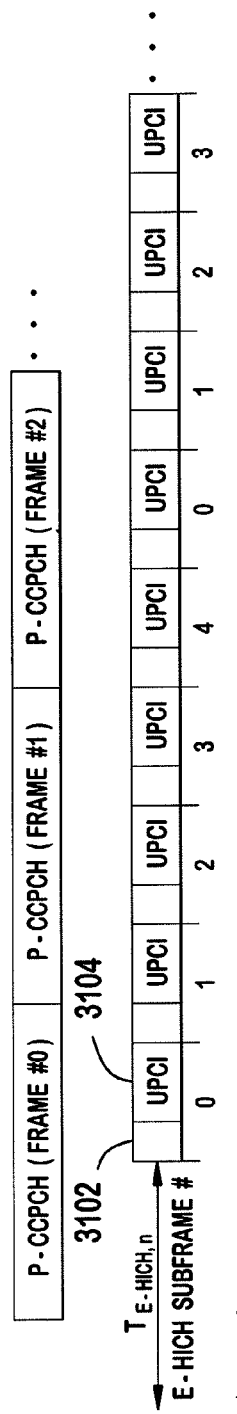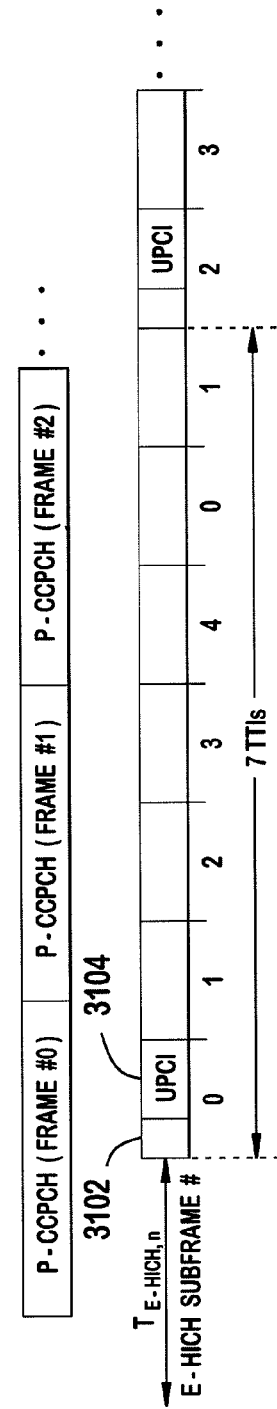
FIG. 31A
FIG. 31B

METHOD AND APPARATUS FOR MULTI-ANTENNA TRANSMISSION IN UPLINK

CROSS REFERENCE TO RELATED APPLICATIONS

This application is a continuation of U.S. patent application Ser. No. 13/718,177, filed Dec. 18, 2012, which is a continuation of U.S. patent application Ser. No. 12/894,556, filed Sep. 30, 2010, which issued as U.S. Pat. No. 8,355,424 on Jan. 15, 2013, which claims the benefit of U.S. Provisional Application Nos. 61/247,123 filed Sep. 30, 2009; 61/248,313 filed Oct. 2, 2009; and 61/356,320 filed Jun. 18, 2010, the contents of which are hereby incorporated by reference herein.

BACKGROUND

Techniques for using multiple antennas have been used in cellular wireless communication systems as an effective means to improve robustness of data transmission and achieve higher data throughput. One of the multiple antenna techniques is space-time block coding (STBC). STBC is based on introducing joint correlations in transmitted signals in both the space and time domains to provide transmit diversity to combat fading channels.

The Alamouti scheme is the space-time block code to provide transmit diversity for systems with two transmit antennas. The Alamouti-based space-time block code has been widely used because of its simplicity and no need for the transmitter to know the channel state information (CSI) and therefore no need of channel feedback. Due to its effectiveness and easy implementation, the Alamouti-based space-time block code has been adopted into many wireless systems, such as WiMAX and WiFi. In third generation partnership project (3GPP), it was introduced in downlink transmissions in universal mobile telecommunication system (UMTS) since Release 99 and also adopted in downlink high speed downlink packet access (HSDPA) over higher speed data channels in Release 5. In the 3GPP standard, the implementation of Alamouti scheme is known as space time transmit diversity (STTD).

Enhanced uplink (EU), (also known as high speed uplink packet access (HSUPA)), is a feature that was introduced in 3GPP Release 6 to provide higher data rates in the uplink of UMTS wireless systems. The HSUPA may be configured to allow for much faster scheduling of uplink transmissions as well as lower overall data transmission latency.

Multiple antenna transmission/reception techniques with advanced signal processing are often referred to as multiple-input multiple-output (MIMO). MIMO has been widely studied and may significantly improve the performance of wireless communication systems.

Multiple antenna techniques have been widely adopted in many wireless communication systems such as IEEE 802.11n based wireless local area network access points and cellular systems like wideband code division multiple access (WCDMA)/high speed packet access (HSPA) and long term evolution (LTE). MIMO is introduced in WiMAX as well as in 3GPP. More advanced MIMO enhancements are currently being studied for 3GPP Release 9 and 10. Currently, only downlink (DL) MIMO is specified in 3GPP WCDMA standard.

SUMMARY

Method and apparatus for uplink transmission using multiple antennas are disclosed. A wireless transmit/receive unit (WTRU) performs space time transmit diversity (STTD) encoding on an input stream of a physical channel configured for STTD. Each physical channel may be mapped to either an in-phase (I) branch or a quadrature-phase (Q) branch. The STTD encoding generates a plurality of output streams such that the input stream is not changed for one output stream, and symbols of the input stream is switched and a constellation point of one symbol is changed to an opposite constellation point on an I branch or a Q branch for the other output stream. All configured physical channels on an I branch and a Q branch are combined, respectively, to generate a plurality of combined streams in a complex format, and the combined streams are transmitted via a plurality of antennas.

The physical channel configured for STTD may include at least one of an enhanced dedicated channel (E-DCH) dedicated physical data channel (E-DPDCH), an E-DCH dedicated physical control channel (E-DPCCH), a high speed dedicated physical control channel (HS-DPCCH), a dedicated physical control channel (DPCCH), and a dedicated physical data channel (DPDCH).

The WTRU may perform the STTD encoding either in a binary domain or in a complex domain. For the complex domain STTD encoding, the STTD encoding is performed on a block of complex-valued chips corresponding to one or an integer multiple of a largest spreading factor among the physical channels.

A WTRU may perform pre-coding on at least one type of uplink physical channel including the E-DPDCH with the pre-coding weights, and transmitting the pre-coded output streams via a plurality of antennas. Either multiple E-DPDCH data streams may be transmitted using multiple-input multiple-output (MIMO) or a single E-DPDCH data stream may be transmitted using a closed loop transmit diversity depending on the E-DPDCH configuration. The pre-coding may be performed either after or before the spreading operation.

BRIEF DESCRIPTION OF THE DRAWINGS

A more detailed understanding may be had from the following description, given by way of example in conjunction with the accompanying drawings wherein:

FIGS. 12(A) and 12(B) show example STTD encoders for 8PAM;

FIG. 31A shows an example UPCI signaling using an E-HICH;

FIG. 31B illustrates the case where one out of seven E-HICH subframes carries the UPCI field;

DETAILED DESCRIPTION

Figure 1A:
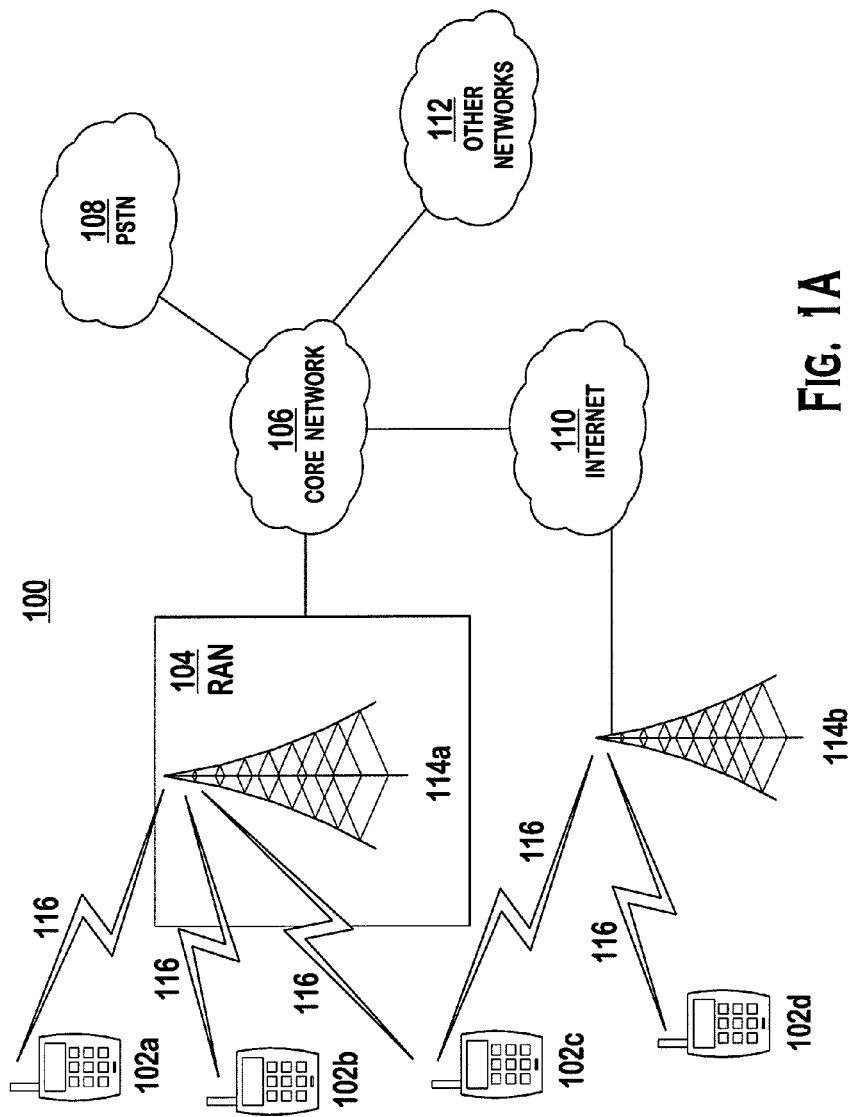
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
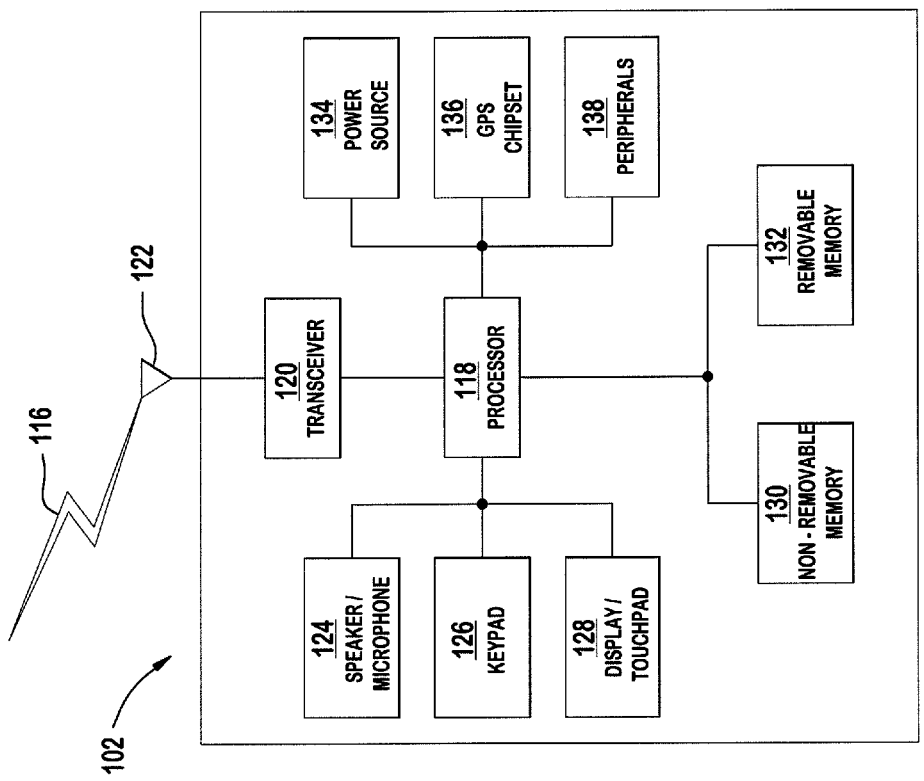
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
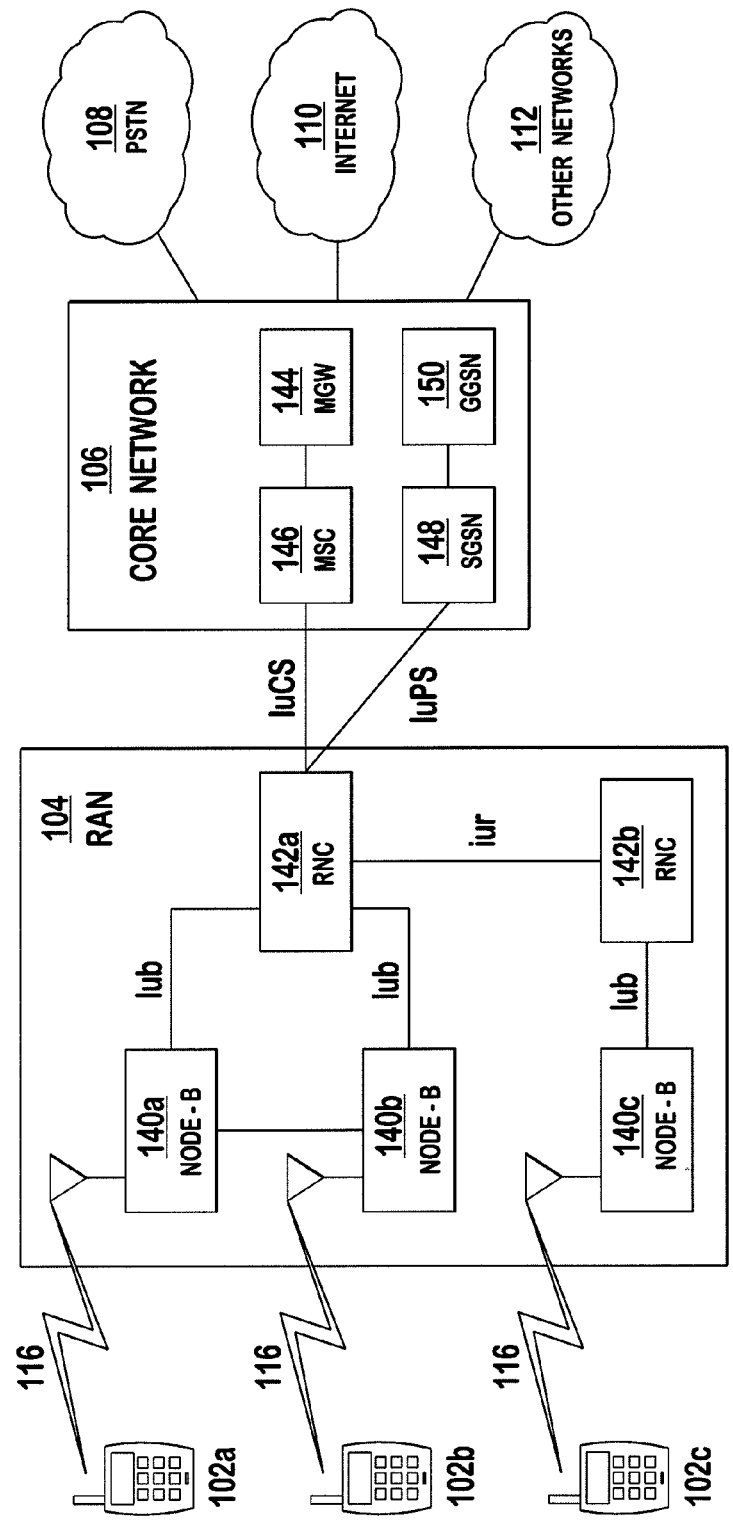
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

It should be noted that although the embodiments will be described hereinafter in the context of 3GPP WCDMA, they are also applicable to any other wireless communication systems including, but not limited to, 3GPP LTE, LTE-Advanced, general packet radio services (GPRS), CDMA2000, WiMAX, WiFi, IEEE 802.x systems, and the like.

In 3GPP WCDMA, different uplink channels may be configured for different purposes and applications. A dedicated physical control channel (DPCCH) and a dedicated physical data channel (DPDCH) are the control and data channels introduced in Release 99. High speed downlink packet access (HSDPA) was introduced in Release 5, and a high speed dedicated physical control channel (HS-DPCCH) serves as a control channel for the HSDPA services. The HS-DPCCH carries channel quality indication and hybrid automatic repeat request (HARQ) acknowledgement. In Release 6, enhanced dedicated channel (E-DCH) services have been introduced. An E-DCH dedicated physical control channel (E-DPCCH) and an E-DCH dedicated physical data channel (E-DPDCH) are the control and data channels for E-DCH services. The DPCCH is used to enable channel estimation at the Node-Bs, to maintain a stable power control loop, and to provide baseline reference for all other channels in terms of error rate control and grant allocation.

The STTD encoding may be implemented with two or more transmit antennas, each of which may be associated with its own transmit chain including modulation mapper, spreader, I/Q combining, scrambler, and separate radio frontend. Hereafter, the embodiments will be explained with reference to the STTD transmitter with two transmit antennas. However, it should be noted that the embodiments may be extended to any number of transmit antennas and to any type of spatial diversity or spatial multiplexing multiple antenna transmission techniques.

The STTD encoder, as will be described in detail below, performs space-time processing over the data stream or signal to be transmitted and distributes its outputs to the two or more transmit chains. After the STTD encoder, the signals operate independently without interaction between the two or more transmit chains.

Figure 2:
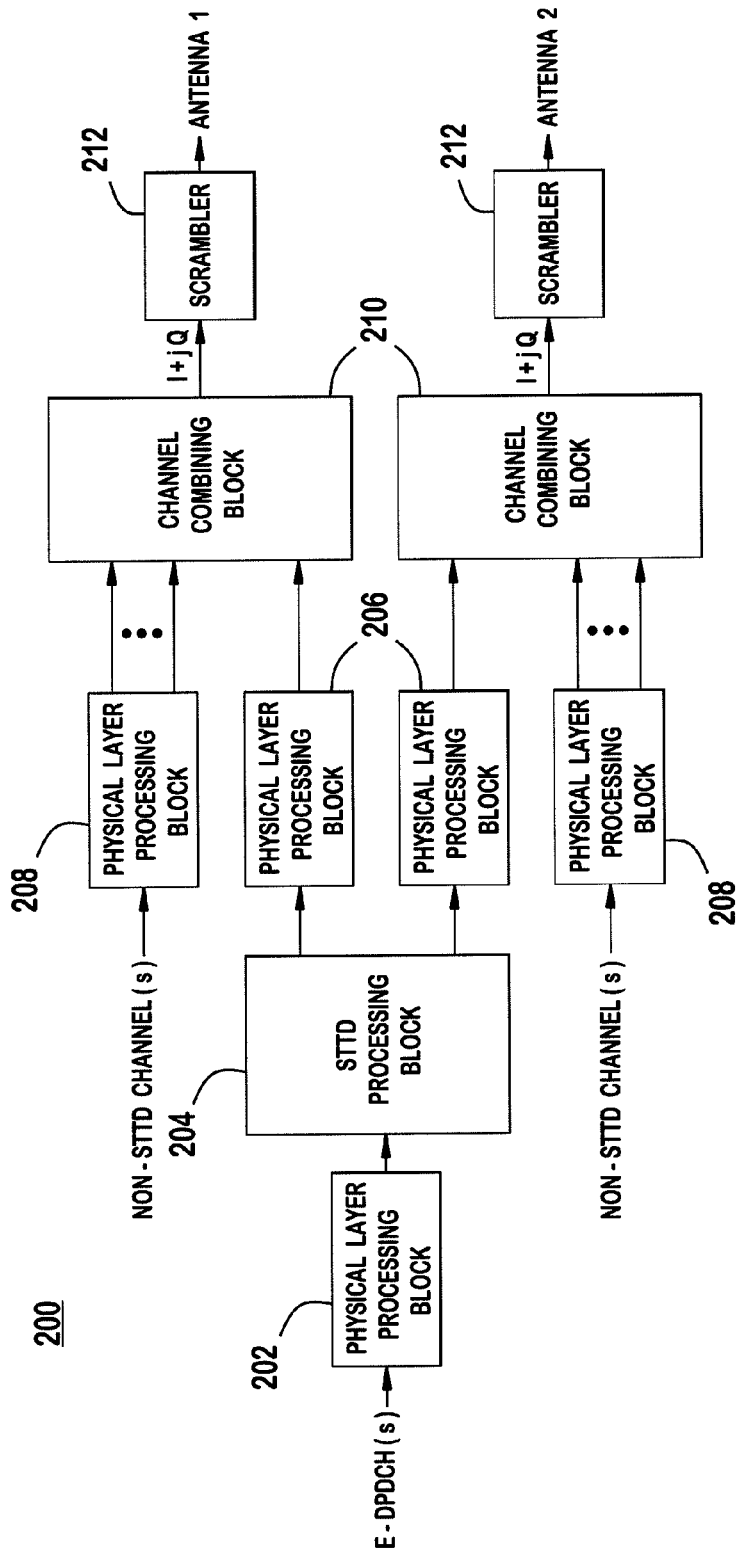
FIG. 2 shows an STTD transmitter in accordance with one embodiment.

FIG. 2 shows an STTD transmitter 200 in accordance with one embodiment. In accordance with this embodiment, the STTD encoding may be applied to a high speed uplink data channel(s), (i.e., an E-DPDCH), and it may not be applied to other channels. The STTD transmitter 200 comprises a first physical layer processing block 202, an STTD processing block 204, second physical layer processing blocks 206, third physical layer processing blocks 208, channel combiners 210, and scramblers 212.

The first, second, and third physical layer processing blocks 202, 206, 208 may perform the conventional signal processing functions including modulation mapping, channelization code spreading, gain scaling, and I/Q combining, or any other functions. FIG. 2 shows that the STTD processing block 204 is placed between the first and second physical processing blocks 202, 206, but the STTD processing block 204 may be placed at any stage of the physical layer processing, and the functions performed by the first and second physical layer processing blocks 202, 206 may be configured differently.

One or more E-DPDCHs may be configured for a WTRU. The E-DPDCH(s) is processed by the first physical layer processing block 202 and then processed by the STTD processing block 204. The STTD processing block 204 outputs two or more signal streams depending on the number of transmit antennas. The STTD processing block 204 performs either binary STTD encoding or complex STTD encoding, and may perform the STTD encoding either on a bit/symbol level or on a block level, which will be explained in detail below. If multiple E-DPDCHs are configured, multiple E-DPDCHs may be processed individually or jointly depending on the STTD encoder structure. The physical channels, (i.e., E-DPDCHs), are initially formed as real valued and each physical channel may be mapped to either I branch or Q branch. At I/Q combining stage in the physical layer processing block (either the first physical layer processing block 202 or the second physical layer processing block 206), the physical channels mapped to either the I branch or the Q branch to form complex signals. Non-STTD channels are processed by the third physical layer processing block(s) 208. Which non-STTD channel is mapped to which transmit antenna is explained in detail below. The channel combining block 210 on each transmit path merges the signal streams from all the channels mapped to the corresponding antenna including the non-STTD channels and E-DPDCHs into a complex signal. The channel combined signal streams are then scrambled by scramblers 212 and transmitted via the antennas.

Figure 3:
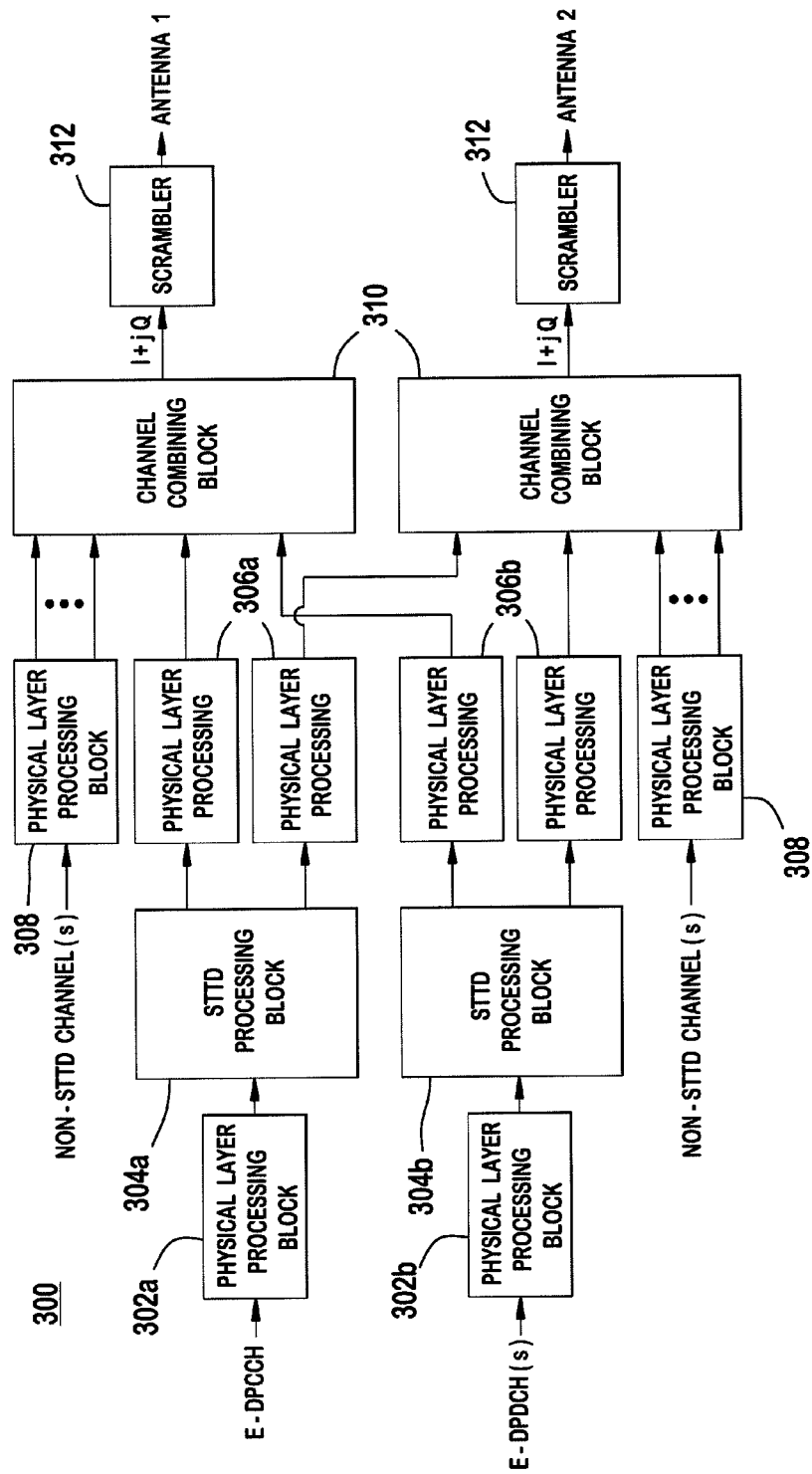
FIG. 3 shows an STTD transmitter in accordance with another embodiment.

FIG. 3 shows an STTD transmitter 300 in accordance with another embodiment. In accordance with this embodiment, the STTD encoding is performed on HSUPA channels, (i.e., an E-DPDCH(s) and an E-DPCCH), and it may not be applied to other channels. The STTD transmitter 300 comprises first physical layer processing blocks 302a, 302b, STTD processing blocks 304a, 304b, second physical layer processing blocks 306a, 306b, third physical layer processing blocks 308, channel combiners 310, and scramblers 312.

The first, second, and third physical layer processing blocks 302a/302b, 306a, 306b, 308 may perform the conventional signal processing functions including modulation mapping, channelization code spreading, gain scaling, and I/Q combining, or any other functions. FIG. 3 shows that the STTD processing blocks 304a/304b are placed between the first and second physical processing blocks 302a/302b and 306a/306b, but the STTD processing blocks 304a/304b may be placed at any stage of the physical layer processing, and the functions performed by the first and second physical layer processing blocks 302a/302b, 306a/306b may be configured differently.

The E-DPCCH is processed by the first physical layer processing block 302a and then processed by the STTD processing block 304a. One or more E-DPDCHs may be configured for a WTRU. The E-DPDCH(s) is processed by the first physical layer processing block 302b and then processed by the STTD processing block 304b. Each of the STTD processing blocks 304a/304b outputs two or more signal streams depending on the number of transmit antennas. The STTD processing blocks 304a/304b perform either binary STTD encoding or complex STTD encoding, and may perform the STTD encoding either on a bit/symbol level or on a block level, which will be explained in detail below. If multiple E-DPDCHs are configured, multiple E-DPDCHs may be processed individually or jointly depending on the STTD encoder structure. The physical channels, (i.e., E-DPDCHs, E-DPCCH), are initially formed as real valued and each physical channel may be mapped to either I branch or Q branch. At I/Q combining stage in the physical layer processing block (either the first physical layer processing block 302a/302b or the second physical layer processing block 306a/306b), the physical channels are mapped to either the I branch or the Q branch to form complex signals. Non-STTD channels are processed by the third physical layer processing block(s) 308. The channel combining block 310 on each transmit path merges the signal streams from all the channels mapped to the corresponding antenna including the non-STTD channels, E-DPDCHs, and E-DPCCH into a complex signal. The channel combined signal streams are then scrambled by scramblers 312 and transmitted via the antennas.

With the STTD transmitter of FIG. 3, the reliability of the E-DPCCH associated with the high speed data channel is improved correspondingly by the transmit diversity. Thus, user throughput at cell edge will be enhanced without imposing the need of increasing the transmit power of the control channel. This may allow the E-DPCCH to have similar level of reliability with respect to the E-DPDCH.

Figure 4:
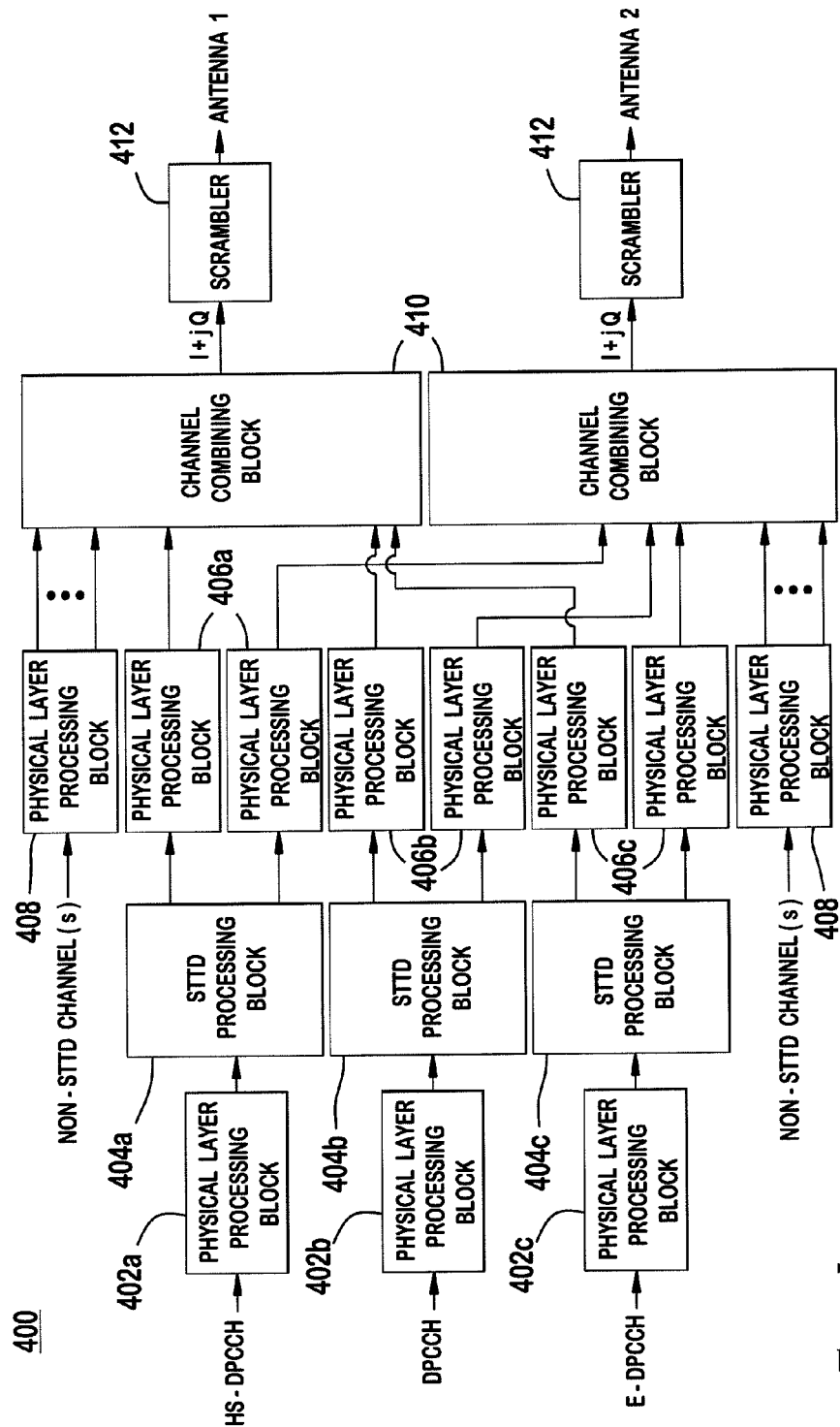
FIG. 4 shows an STTD transmitter in accordance with another embodiment.

FIG. 4 shows an STTD transmitter in accordance with another embodiment. In accordance with this embodiment, the STTD encoding is performed on the uplink control channels, (i.e., a DPCCH, an E-DPCCH, and an HS-DPCCH), and it may not be applied to other channels. The STTD transmitter 400 comprises first physical layer processing blocks 402a, 402*b*, 402*c*, STTD processing blocks 404*a*, 404*b*, 404*c*, second physical layer processing blocks 406*a*, 406*b*, 406*c*, third physical layer processing blocks 408, channel combiners 410, and scramblers 412.

The first, second, and third physical layer processing blocks 402*a*, 402*b*, 402*c*, 406*a*, 406*b*, 406*c*, 408 may perform the conventional signal processing functions including modulation mapping, channelization code spreading, gain scaling, and I/Q combining, or any other functions. FIG. 4 shows that the STTD processing blocks 404*a*/404*b*/404*c* are placed between the first and second physical processing blocks 402*a*/402*b*/402*c* and 406*a*/406*b*/406*c*, but the STTD processing block 404*a*, 404*b*, 404*c* may be placed at any stage of the physical layer processing, and the functions performed by the first and second physical layer processing blocks 402*a*/402*b*/402*c*, 406*a*/406*b*/406*c* may be configured differently.

The HS-DPCCH is processed by the first physical layer processing block 402*a* and then processed by the STTD processing block 404*a*. The DPCCH is processed by the first physical layer processing block 402*b* and then processed by the STTD processing block 404*b*. The DPCCH carries pilot symbols. Therefore, in accordance with this embodiment, the pilot symbols are also STTD encoded. The E-DPCCH is processed by the first physical layer processing block 402*c* and then processed by the STTD processing block 404*c*. Each of the STTD processing blocks 404*a*/404*b*/404*c* outputs two or more signal streams depending on the number of transmit antennas. The STTD processing blocks 404*a*/404*b*/404*c* perform either binary STTD encoding or complex STTD encoding, and may perform the STTD encoding either on a bit/symbol level or on a block level, which will be explained in detail below. The physical channels, (i.e., E-DPCCH, DPCCH, HS-DPCCH), are initially formed as real valued and each physical channel may be mapped to either I branch or Q branch. At I/Q combining stage in the physical layer processing block (either the first physical layer processing block 402*a*/402*b*/402*c* or the second physical layer processing block 406*a*/406*b*/406*c*), the physical channels are mapped to either the I branch or the Q branch to form complex signals. Non-STTD channels are processed by the third physical layer processing block(s) 408. The channel combining block 410 on each transmit path merges the signal streams from all the channels mapped to the corresponding antenna including the non-STTD channels, E-DPCCH, DPCCH, and HS-DPCCH into a complex signal. The channel combined signal streams are then scrambled by scramblers 412 and transmitted via the antennas.

Figure 5:
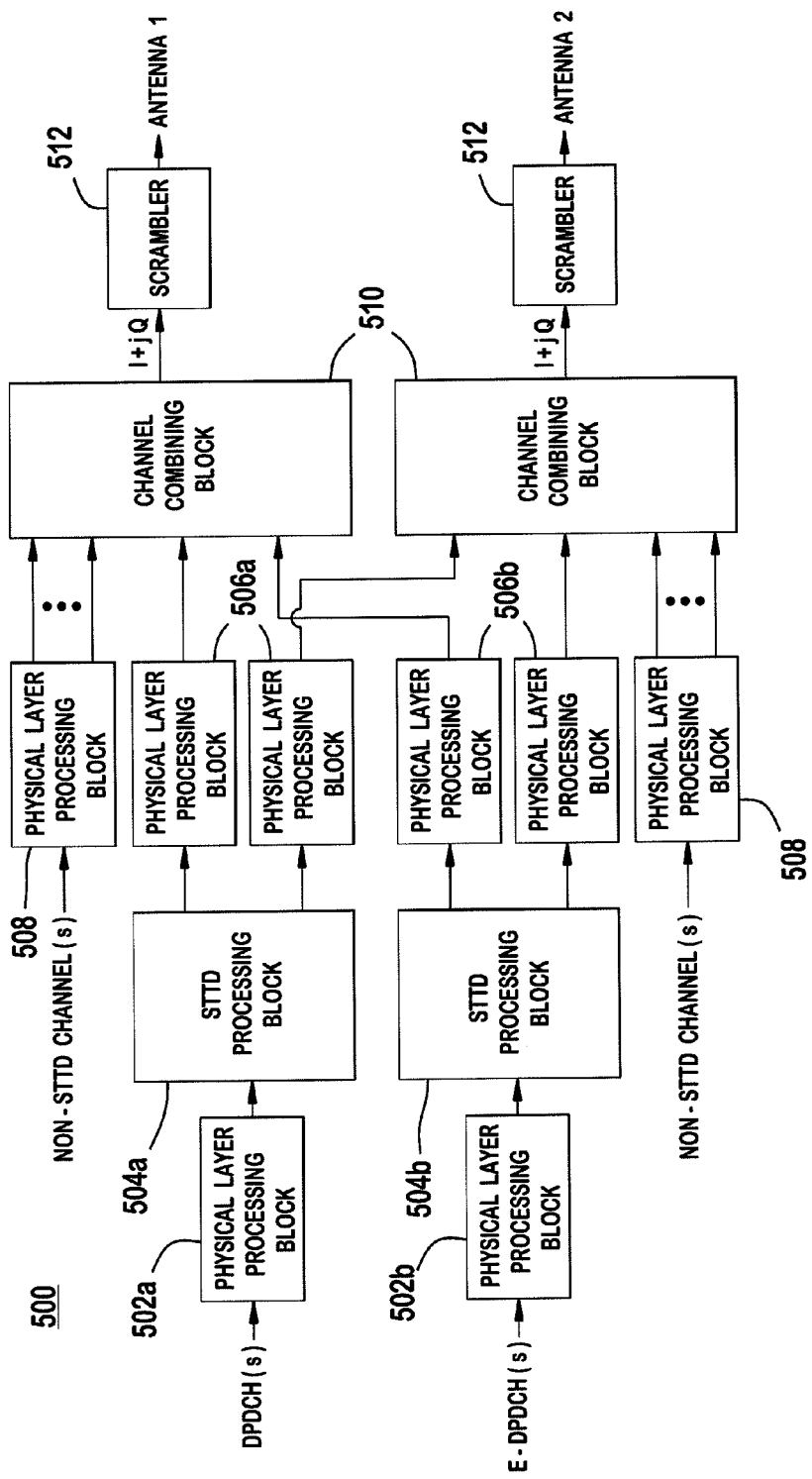
FIG. 5 shows an STTD transmitter in accordance with another embodiment.

FIG. 5 shows an STTD transmitter 500 in accordance with another embodiment. In accordance with this embodiment, the STTD encoding is performed on data channels, (i.e., a DPDCH(s), an E-DPDCH(s)), and it may not be applied to other channels. The STTD transmitter 500 comprises first physical layer processing blocks 502*a*, 502*b*, STTD processing blocks 504*a*, 504*b*, second physical layer processing blocks 506*a*, 506*b*, third physical layer processing blocks 508, channel combiners 510, and scramblers 512.

The first, second, and third physical layer processing blocks 502*a*, 502*b*, 506*a*, 506*b*, 508 may perform the conventional signal processing functions including modulation mapping, channelization code spreading, gain scaling, and I/Q combining, or any other functions. FIG. 5 shows that the STTD processing blocks 504*a*/504*b* are placed between the first and second physical processing blocks 502*a*/502*b* and 506*a*/506*b*, but the STTD processing blocks 504*a*/504*b* may be placed at any stage of the physical layer processing, and the functions performed by the first and second physical layer processing blocks 502*a*/502*b*, 506*a*/506*b* may be configured differently.

One or more DPDCH and/or one or more E-DPDCH(s) may be configured for a WTRU. The DPDCH(s) is processed by the first physical layer processing block 402*a* and then processed by the STTD processing block 404*a*. The E-DPDCH(s) is processed by the first physical layer processing block 402*b* and then processed by the STTD processing block 404*b*. Each of the STTD processing blocks 404*a*/404*b* outputs two or more signal streams depending on the number of transmit antennas. The STTD processing blocks 404*a*/404*b* perform either binary STTD encoding or complex STTD encoding, and may perform the STTD encoding either on a bit/symbol level or on a block level, which will be explained in detail below. If multiple DPDCHs and/or E-DPDCHs are configured, multiple DPDCHs and/or E-DPDCHs may be processed individually or jointly depending on the STTD encoder structure. The physical channels, (i.e., DPDCH(s) and E-DPDCH(s)), are initially formed as real valued and each physical channel may be mapped to either I branch or Q branch. At I/Q combining stage in the physical layer processing block (either the first physical layer processing block 502*a*/502*b* or the second physical layer processing block 506*a*/506*b*), the physical channels are mapped to either the I branch or the Q branch to form complex signals. Non-STTD channels are processed by the third physical layer processing block(s) 508. The channel combining block 510 on each transmit path merges the signal streams from all the channels mapped to the corresponding antenna including the non-STTD channels, DPDCH(s), and E-DPDCHs into a complex signal. The channel combined signal streams are then scrambled by scramblers 512 and transmitted via the antennas.

Figure 6:
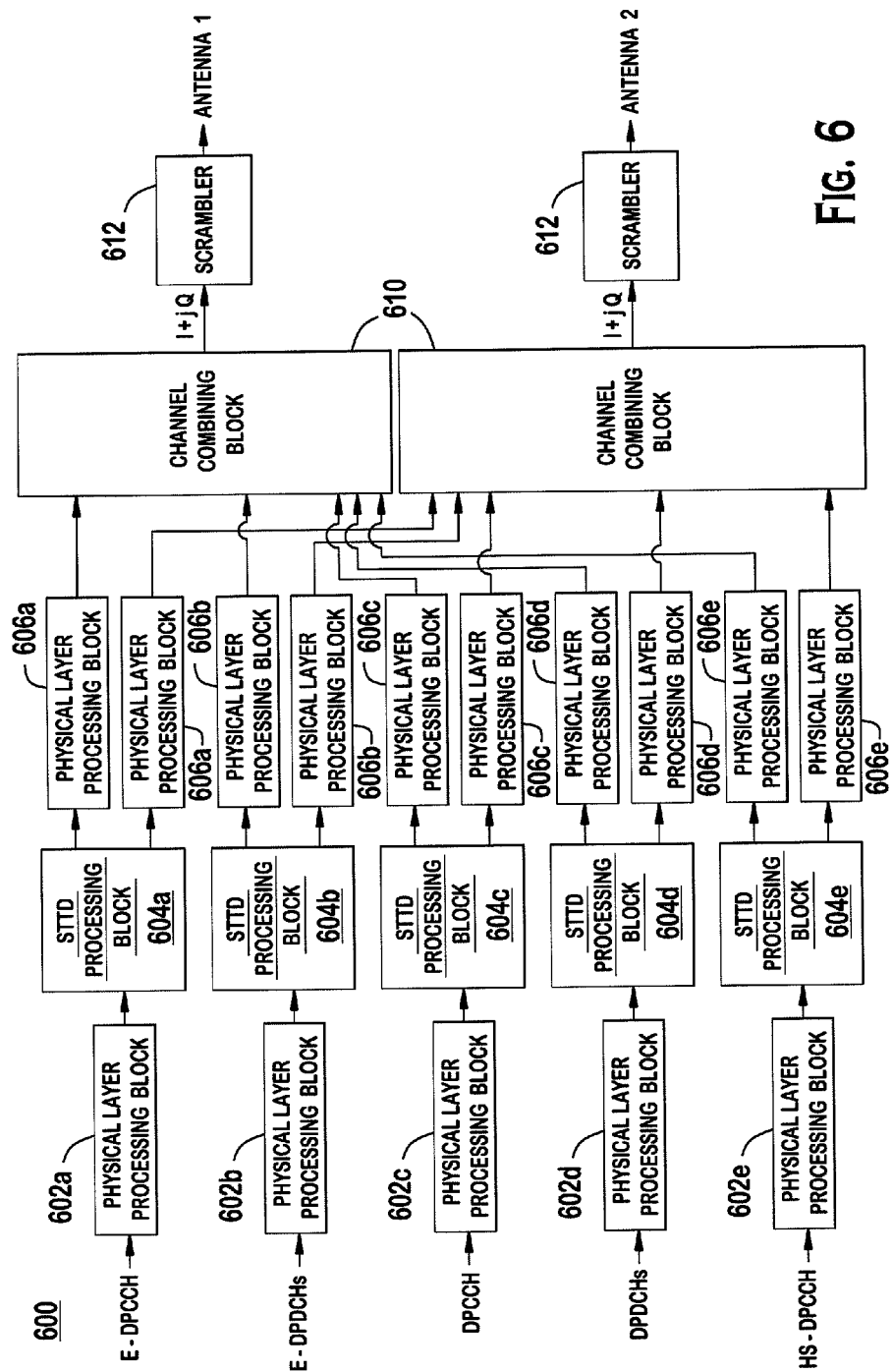
FIG. 6 shows an STTD transmitter in accordance with another embodiment.

FIG. 6 shows an STTD transmitter 600 in accordance with another embodiment. In accordance with this embodiment, STTD encoding is performed on all uplink channels, (E-DPDCH(s), E-DPCCH, DPDCH(s), DPCCH, HS-DPCCH). The STTD transmitter 600 comprises first physical layer processing blocks 602*a*, 602*b*, 602*c*, 602*d*, 602*e*, STTD processing blocks 604*a*, 604*b*, 604*c*, 604*d*, 604*e*, second physical layer processing blocks 606*a*, 606*b*, 606*c*, 606*d*, 606*e*, channel combiners 610, and scramblers 612.

The first, second, and third physical layer processing blocks 602*a*, 602*b*, 602*c*, 602*d*, 602*e*, 606*a*, 606*b*, 606*c*, 606*d*, 606*e*, 608 may perform the conventional signal processing functions including modulation mapping, channelization code spreading, gain scaling, and I/Q combining, or any other functions. FIG. 6 shows that the STTD processing blocks 604*a*/604*b*/604*c*/606*d*/606*e* are placed between the first and second physical processing blocks 602*a*/602*b*/602*c*/602*d*/602*e* and 606*a*/606*b*/606*c*/606*d*/606*e*, but the STTD processing block 604*a*, 604*b*, 604*c*, 604*d*, 604*e* may be placed at any stage of the physical layer processing, and the functions performed by the first and second physical layer processing blocks 602*a*/602*b*/602*c*/602*d*/602*e*, 606*a*/606*b*/606*c*/606*d*/606*e* may be configured differently.

The E-DPCCH is processed by the first physical layer processing block 602*a* and then processed by the STTD processing block 604*a*. One or more DPDCH and/or one or more E-DPDCH(s) may be configured for a WTRU. The E-DPDCH(s) is processed by the first physical layer processing block 602*b* and then processed by the STTD processing block 604*b*. The DPCCH is processed by the first physical layer processing block 602*c* and then processed by the STTD processing block 604*c*. The DPCCH carries pilot symbols. Therefore, in accordance with this embodiment, the pilot symbols are also STTD encoded. The DPDCH(s) is processed by the first physical layer processing block 602d and then processed by the STTD processing block 604d. The HS-DPCCH is processed by the first physical layer processing block 602e and then processed by the STTD processing block 604e. Each of the STTD processing blocks 604a/604b/604c/604d/604e outputs two or more signal streams depending on the number of transmit antennas. The STTD processing blocks 604a/604b/604c/604d/604e perform either binary STTD encoding or complex STTD encoding, and may perform the STTD encoding either on a bit/symbol level or on a block level, which will be explained in detail below. The physical channels, (i.e., E-DPCCH, DPCCH, HS-DPCCH), are initially formed as real valued and each physical channel may be mapped to either I branch or Q branch. At I/Q combining stage in the physical layer processing block (either the first physical layer processing block 602a/602b/602c/602d/602e or the second physical layer processing block 606a/606b/606c/606d/606e), the physical channels are mapped to either the I branch or the Q branch to form complex signals. The channel combining block 610 on each transmit path merges the signal streams from all the channels mapped to the corresponding antenna including E-DPCCH, E-DPDCH(s), DPCCH, DPDCH(s), and HS-DPCCH into a complex signal. The channel combined signal streams are then scrambled by scramblers 612 and transmitted via the antennas.

The advantage of the STTD transmitter in FIG. 6 is that channels (both data and control channels) are all balanced in terms of the service quality therefore the power scaling configuration on each channel may be maintained the same as if no STTD is applied as long as the power control is performed properly according to the specified signal-to-interference ratio (SIR) or block error rate (BLER) target. Since the pilot signal transmitted in the DPCCH over the two antennas may be made orthogonal at the receiver with the appropriate STTD processing, the channel estimation at the Node-B may be readily conducted without introducing the second pilot signal.

The peak-to-average power ratio (PAPR) or the cubic metric of all the STTD transmitter structures disclosed above may maintain the similar level at each antenna as the conventional uplink implementation, since the STTD processing is applied per data symbol basis that does not introduce dependency between symbols across time. This behavior may be understood by the fact that the STTD processing may be implemented in binary or symbol domain (as opposed to the chip domain) as shown below.

Figure 7:
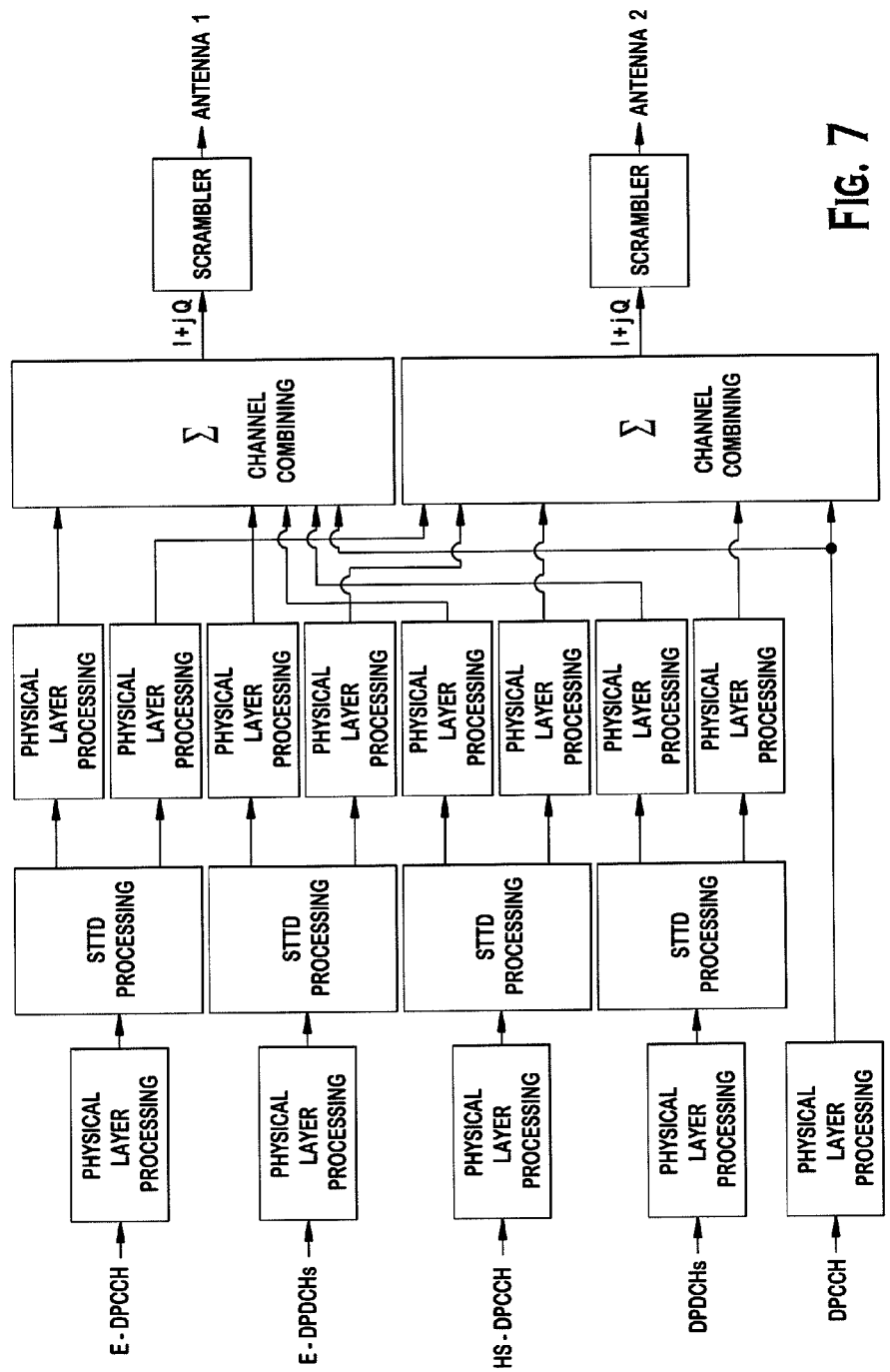
FIG. 7 shows an STTD transmitter in accordance with another embodiment.

FIG. 7 shows an STTD transmitter in accordance with another embodiment. In this embodiment, all channels except the DPCCH are STTD processed. Because the pilot signal is embedded in the DPCCH, this structure may offer the benefit of not requiring significant modification of the channel estimation at the Node-B receiver side. The STTD transmitter in FIG. 7 is substantially similar to the STTD transmitter in FIG. 6. Therefore, it will not be explained in detail for simplicity.

Figure 8:
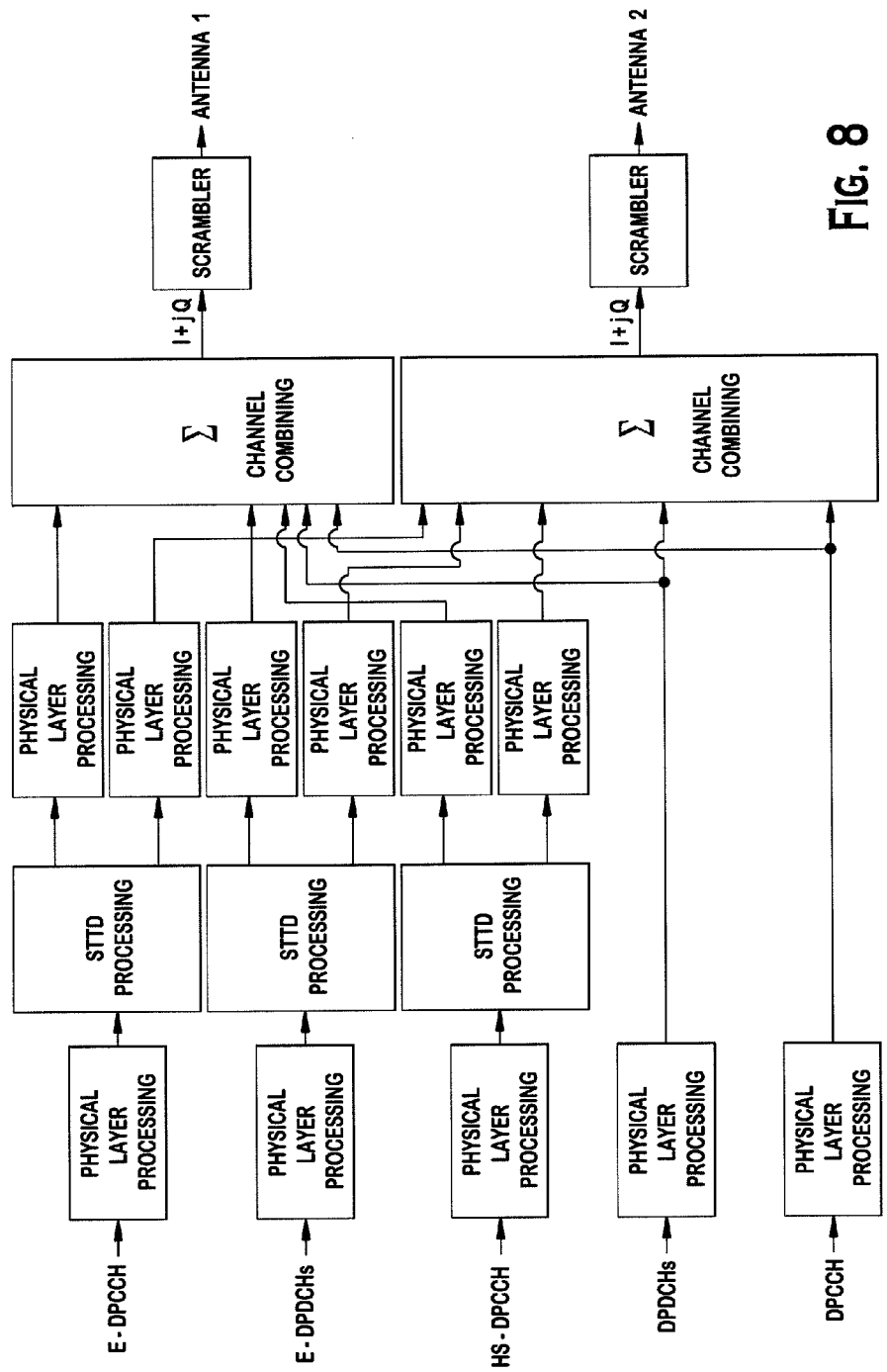
FIG. 8 shows an STTD transmitter in accordance with another embodiment.

FIG. 8 shows an STTD transmitter in accordance with another embodiment. In this embodiment, E-DPCCH, E-DPDCH(s), and HS-DPCCH are STTD encoded and DPDCH(s) and DPCCH are not STTD encoded. With this embodiment, the modification requirement at the Node-B receiver may be reduced. The STTD transmitter in FIG. 7 is substantially similar to the STTD transmitter in FIG. 6. Therefore, it will not be explained in detail for simplicity.

Figure 9A:
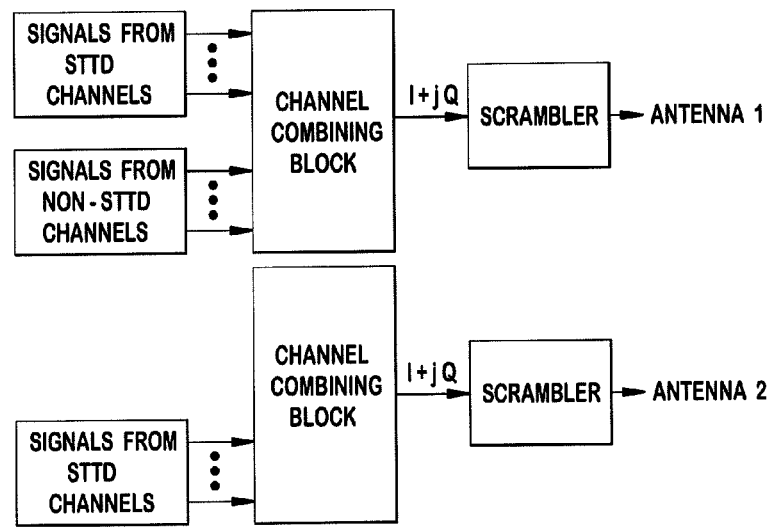
FIGS. 9(A)-9(D) show transmission schemes for the non-STTD channel(s)
Figure 9B:
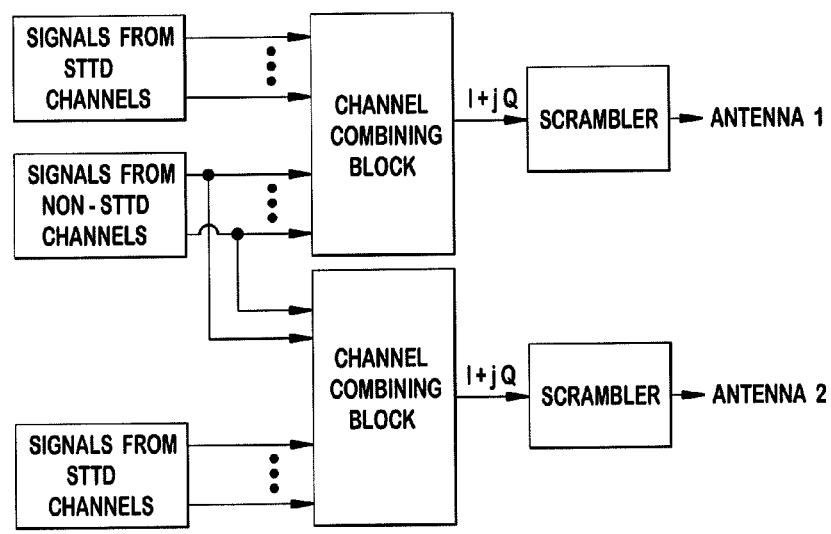
Figure 9C:
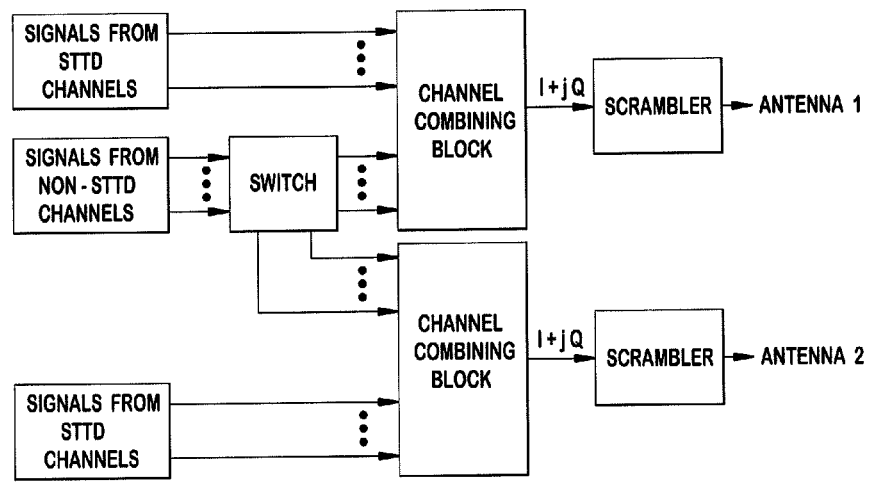
Figure 9D:
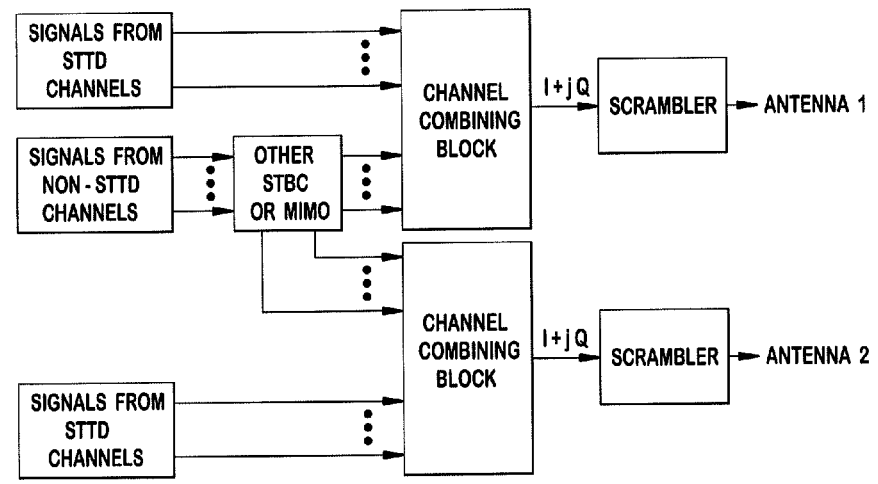

The channels over which the STTD processing is not applied may be transmitted over at least one antenna. The non-STTD channel(s) may be transmitted over one of the antennas, as shown in FIG. 9(A). Alternatively, the identical signals of the non-STTD channel(s) may be transmitted over the two (or all) antennas, as shown in FIG. 9(B). Alternately, the non-STTD channel(s) may be transmitted over two (or all) antennas in a time division duplex fashion in accordance with a configured pattern, as shown in FIG. 9(C). Alternatively, any types of space time processing or multiple-input multiple-output (MIMO) schemes may be used for transmission of the non-STTD channel(s), as illustrated in FIG. 9(D).

Different from the downlink in a UMTS communication system, the physical channels in the uplink are formed as real-valued sequences and fed into either the I branch or the Q branch of the complex channel independently. Each of the physical channels is spread and weighted by its own channelization code and gain factor. As a result, the complex signal generated in such way may not have the properties of a true two dimension constellation. It may exhibit imbalance in phase and amplitude between its I-phase and Q-phase components. Before sending to the radio front end, a complex scrambler may be applied, and this helps to even out the imbalance existing in the transmitted signal.

Embodiments for STTD encoder are disclosed hereafter. The STTD encoder may be a binary STTD encoder or a complex STTD encoder.

Figure 10A:
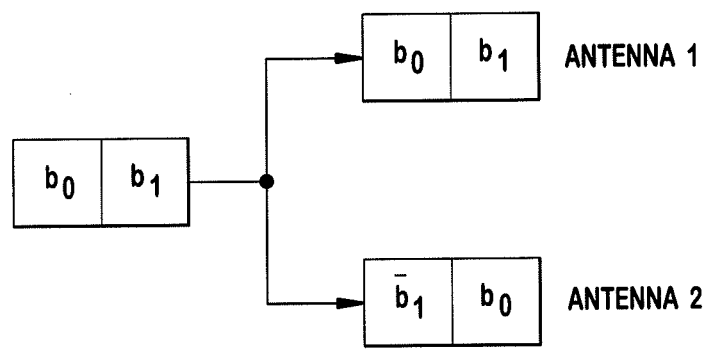
FIGS. 10(A) and 10(B) show example binary STTD encoders for binary phase shift keying (BPSK) modulated data transmission.
Figure 10B:
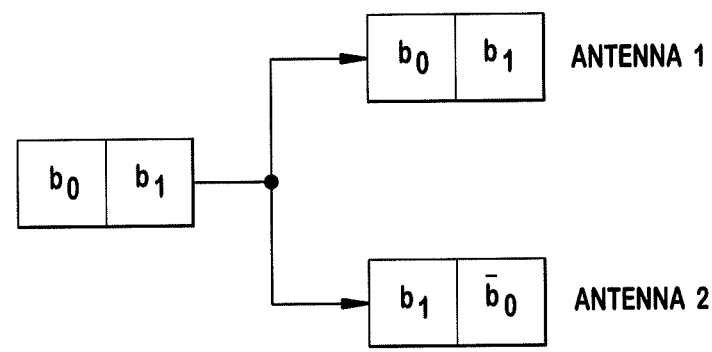

The binary STTD encoder operates in binary domain before the physical layer processing, (i.e., prior to the modulation mapping). Assuming $b_i$, i=0, 1, 2, . . . , N where N is the number of bits per symbol, are the bits to be transmitted, the STTD encoder manipulates these bits to generate the inputs to create diversity for the two (or more) separated antenna paths. Each channel may form real-valued information sequence independently, and the physical channels that may be placed on the I and Q branches separately may be treated by a different STTD encoder. The STTD encoding may then be performed separately for each I and Q branch. FIGS. 10(A) and 10(B) show example binary STTD encoders for binary phase shift keying (BPSK) modulated data transmission. One of them may be used for an I-branch channel and the other may be used for a Q branch channel. Each branch may use a different binary STTD encoder. The input bit $b_i$ may take three values 0,1, and discontinues transmission (DTX). $\bar{b}_i$ is defined as follows: if $b_i$=0 then $\bar{b}_i$=1, if $b_i$=1 then $\bar{b}_i$=0, otherwise $\bar{b}_i$=$b_i$.

Figure 11A:
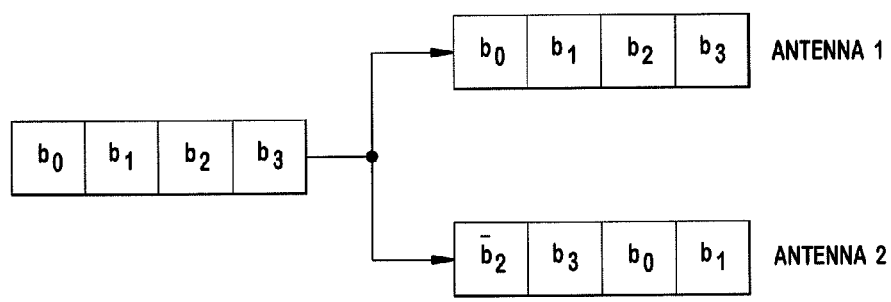
FIGS. 11(A) and 11(B) show example STTD encoders for 4-level pulse amplitude modulation (4PAM) modulation.
Figure 11B:
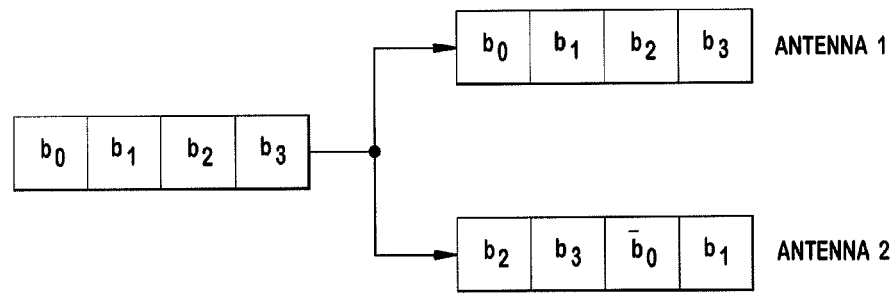

The dual binary STTD encoder configuration may vary depending on the size of modulation mapping. FIGS. 11(A) and 11(B) show example STTD encoders with example constellation mapping rules for each branch for 4-level pulse amplitude modulation (4PAM) modulation. One of them may be used for an I-branch channel and the other may be used for a Q-branch channel.

The dual binary STTD encoder may be extended to other constellations of any order. For example, constellation mapping rules for the STTD encoding in general may be as follows: (1) the data bits are taken for two consecutive symbols: $b_0 b_1 \ldots b_{N-1} b_N \ldots b_{2N-1}$, where N is the number of bits in a symbol, (2) the binary data for antenna 1 remains unchanged, (3) the order of two symbols is changed as follows to generate the data for antenna 2: $b_0 b_1 \ldots b_{N-1} b_N \ldots b_{2N-1} \rightarrow b_N \ldots b_{2N-1} b_0 b_1 \ldots b_{N-1}$, and (4) a constellation mapping rule is applied for the I-branch channels, whereby the first bit of the second symbol is inverted: $b_N \rightarrow \bar{b}_N$, and for the Q-branch channels, whereby the first bit of the first symbol is inverted: $b_0 \rightarrow \bar{b}_0$ (alternatively, different bit position may be inverted depending on the constellation mapping rule).

FIGS. 12(A) and 12(B) show example STTD encoders with constellation mapping rules for 8PAM. One of them may be used for an I-branch channel and the other may be used for a Q-branch channel.

Figure 13:
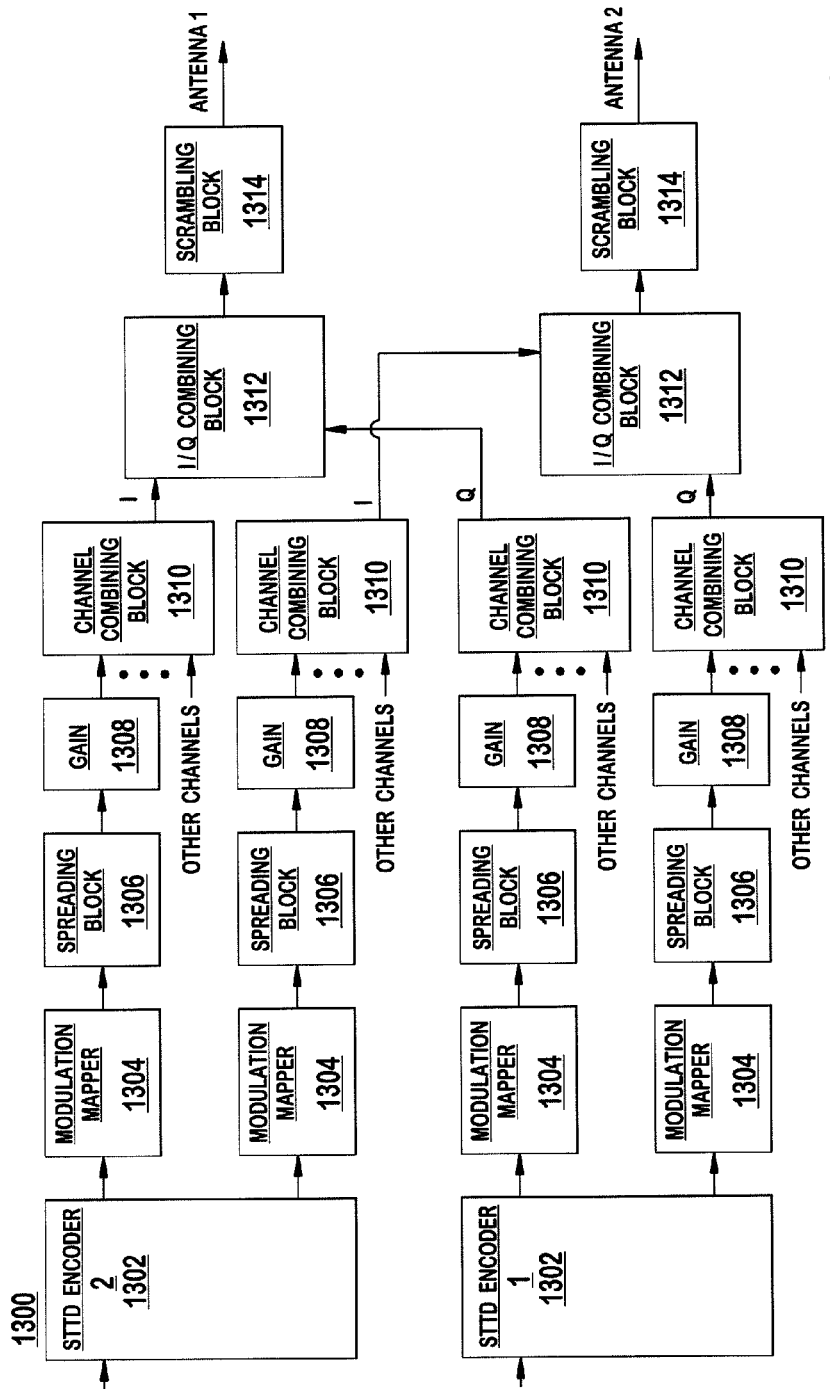
FIG. 13 shows an example transmitter structure with a dual binary STTD encoder.

FIG. 13 shows an example transmitter 1300 with a dual binary STTD encoder. The transmitter 1300 includes STTD encoders 1302, modulation mappers 1304, spreading blocks 1306, gain control blocks 1308, channel combining blocks 1310, I/Q combining blocks 1312, and scrambling blocks 1314. Each channel may be processed individually by the STTD encoder 1302. Each STTD processing block 1302 outputs two or more signal streams depending on the number of transmit antennas. Each signal stream from the STTD encoder 1302 is then processed by a modulation mapper 1304, and then by a spreading block 1306, and a gain control block 1308 with its own channelization code and gain factor. The channel combining block 1310 and the I/Q combining block 1312 merge all the channels into a complex signal, which is scrambled by a scrambling block 1314 before transmitted over the assigned antenna. Since it is implemented in the binary domain, the dual binary STTD encoder 1302 offers a simple solution that allows an implementation to duplicate two transmit chains, one for each antenna, without having to make much modification as compared to the conventional WTRU transmitter structure.

Since the symbol boundaries of all considered physical channels, (i.e., DPCCH, DPDCH, E-DPCCH, E-DPDCH, and HS-DPCCH), are aligned at certain time point, the STTD encoding may be performed in a complex domain. Due to the fact that each channel is spread in real domain and the complex signal comprises multiple channels, the STTD encoder should deal with different symbol durations resulted from different spreading factors (SFs) among the channels as shown in the Table 1.

TABLE 1

| Physical channel type | SF | Symbols/slot |
| --- | --- | --- |
| DPCCH | 256 | 10 |
| DPDCH | 2, 4, 8, ..., 256 | 10, ..., 1280 |
| HS-DPCCH | 256 | 10 |
| E-DPCCH | 256 | 10 |
| E-DPDCH | 2, 4, 8, ..., 256 | 10, ..., 1280 |

Figure 14:
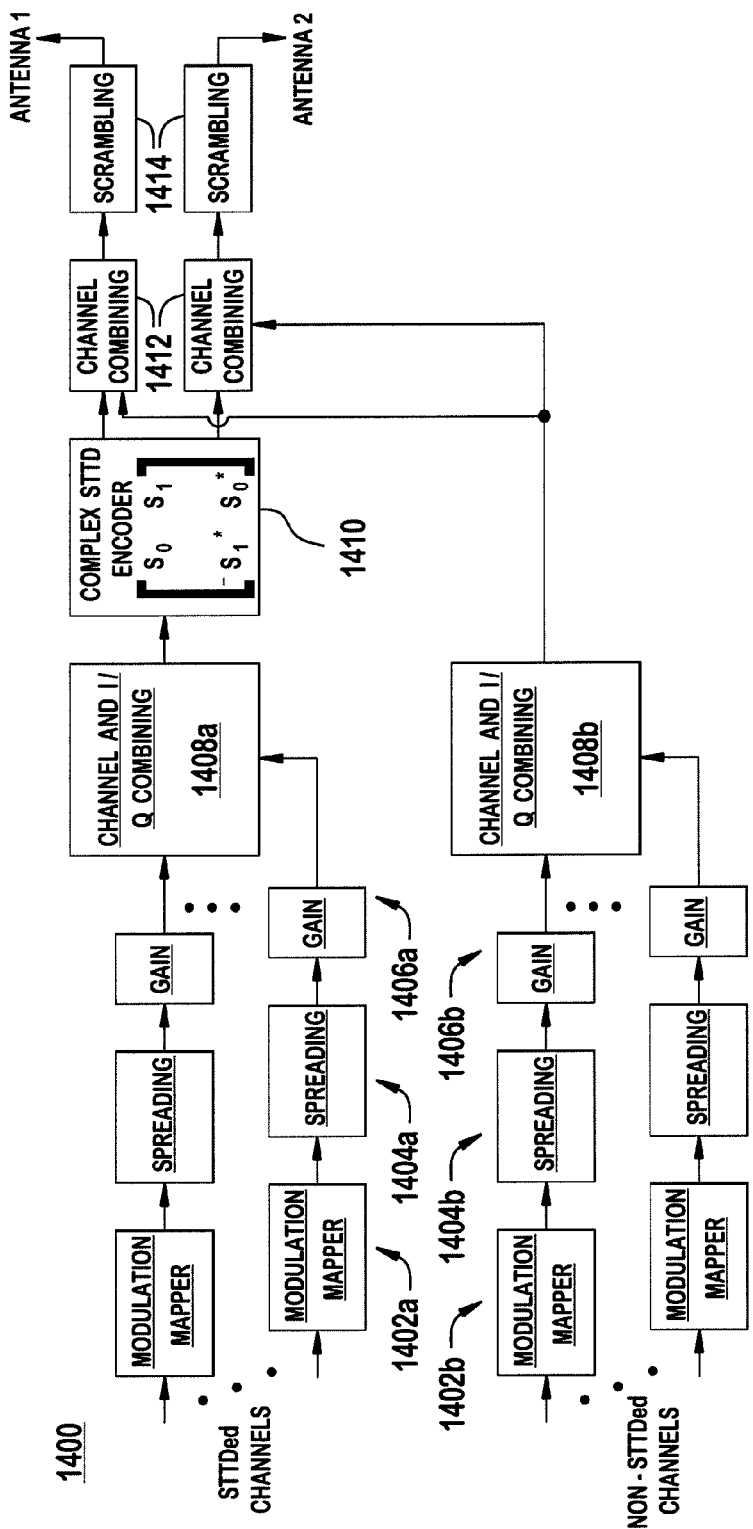
FIG. 14 shows an example STTD transmitter with a complex STTD encoder.

FIG. 14 shows an example STTD transmitter 1400 with a complex STTD encoder. The transmitter 1400 comprises modulation mappers 1402a, 1402b, spreading blocks 1404a, 1404b, gain control blocks 1406a, 1406b, channel and I/Q combining blocks 1408a, 1408b, a complex STTD encoder 1410, channel combining blocks 1412, and scrambling blocks 1414. STTD channels are processed by a modulation mapper 1402a, a spreading block 1404a, and a gain control block 1406a, and combined into a complex signal by the channel and I/Q combining block 1408a. The combined STTD channel signals are then processed by the complex STTD encoder 1410. Non-STTD channels are processed by a modulation mapper 1402b, a spreading block 1404b, and a gain control block 1406b, and combined into a complex signal by the channel and I/Q combining block 1408b. The STTD-encoded STTD channel signals and the processed non-STTD channel signals are then combined by the channel combiners 1412, and then processed by the respective scrambling blocks 1414 for transmission.

Figure 15:
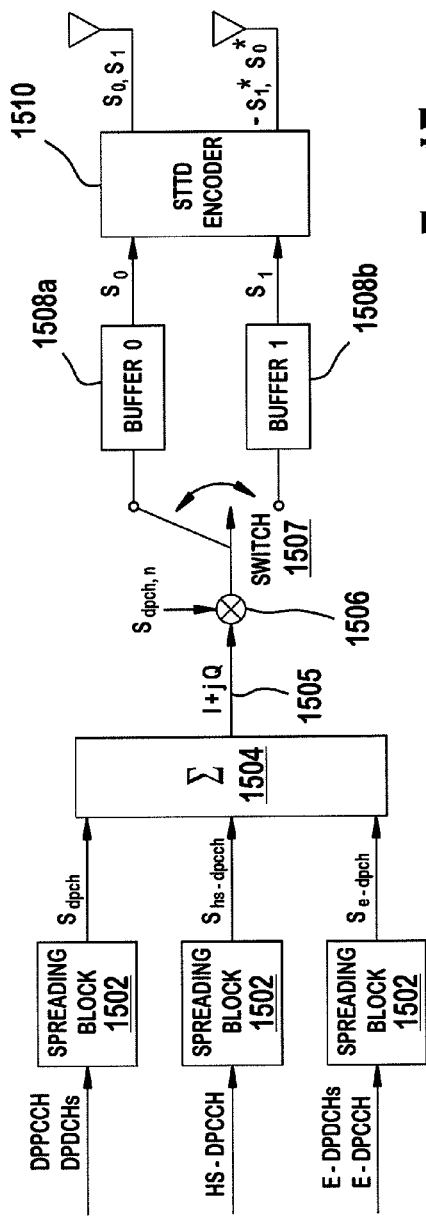
FIG. 15 shows an example complex STTD encoding process.

FIG. 15 shows an example complex STTD encoding process. It should be noted that the complex STTD encoding may be performed with any STTD transmitters disclosed above. The uplink channels (DPCCH, DPDCH(s), HS-DPCCH, E-DPCCH, E-DPDCH(s)) are spread by a specific spreading block 1502 with a specific channelization code with a specific spreading factor and combined to a complex signal by a combiner 1504. The spreading factors for the uplink channels may be different. The combined complex signal 1505, (i.e., a block of chips combined over multiple uplink channels, which will be referred to as "STTD symbol"), is scrambled by the scrambler 1506 and stored in buffers 1508a, 1508b in time alternation, (i.e., the switch 1507 switches every T time instant), so that two consecutive STTD symbols are processed by the STTD encoder 1510 for STTD encoding.

The switch 1507 is synchronized to a symbol boundary as follows. Over the complex signal, the STTD symbols are defined such that a symbol duration "T" equals to the length of data symbols from the channel with a largest spreading factor of value $SF_{max}$, and the time boundary is aligned with the data symbols from the channel with the largest spreading factor of value $SF_{max}$. Therefore, each STTD symbol comprises $SF_{max}$ chips. The complex STTD operation is then performed over the STTD symbols S0 and S1 as follows:

$$[s_0 \ s_1] \Rightarrow \begin{bmatrix} s_0 & s_1 \\ -s_1^* & s_0^* \end{bmatrix}; \qquad \text{Equation (1)}$$

where * represents a complex conjugate. The complex conjugate and negative operations are performed over the whole waveform of the STTD symbols, or equivalently, over every chip of the spread complex signal. The matrix notation means that $S_0$ is transmitted first in its entirety and then followed by $S_1$ in its entirety at the first antenna, and $-S_1^*$ is transmitted first in its entirety and then followed by $S_0^*$ in its entirety at the second antenna. The receiver needs be aware of the symbol configuration and boundary to perform decoding.

Figure 16:
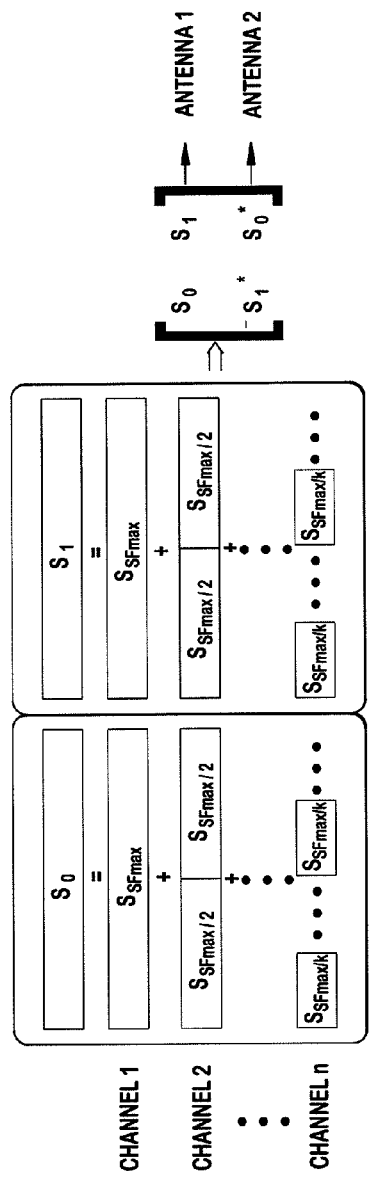
FIG. 16 shows STTD symbol configuration with different spreading factors (SFs)

FIG. 16 shows an example STTD symbol configuration for channels with different $SF_s$, where each of the STTD symbols ($S_0$ or $S_1$) contains $S_{SFmax}$ chips. The channels may take any combination of SFs in any order. Channel 1 is spread with the largest SF ($SF_{max}$), and the STTD symbol of that channel contains one symbol of $S_{SFmax}$ chips. Channel 2 is spread with a half of the $SF_{max}$, (i.e., $SF_{max}/2$), and the STTD symbols of that channel contains two symbols, each comprising $S_{SFmax}/2$ chips. Channel N is spread with $SF_{max}/k$, and the STTD symbols of that channel contains k symbols, each comprising $S_{SFmax}/k$ chips. More than one channel may be spread with the same spreading factor and some spreading factors may not be used. For the channels that have spreading factor equal to $SF_{max}$, one information symbol is transmitted in an STTD symbol. The other channels may have more than one information symbols included in an STTD symbol, depending on the spreading factor. As shown in FIG. 16, the number of data symbols contained in an STTD symbol for a particular channel is determined by the ratio of $SF_{max}$ and SF associated to that channel. For example, if a channel is spread with a spreading factor $SF_{max}/2$, then the channel may have two data symbols per STTD symbol.

Figure 17:
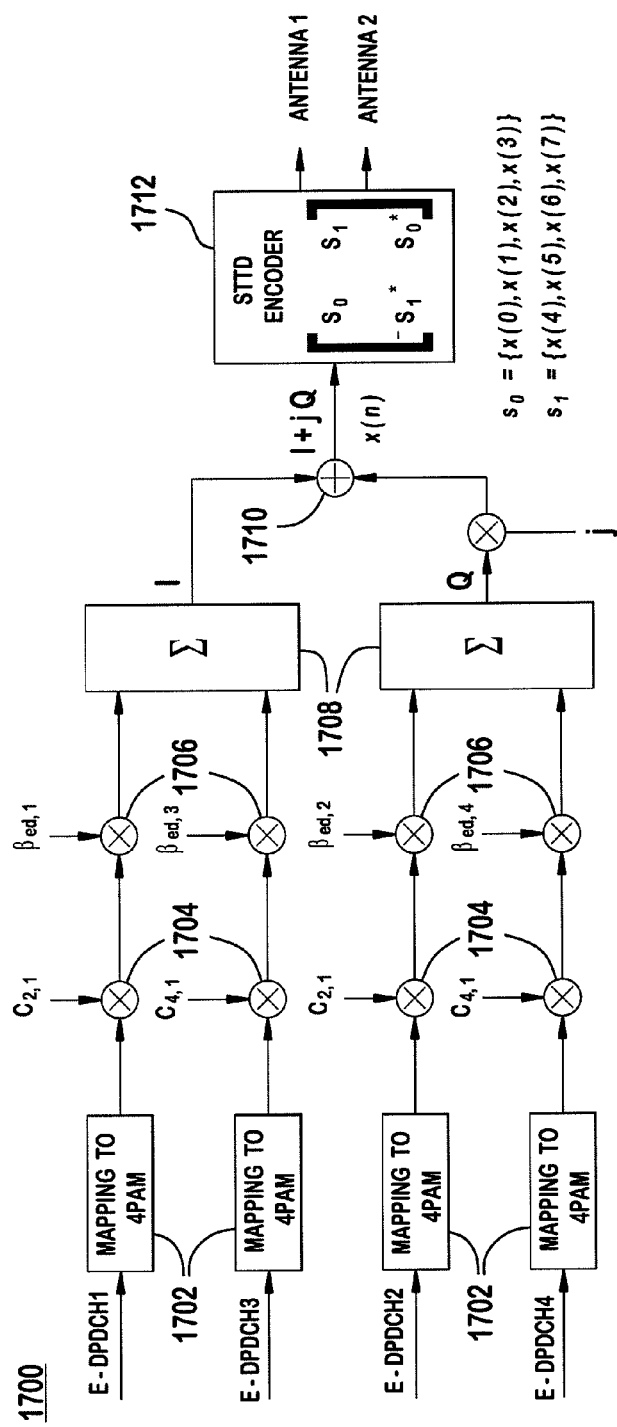
FIG. 17 illustrates an exemplary complex STTD encoding applied to the HSUPA data channels.

An exemplary complex STTD encoding applied to the high speed uplink packet access (HSUPA) data channels, (i.e., the E-DPDCHs), is illustrated hereafter with reference to FIG. 17. FIG. 17 shows an example transmitter 1700 with a complex STTD encoder for transmission of four E-DPDCHs. The transmitter 1700 comprises modulation mappers 1702, channelization blocks 1704, gain control blocks 1706, channel combiners 1708, an I/Q combiner 1710, and an STTD encoder 1712. In this example, the WTRU transmits at a peak uplink data rate, where four E-DPDCHs are configured for uplink data transmission allowing a total of 11.5 Mbps of data throughput. The channelization codes and spreading factors used for these E-DPDCHs are specified in Table 2.

TABLE 2

| E-DPDCH channels | Channelization codes | Spreading factor | I/Q path |
|---|---|---|---|
| E-DPDCH1 | $C_{2,1}$ | 2 | I |
| E-DPDCH2 | $C_{2,1}$ | 2 | Q |
| E-DPDCH3 | $C_{4,1}$ | 4 | I |
| E-DPDCH4 | $C_{4,1}$ | 4 | Q |

In this example, E-DPDCHs 1 and 3 are mapped to I branch, and E-DPDCHs 2 and 4 are mapped to Q branch. The binary streams on each E-DPDCH are mapped to 4PAM symbols individually by the modulation mapper 1702. Each of the E-DPDCHs is spread with a corresponding channelization code by the channelization block 1704 and then scaled with a corresponding gain factor by the gain control block 1706. The E-DPDCHs may take different spreading factors, (i.e., 2 and 4 in this example). The outputs of the processing for each of the E-DPDCHs are the chips denoted by $x_1(n)$, $x_2(n)$, $x_3(n)$, $x_4(n)$, where n is the chip index.

E-DPDCHs 1 and 3 and E-DPDCHs 2 and 4 are then combined by the channel combining blocks 1708, respectively, and then combined to a complex signal by the I/Q combining block 1710. Combining the channels according to the I/Q path assignment listed in Table 2 yields:

$$x(n)=x_1(n)+jx_2(n)+x_3(n)+jx_4(n). \quad \text{Equation (2)}$$

After the complex STTD encoding by the STTD encoder 1712, the first STTD symbol (even symbol) contains the following four chips:

$$s_0=\{x(0),x(1),x(2),x(3)\}; \quad \text{Equation (3)}$$

and the second STTD symbol (odd symbol) contains the following four chips:

$$s_1=\{x(4),x(5),x(6),x(7)\}. \quad \text{Equation (4)}$$

At antenna 1, $S_0$ is transmitted first and followed by $S_1$, and at antenna 2, $-S_1^*$ is transmitted first and then followed by $S_0^*$. The same procedure is repeated for the even and odd STTD symbols.

Figure 18:
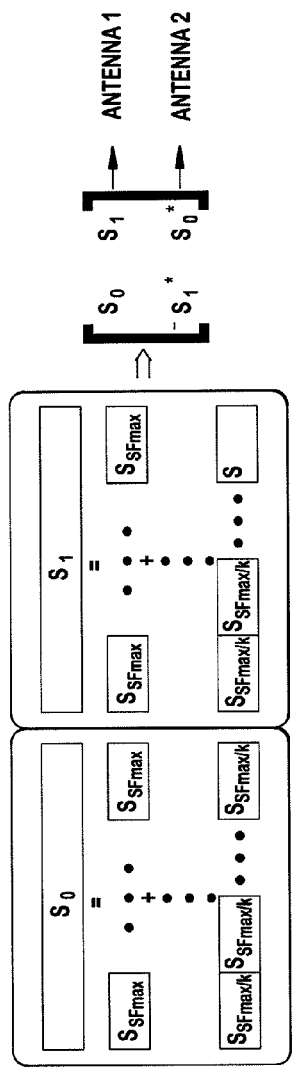
FIG. 18 shows the corresponding block encoder in accordance with this embodiment.

The complex STTD encoding above may be extended to a longer symbol period. The STTD symbol may contain more than one data symbol corresponding to the largest SF, which may allow longer diversity coherence time to combat slow fading channels. The value "T" in FIG. 15, for example, may take an integer multiple of $SF_{max}$ chips. FIG. 18 shows a block STTD encoder in accordance with one embodiment. FIG. 18 shows that the STTD symbol comprises more than one data symbol of $S_{SFmax}$ chips. More than one channel may be mapped to the same spreading factor. The complex STTD encoder may offer better time diversity and the cubic metric of second antenna may be less affected. This embodiment may be extended to the dual binary STTD encoder described above with more bits in one symbol.

Embodiments for multi-antenna transmission schemes with pre-coding in the uplink are disclosed hereafter.

In HSUPA, UL physical layer comprises multiple dedicated physical channels, including control channels, such as DPCCH, E-DPCCH and HS-DPCCH, and data channels, such as DPDCH and E-DPDCH. When a WTRU is configured in a UL MIMO mode, the WTRU performs E-DCH transport format combination (E-TFC) selection to schedule one or more transport blocks in every TTI. When only one transport block is scheduled, it may be mapped to the primary transport block.

Hereinafter, the following terminologies will be used. E-DPDCH1 and E-DPDCH2 are two sets of E-DPDCHs mapped to the primary and secondary E-DCH data stream, which may also be referred to as primary and secondary stream. E-DPDCH1 and E-DPDCH2 may comprise one or more E-DPDCHs. E-DPDCH1$_k$ denotes the $k^{th}$ physical E-DPDCH of the primary E-DCH data stream, and E-DPDCH2$_k$ denotes the $k^{th}$ physical E-DPDCH of the secondary E-DCH data stream. DPDCH1 and DPDCH2 are two set of DPDCHs mapped to the primary and secondary DPDCH data stream, respectively. DPDCH1$_n$ denotes the $n^{th}$ physical DPDCH of the primary DPDCH data stream, where n=0, . . . , $N_{max-dpdch1}$. DPDCH2$_n$ denotes the $n^{th}$ physical DPDCH of the secondary DPDCH data stream, where n=0, . . . , $N_{max-dpdch2}$. It should be noted that the embodiments disclosed herein are mainly described with reference to dual-E-DCH stream transmission, (i.e., both the primary E-DCH data stream and the secondary E-DCH data stream), but the embodiments are equally applicable to a single E-DCH stream transmission.

The transmitter embodiments disclosed below show precoding for the dual-stream transmission, (i.e., two transport blocks: primary and secondary transport blocks). It should be noted that all the transmitter embodiments disclosed below may operate with a single stream or multiple streams. If a single stream needs to be transmitted, one transmit chain in the transmitter is utilized for transmission of the single stream. If dual stream is configured, primary and secondary E-DCH transport blocks pass through the transport channel (TrCH) processing for E-DCH which may include adding cyclic redundancy check (CRC) parity bits to the transport block, code block segmentation, channel coding, physical layer hybrid automatic repeat request (HARQ), rate matching, physical channel segmentation, interleaving and mapping to E-DPDCH1 and E-DPDCH2, and the like. When only one transport block is scheduled, it may be mapped to the primary transport block, using one signal chain.

Figure 19:
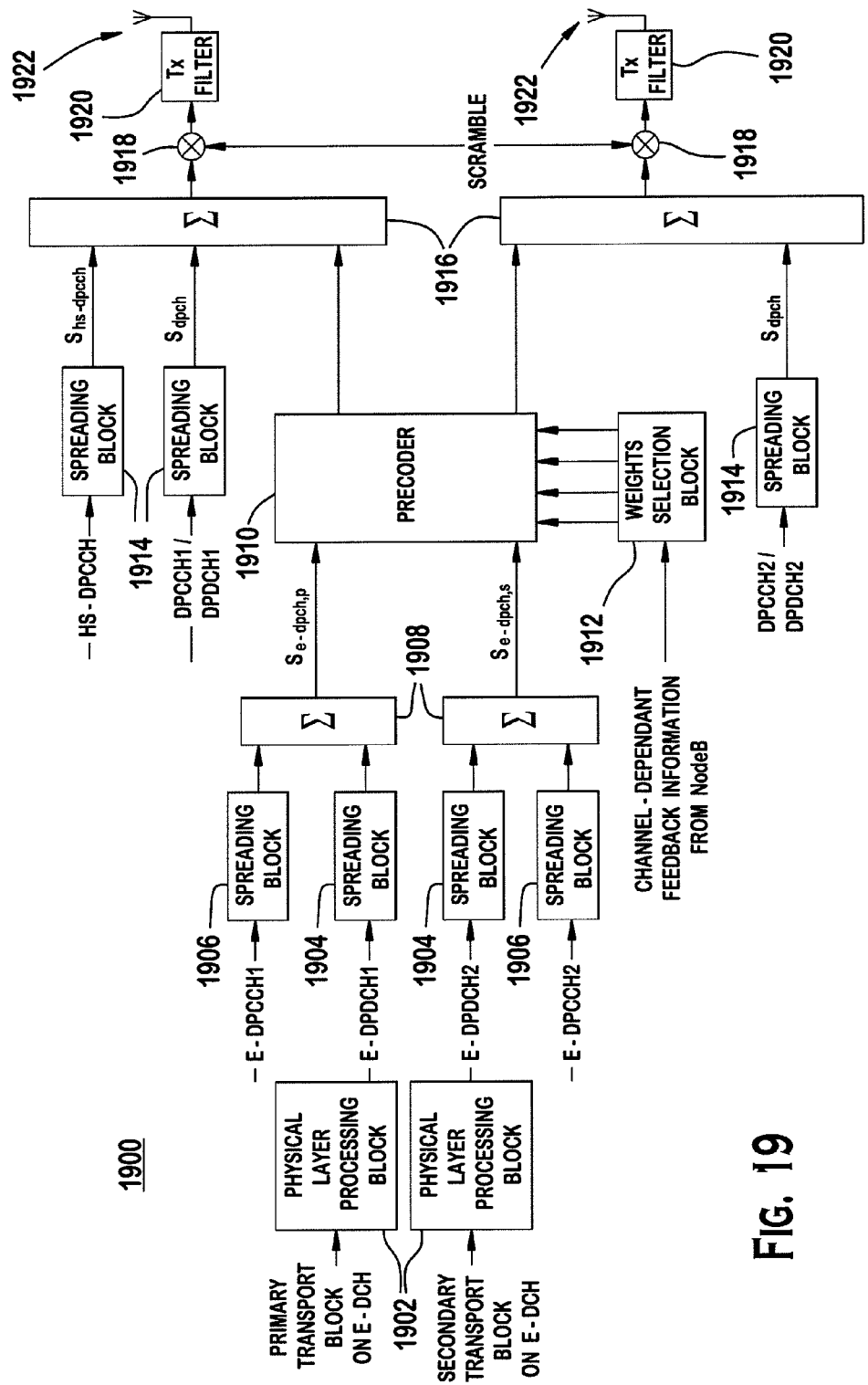
FIG. 19 shows an example transmitter in accordance with one embodiment.

FIG. 19 shows an example transmitter 1900 in accordance with one embodiment. In this embodiment, the transmitter 1900 applies pre-coding operation to both E-DPCCH and E-DPDCH after spreading operations. By applying the same precoding weights to both the E-DPDCH and the E-DPCCH of the same stream, both the E-DPDCH and the E-DPCCH may experience similar propagation conditions. As a result, the conventional power setting rules for the E-DPCCH and the E-DPDCH may be re-used.

The transmitter 1900 comprises physical layer processing blocks 1902 for E-DPDCH, spreading blocks 1904, 1906, 1914, combining blocks 1908, 1916, a precoder 1910, a weights selection block 1912, scramblers 1918, filters 1920, and antennas 1922. Primary and secondary E-DCH transport blocks, if dual-stream is configured, (or a primary E-DCH transport block if one stream is configured), are processed by the physical layer processing blocks 1902 for E-DPDCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured). Either E-DPDCH1 or E-DPDCH2 may comprise one or more E-DPDCHs depending on the E-TFCI selected for the primary and secondary E-DCH transport blocks, which may or may not be the same.

After the physical layer processing, the data streams on the E-DPDCH1 and the E-DPDCH2 are spread by the spreading blocks 1904, respectively. Spreading operations on the E-DPCCH1 and the E-DPCCH2 are also performed by the spreading blocks 1906. The E-DPCCH2 is present if there are two E-DCH transport blocks being transmitted. In case where a single E-DCH stream is transmitted, the E-DPCCH2 may not be transmitted. After the spreading operation, the real-valued chips on the I and Q branches of the E-DPDCH(s) and the E-DPCCH(s) are summed by the combiners 1908 into two complex-valued streams. The two complex-valued streams are then processed by the pre-coder 1910. The pre-coder 1910 applies pre-coding weights determined by the weights selection block 1912 to distribute the signals to the antennas 1922. Depending on the number of transport blocks scheduled for transmission, the weights selection block 1912 may provide one or more sets of pre-coder weights. The pre-coding operation will be explained in detail below.

For every pre-defined or configured period, (e.g., every TTI or slot), the pre-coder weights may be updated for the upcoming transmission. Based on the channel-dependent feedback information from the Node-B, the weights selection block 1912 may select the pre-coding weights, which will be explained in detail below.

After the precoding, and spreading on all other configured physical channels by spreading blocks 1914, the I and Q branches of all the configured physical channels, (e.g., DPCCH, DPDCH, HS-DPCCH, E-DPCCH, and E-DPDCH), are summed by the combiners 1916 into two complex-valued streams, which are then scrambled by the scramblers 1918 with one or two complex-valued scrambling codes. The WTRU then transmits data on both antennas after filtering. The WTRU may signal the pre-coding weights on the UL, which will be explained in detail below.

FIG. 19 shows that the precoding is performed after the spreading and combining of the E-DPDCH(s) and E-DPCCH(s). However, the pre-coding operation may be performed at any stage, either at the symbol or chip level, and may be applied to one or more data or control channels before or after spreading or scrambling operations depending on the pre-coder's location in the transmitter.

Figure 20:
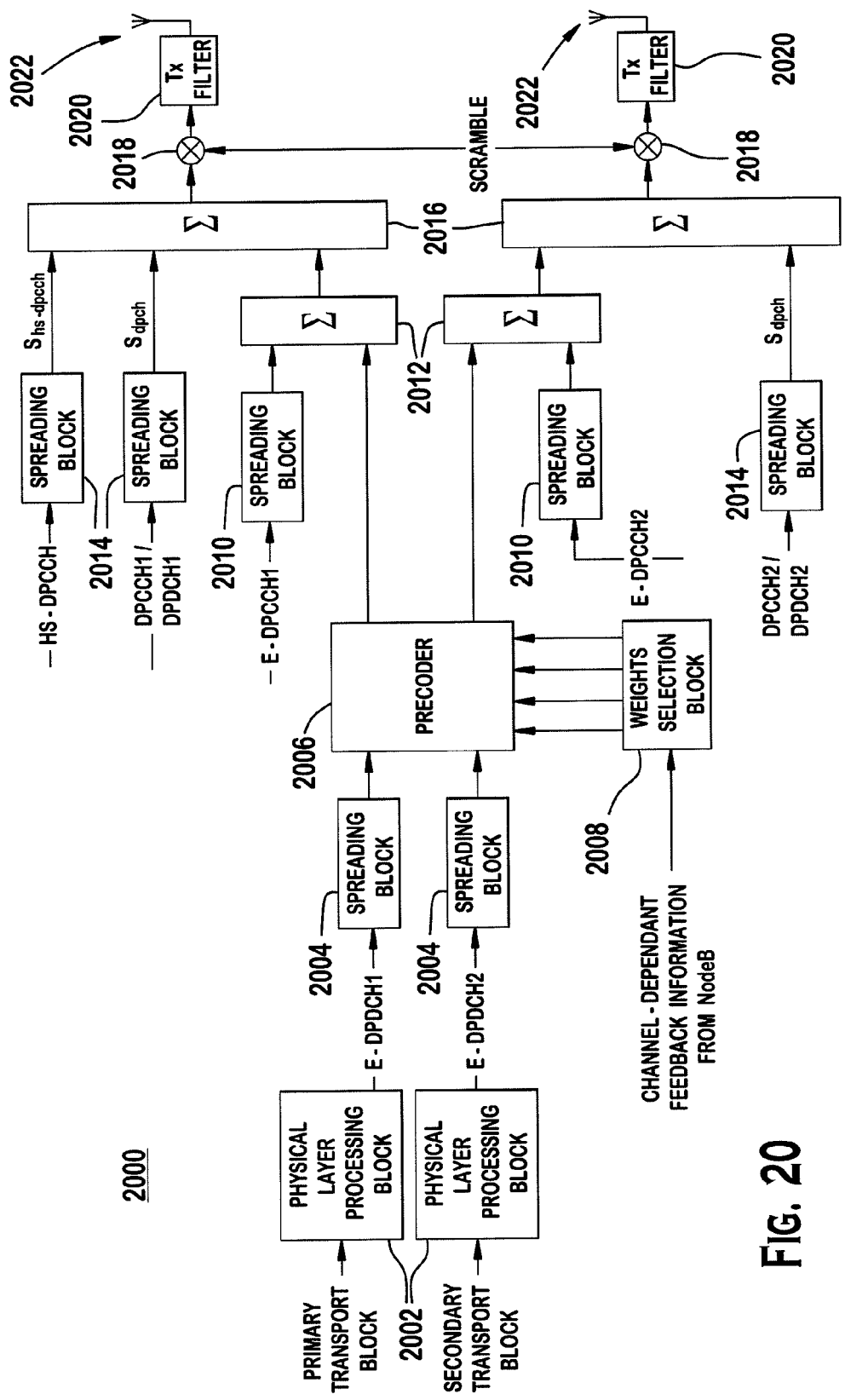
FIG. 20 shows an example transmitter in accordance with another embodiment.

FIG. 20 shows an example transmitter 2000 in accordance with another embodiment. In this embodiment, the pre-coding is applied to the E-DPDCHs after spreading operation. The transmitter comprises physical layer processing blocks 2002 for E-DPDCH, spreading blocks 2004, 2010, 2014, combining blocks 2012, 2016, a precoder 2006, a weights selection block 2008, scramblers 2018, filters 2020, and antennas 2022. Primary and secondary E-DCH transport blocks, if dual-stream is configured, (or a primary E-DCH transport block if one stream is configured), are processed by the physical layer processing blocks 2002 for E-DCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured).

After the physical layer processing, the data streams on the E-DPDCH1 and E-DPDCH2 are spread by the spreading blocks 2004. After the spreading operation, the chip streams are processed by the precoder 2006. The pre-coder 2006 applies pre-coding weights determined by the weights selection block 2008 to distribute the signals to the antennas 2022. Depending on the number of transport blocks scheduled for transmission, the weights selection block 2008 may provide one or more sets of pre-coder weights.

Spreading operation on the E-DPCCH1 and the E-DPCCH2, and all other physical channels is performed by the spreading blocks 2010, 2014, respectively. After the spreading operation on the E-DPCCH(s) and all other configured physical channels, the chips on the I and Q branches of all the configured physical channels, (e.g., DPCCH, DPDCH, HS-DPCCH, E-DPCCH, and E-DPDCH), are summed by the combiners 2012, 2016 into two complex-valued streams, which are then scrambled by the scramblers 2018 with one or two complex-valued scrambling codes. The WTRU then transmits data on both antennas after filtering.

In accordance with this embodiment, since control channels are not pre-coded, the conventional receiver may be used to receive the control channels without a need to inverse the spatial pre-coding operation for the control information. Further, since the E-DPCCH is not pre-coded, it may be decoded using a different receiver than the one for the E-DPDCH, which may expedite decoding of the transport block size, happy bit, and retransmission sequence number (RSN) information, thus reducing the decoding latency.

In addition, the E-DPCCH reliability may be linked to the DPCCH, which is power-controlled and experiences the same channel conditions. In that way the reliability of the control channel becomes independent of the pre-coding. Further, compared with data channels, much stronger protection may be given to the control channels so that they may be demodulated and decoded correctly with much higher probability. The control channels may not be pre-coded since spatial multiplexing of two control channels would generate inter-stream interferences and consequently may cause performance degradation. Instead, to provide additional transmit diversity gain and improve reception reliability to the control channels, an open loop transmit diversity scheme such as space time block coding (STBC) may be implemented.

In addition, since E-DPCCH1 and E-DPCCH2 are sent over the two different antennas without pre-coding, both E-DPCCHs may be used as additional pilot information (in decision directed mode) for improved channel estimation.

Figure 21:
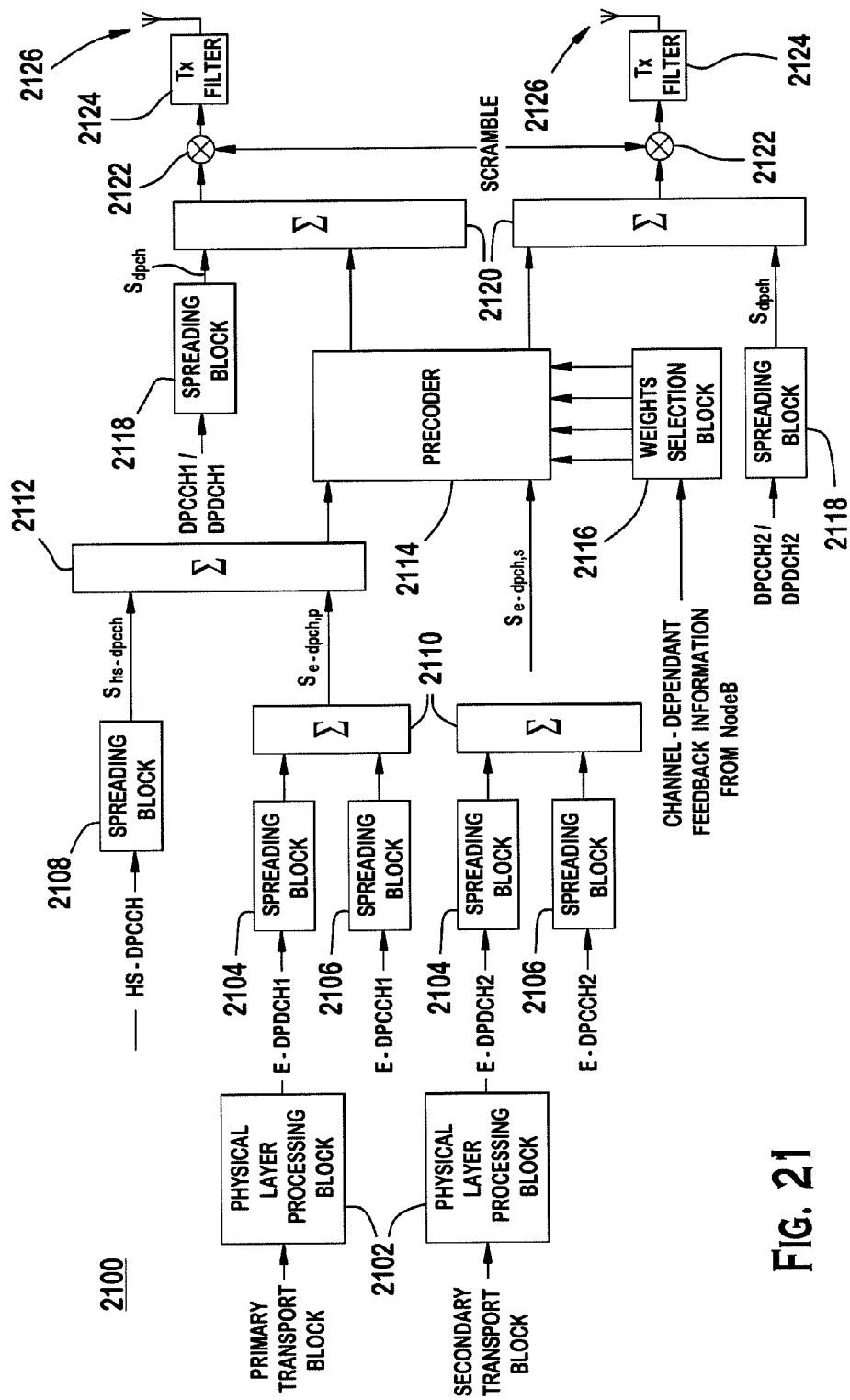
FIG. 21 shows an example transmitter in accordance with another embodiment.

FIG. 21 shows an example transmitter 2100 in accordance with another embodiment. In this embodiment, the pre-coding operation is applied to not only the E-DPCCH and the E-DPDCH but also to the HS-DPCCH after spreading operations. The transmitter 2100 comprises physical layer processing blocks 2002 for E-DPDCH, spreading blocks 2104, 2106, 2108, 2118, combining blocks 2110, 2112, 2120, a precoder 2114, a weights selection block 2116, scramblers 2122, filters 2124, and antennas 2126.

Primary and secondary E-DCH transport blocks, if dual-stream is configured, (or a primary E-DCH transport block if one stream is configured), are processed by the physical layer processing blocks 2102 for E-DCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured). Either E-DPDCH1 or E-DPDCH2 may comprise one or more E-DPDCHs depending on the E-TFCI selected for the transport block, which may or may not be the same, (i.e., the primary transport block may be mapped to one or more E-DPDCHs in E-DPDCH1 and the secondary transport block may be mapped to one or more E-DPDCHs in E-DPDCH2).

After the physical layer processing, the spreading blocks 2104 perform spreading operation on the E-DPDCH1 and E-DPDCH2. Spreading operation on the E-DPCCH1 and E-DPCCH2, after physical layer processing, is performed by the spreading blocks 2106. Spreading operation on the HS-DPCCH, after physical layer processing, is also performed by the spreading block 2108. After the spreading operation, the real-valued chips on the I and Q branches of the E-DPDCH(s), the E-DPCCH(s), and the HS-DPCCH are summed by the combiners 2110, 2112 into two complex-valued streams. The two complex-valued streams are then processed by the pre-coder 2114. The pre-coder 2114 applies pre-coding weights determined by the weights selection block 2116 to distribute the signals to the antennas 2126.

DPCCH(s) and DPDCH(s) are spread by the spreading blocks 2118. The real-valued chips on the I and Q branches of all the configured physical channels, (e.g., DPCCH, DPDCH, HS-DPCCH, E-DPCCH, and E-DPDCH), are summed by the combiners 2120 into two complex-valued streams, which are then scrambled by the scramblers 2122 with one or two complex-valued scrambling codes. The WTRU then transmits data on both antennas after filtering. The WTRU may signal the pre-coding weights on the UL, which will be explained in detail below.

FIG. 21 shows that the precoding is performed after the spreading and combining of the E-DPDCH, E-DPCCH, and HS-DPCCH. However, the pre-coding operation may be performed at any stage, at either symbol or chip level, and may be applied to one or more data or control channels before or after spreading or scrambling operations depending on the pre-coder's location in the transmitter.

This embodiment allows the control channels (including the HS-DPCCH) to take advantage of the additional coverage that pre-coding may provide including the single-stream case.

The precoding weights applied to the E-DPCCH and the HS-DPCCH in case of a single E-DPDCH stream being transmitted may be different from those when two E-DPDCH streams are being transmitted, since weight generation for diversity may be different from the one for spatial-multiplexing. When there is one E-DPDCH stream, it may share the same precoding weights as E-DPCCH and HS-DPCCH.

Figure 22:
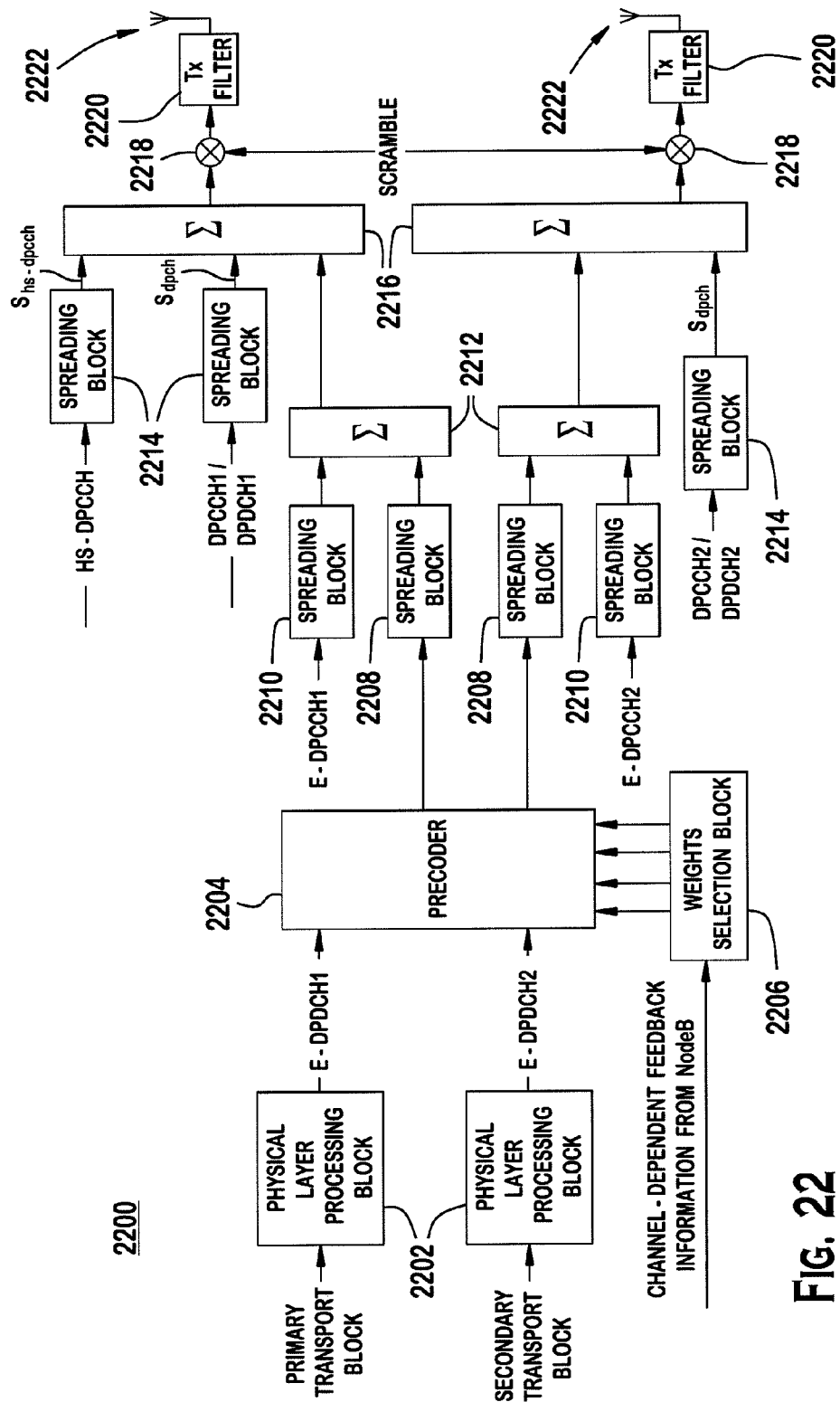
FIG. 22 shows an example transmitter in accordance with another embodiment.

FIG. 22 shows an example transmitter 2200 in accordance with another embodiment. In this embodiment, the pre-coding is applied to the E-DPDCH(s) before spreading operations, (i.e., at the symbol level). The processing power for pre-coding operation may be saved as it is less computationally intensive to apply the weights at the symbol level rather than at the chip level.

The transmitter 2200 comprises physical layer processing blocks 2202 for E-DPDCH, a precoder 2204, a weights selection block 2206, spreading blocks 2208, 2210, 2214, combining blocks 2212, 2216, scramblers 2218, filters 2220, and antennas 2222. Primary and secondary E-DCH transport blocks, if dual-stream is configured, (or a primary E-DCH transport block if one stream is configured), are processed by the physical layer processing blocks 2202 for E-DCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured).

After the physical layer processing, the data streams on the E-DPDCH1 and E-DPDCH2 are processed by the precoder 2204 at symbol level, (i.e., before spreading). The pre-coder 2204 applies pre-coding weights determined by the weights selection block 2206 to distribute the signals to the antennas 2222. Depending on the number of transport blocks scheduled for transmission, the weights selection block 2206 may provide one or more sets of pre-coder weights.

After the precoding, the data streams are spread by the spreading blocks 2208. Spreading operation on the E-DPCCH1 and the E-DPCCH2, and all other physical channels is performed by the spreading blocks 2210, 2214, respectively. After the spreading operation on the E-DPDCH(s), E-DPCCH(s) and all other configured physical channels, the chips on the I and Q branches of all the configured physical channels, (e.g., DPCCH, DPDCH, HS-DPCCH, E-DPCCH, and E-DPDCH), are summed by the combiners 2212, 2216 into two complex-valued streams, which are then scrambled by the scramblers 2218 with one or two complex-valued scrambling codes. The WTRU then transmits data on both antennas 2222 after filtering.

Figure 23:
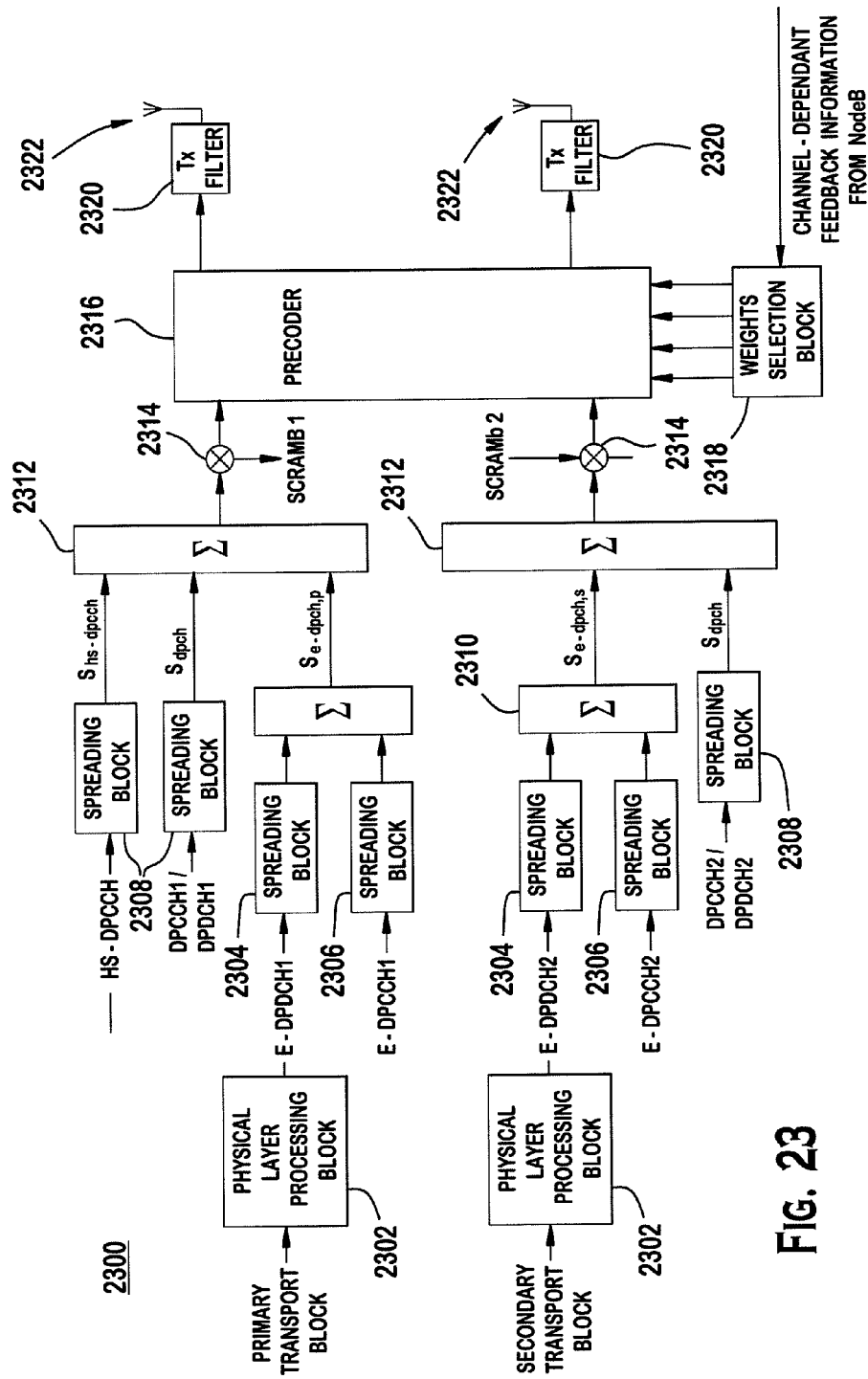
FIG. 23 shows an example transmitter in accordance with another embodiment.

FIG. 23 shows an example transmitter 2300 in accordance with another embodiment. In accordance with this embodiment, the pre-coding operation is applied to all channels including both control and data channels after scrambling operations. The transmitter 2300 comprises physical layer processing blocks 2302 for E-DPDCH, spreading blocks 2304, 2306, 2308, combining blocks 2310, 2312, scramblers 2314, a precoder 2316, a weights selection block 2318, filters 2320, and antennas 2322. Primary and secondary E-DCH transport blocks, if dual-stream is configured, (or a primary E-DCH transport block if one stream is configured), are processed by the physical layer processing blocks 2302 for E-DCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured).

After the physical layer processing, the data streams on the E-DPDCH1 and E-DPDCH2 are spread by the spreading blocks 2304. Spreading operation on the E-DPCCH1 and the E-DPCCH2, and all other physical channels is performed by the spreading blocks 2306, 2308, respectively. After the spreading operation on the E-DPDCH(s), E-DPCCH(s) and all other configured physical channels, the chips on the I and Q branches of all the configured physical channels, (e.g., DPCCH, DPDCH, HS-DPCCH, E-DPCCH, and E-DPDCH), are summed by the combiners 2310, 2312 into two complex-valued streams, which are then scrambled by the scramblers 2314 with one or two complex-valued scrambling codes.

After the scrambling operation, the pre-coding operation is performed by the precoder 2316 on the combined data stream of all channels. The pre-coder 2316 applies pre-coding weights determined by the weights selection block 2318 to distribute the signals to the antennas 2322. Depending on the number of transport blocks scheduled for transmission, the weights selection block 2318 may provide one or more sets of pre-coder weights. The transmitter 2300 then transmits data on both antennas after filtering.

Two different scrambling codes may be used for the two antennas. Alternatively, a single scrambling code may be used for the antennas. If two different scrambling codes are configured by the network, the same orthogonal variable spreading factor (OVSF) codes, (i.e., the channelization codes), used on the DPCCH, DPDCH and E-DPCCH for the primary stream may be reused for those for the secondary stream if the dual-stream is configured with different modulation and coding scheme (MCS). Furthermore, if a dual-stream is configured, the OVSF codes used for the primary stream may be reused for the secondary stream under certain conditions including, but not limited to: if both streams use the same transport format, if both stream use the same MCS, and/or if both stream use the same E-TFCI. Otherwise, the WTRU may use a different set of channelization code(s) for the second stream. The channelization code(s) for the second set of E-DPDCHs may be taken from a different OVSF branch altogether, selected in such a way to minimize inter-stream interference and/or cubic metric impacts.

With two different scrambling codes, from the network or the Node-B perspective, the two streams may be interpreted as if they were coming from two different WTRUs. From an implementation perspective, this may allow minimal changes in the Node-Bs receiver architecture (as small as a software upgrade) and at the system level may not impact the resources allocation and cell planning so much as the uplink is not typically limited by the number of scrambling codes but rather from the interference. With the special case of a diagonal precoder, $$\left(\text{e.g.,}\ \begin{bmatrix} 1 & 0 \\ 0 & 1 \end{bmatrix}\right),$$

this transmitter structure from the physical layer perspective becomes almost equivalent to having two separate WTRUs. This may be advantageous from both the Node-B and the WTRU implementation perspective as it would simplify implementation significantly.

Figure 24:
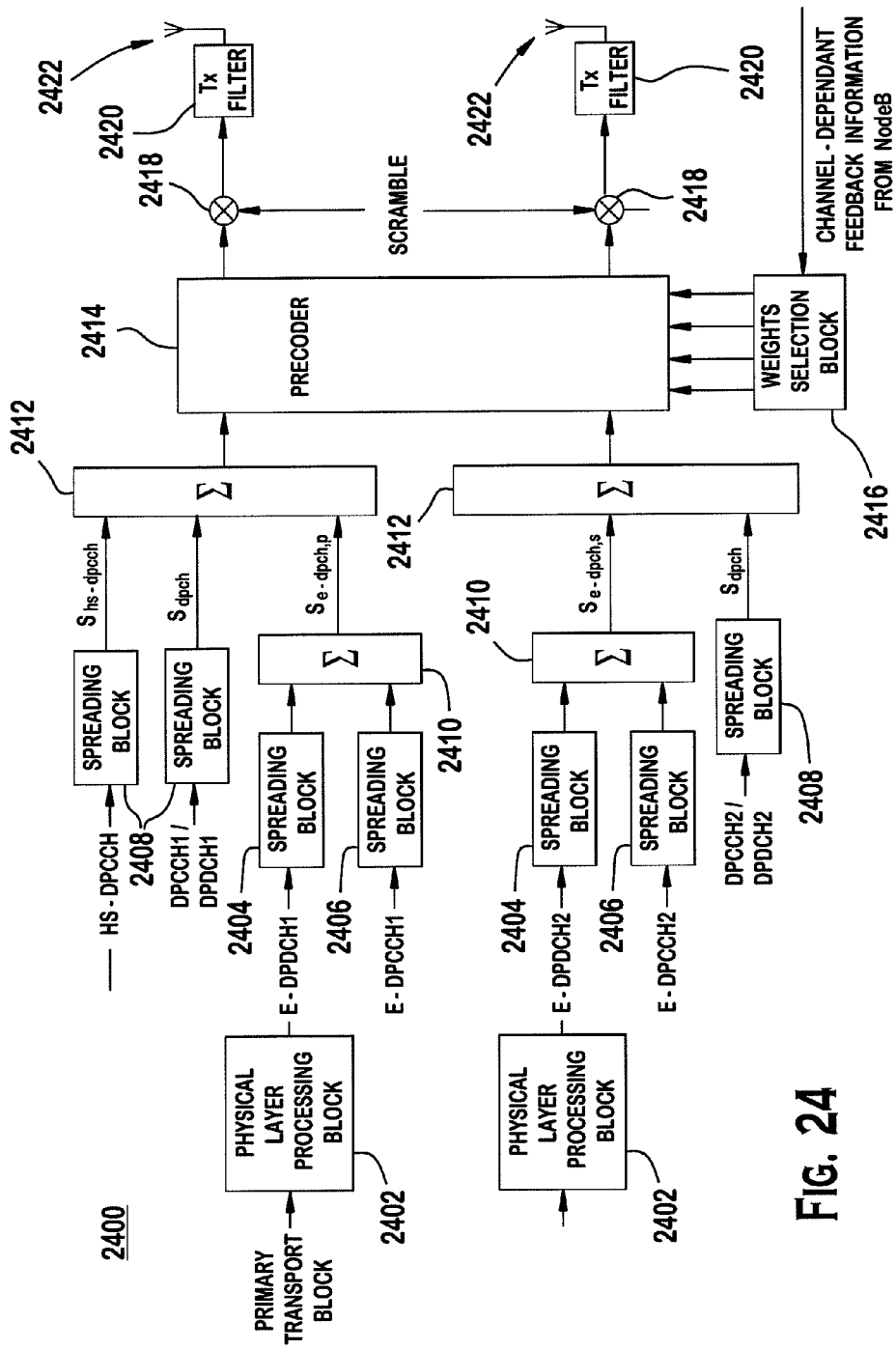
FIG. 24 shows an example transmitter in accordance with another embodiment.

FIG. 24 shows an example transmitter 2400 in accordance with another embodiment. In accordance with this embodiment, the pre-coding operation is applied to all channels including both control and data channels before scrambling operations. Optionally, pre-coding operation may be done before scrambling operations, which is mathematically equal when using the same scrambling. The transmitter 2400 comprises physical layer processing blocks 2402 for E-DPDCH, spreading blocks 2404, 2406, 2408, combining blocks 2410, 2412, a precoder 2414, a weights selection block 2416, scramblers 2418, filters 2420, and antennas 2422. Primary and secondary E-DCH transport blocks, if dual-stream is configured, (or a primary E-DCH transport block if one stream is configured), are processed by the physical layer processing blocks 2402 for E-DCH. The physical layer processing may include adding CRC parity bits to the transport block, code block segmentation, channel coding, physical layer HARQ, rate matching, physical channel segmentation, interleaving and mapping to E-DPDCH1 and E-DPDCH2 if dual-stream is configured, respectively, (or to E-DPDCH1 if a single stream is configured).

After the physical layer processing, the data streams on the E-DPDCH1 and E-DPDCH2 are spread by the spreading blocks 2404. Spreading operation on the E-DPCCH1 and/or the E-DPCCH2, and all other physical channels is performed by the spreading blocks 2406, 2408, respectively. After the spreading operation on the E-DPDCH(s), E-DPCCH(s) and all other configured physical channels, the chips on the I and Q branches of all the configured physical channels, (e.g., DPCCH, DPDCH, HS-DPCCH, E-DPCCH, and E-DP-DCH), are summed by the combiners 2410, 2412 into two complex-valued streams.

A pre-coding operation is then performed by the precoder 2414 on the combined two complex data streams of all channels. The pre-coder 2414 applies pre-coding weights determined by the weights selection block 2416 to distribute the signals to the antennas 2422. Depending on the number of transport blocks scheduled for transmission, the weights selection block 2416 may provide one or more sets of pre-coder weights. After the precoding, the data streams are scrambled by the scramblers 2418 with one or two complex-valued scrambling codes. The transmitter 2400 then transmits data on both antennas 2422 after filtering.

When two different scrambling codes are used for both antennas, separation of each stream may be achieved via scrambling code in the transmitter of FIG. 23, whereas per-antenna separation may be achieved via scrambling code in the transmitter of FIG. 24. Having a means to separate the signals at the antenna may be advantageous for channel estimation when the DPCCH is pre-coded, as is the case in this embodiment.

In accordance with this embodiment, the Node-B receiver may separate signals based on antenna, and even if the pilot signals are pre-coded, the channel matrix may be estimated correctly so that the Node-B may determine which set of precoding weights to signal to the WTRU. In accordance with this embodiment, the effective space-time channel for each stream may be estimated with a single DPCCH for detection, and the channel matrix may be estimated by separating via scrambling codes. This structure also has an advantage that for single stream transmission, minimum or no change on the receiver side is needed. This may have significant advantage for reducing implementation cost for certain technologies which are widely deployed such as UTRA.

Figure 25:
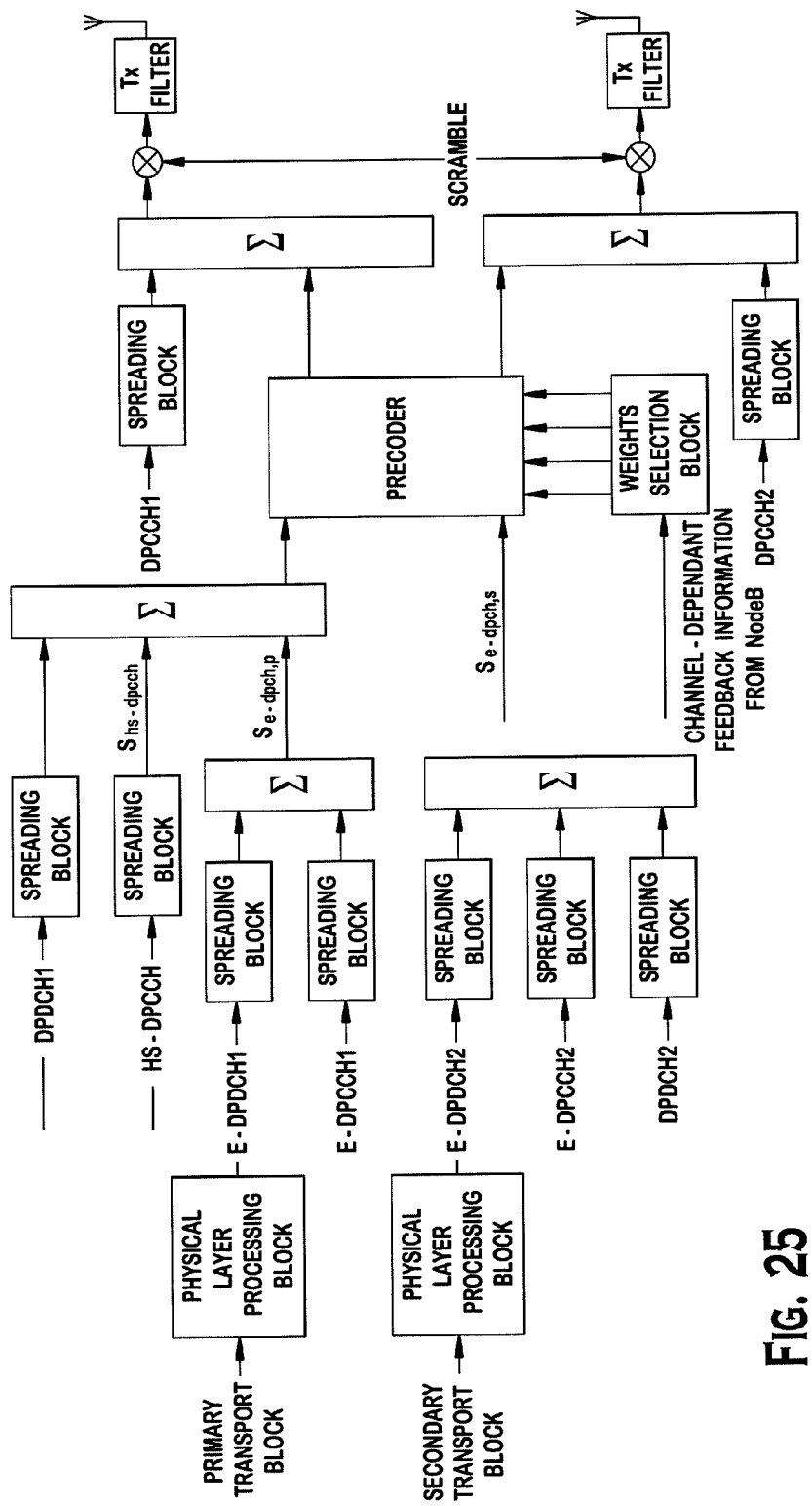
FIG. 25 shows an example transmitter in accordance with another embodiment.

FIG. 25 shows an example transmitter 2500 in accordance with another embodiment. The transmitter 2500 is similar to the transmitter 2100 of FIG. 21. A difference is that pre-coding is also applied to DPDCH, if configured, after spreading operations. This allows the DPDCHs to benefit from pre-coding and the closed loop transmit gain that may result. In other words, transmitter 2500 applies pre-coding to all configured channels except DPCCH1 and DPCCH2.

Transmitted signal structure and spreading operations are explained hereafter. For any transmitter embodiments described above, the transmitted signal, (i.e., the possible dedicated physical channels which may be configured simultaneously for a WTRU), may comprise one or more of, in any combination: DPCCH1, DPCCH2, DPDCH1, DPDCH2, HS-DPCCH, E-DPDCH1, E-DPDCH2, E-DPCCH1, and/or E-DPCCH2.

DPCCH1 and DPCCH2 are transmitted using OVSF code Cc1 and Cc2, respectively, to support channel estimation at the Node-B by using pilot signal and carry the control information. If pilot signal (at the symbol level) in DPCCH1 and DPCCH2 are orthogonal, the OVSF code Cc1 and Cc2 may be the same. If the same pilot signal is used in both DPCCH1 and DPCCH2, the OVSF code Cc1 and Cc2 should be orthogonal. Both DPCCH1 and DPCCH2 may be transmitted in pair unless during the period where the UL transmission is not allowed, for example, when the WTRU is in DTX or compressed mode.

The control information carried on the DPCCH1 may include transport format combination index (TFCI), feedback information (FBI) and transmit power control (TPC). The DPCCH2 may carry a pilot signal. Alternatively, the DPCCH2 may carry another set of control information besides the pilot signal, which may include part or all of the control information carried on the DPCCH1, and/or other new control information, such as pre-coding weight, etc.

Depending on the number of DPDCH data streams being transmitted, one or two set of DPDCH(s) may be transmitted on two antennas. Two sets of DPDCH, (i.e. DPDCH1 and DPDCH2), may be respectively transmitted by using OVSF code set Cd1 and Cd2. Either DPDCH1 or DPDCH2 may comprise zero, one or more DPDCHs which may or may not be the same. The actual number of configured DPDCHs in DPDCH1 and DPDCH2, (denoted $N_{max\text{-}dpdch1}$ and $N_{max\text{-}dpdch2}$), may be respectively equal to the largest number of DPDCHs from all the transport format combinations (TFCs) in the transport format combination set (TFCS). Alternatively, neither DPDCH1 nor DPDCH2 may be transmitted when no DPDCH data stream is configured. Alternatively, DPDCH1 may be transmitted using OVSF code set Cd1 when a single DCH data stream is configured. To maintain the backward compatibility to 3GPP Release 9, when an E-DCH is configured, either $N_{max-dpdch1}$ or $N_{max-dpdch2}$ may be 0 or 1, or $N_{max-dpdch1}$ may be 0 or 1 while $N_{max-dpdch2}$ is 0.

The HS-DPCCH may be transmitted using OVSF code Chs to carry HARQ ACK/NACK, channel quality indicator (CQI) and precoding indicator (PCI) if the WTRU is in a downlink (DL) MIMO mode.

The E-DPCCH1 and E-DPCCH2 may be respectively transmitted using OVSF code Cec1 and Cec2 to provide the control information to the associated the E-DCH. For a single stream case, the E-DPCCH1 may be transmitted. Alternatively, a single E-DPCCH may be used to carry the information for both streams, in which case Cec1 may be used.

A new E-DPCCH frame/slot format and/or coding scheme may be used to carry all the necessary information. In accordance with one embodiment, a new slot format allowing more information symbols to be carried in a single TTI is used. For example, the new slot format may use a smaller spreading factor, (e.g., 128 instead of 256), to allow twice the number of information symbols to be carried in one TTI of the E-DPCCH. In that case, the conventional coding scheme for the E-DPCCH may be re-used for each stream independently.

In accordance with another embodiment, time-division multiplexing may be used to transmit the two E-DPCCHs. For instance, E-DPCCH1 and E-DPCCH2 may be carried in the first and second half of the TTI, respectively. Another field may be included in the E-DPCCH1 and/or E-DPCCH2 to indicate the number of streams transmitted in the current TTI. In case a single stream is being transmitted, the E-DPCCH1 may be repeated in the second half of the subframe. In such cases, when E-DPCCH power boosting is configured, the WTRU may calculate the required power boosting for each E-DPCCH and apply the largest one of the two for both E-DPCCHs that are time-multiplexed in the same E-DPCCH subframe.

In accordance with another embodiment, a new coding scheme may be used whereby the information for both E-DCH streams is jointly encoded in a single E-DPCCH. A new field may be introduced in the new E-DPCCH to indicate the number of streams carried in the TTI. This new E-DPCCH may carry, for example, a number of streams indicator bit, a single "Happy bit" value, one E-TFCI per stream and one retransmission sequence number (RSN) per stream for up to 20 bits of information. This new E-DPCCH may be carried using the conventional slot format with spreading factor of 256 or alternatively using a lower spreading factor. This new E-DPCCH may be encoded using an existing code or a new code, (e.g., a new (30, 20) code for the case where SF 256 is used, or a new (60,20) code in case SF of 128 is used). The WTRU may apply a larger power offset to the E-DPCCH when two streams are being transmitted to ensure reliable reception. When a single stream is transmitted, the fields carrying the E-TFCI and the RSN for the second stream may be DTXed.

Depending on the number of streams to be transmitted, one or two set, (i.e., multiple codes), of E-DPDCH may be transmitted. For dual-stream case where the WTRU performs the E-TFC selection, which results in two transport blocks to be transmitted and the WTRU applies the OVSF configuration corresponding to dual stream transmission and transmits the dual streams, the E-DPDCH1 and the E-DPDCH2 may be respectively transmitted using OVSF code set Ced1 and Ced2. Either E-DPDCH1 or E-DPDCH2 may comprise one or more E-DPDCHs depending on the E-TFCI selected for either primary or secondary E-DCH transport block, which may or may not be of the same size. In the dual stream case, each E-DCH transport block may have a different size or E-TFCI, so the channelization code set Ced1 and Ced2 may or may not be different. Alternatively, for a single stream case where one transport block of E-DCH is scheduled, the E-DPDCH1 may be transmitted by using OVSF code set Ced1 which may be, for example, the conventional OVSF code set used for single carrier HSUPA without MIMO configured.

If the spreading factor determination results in two different channelization codes Ced1 and Ced2 for the E-DPDCH1 and E-DPDCH2, respectively, to ensure the mathematical or functional equivalence between the case of precoding in symbol level before spreading and the case of precoding in chip level after spreading, Ced1, Ced2 may be chosen such that one of them may be the repetition of the other.

When the WTRU is configured in a closed-loop transmit diversity (CLTD) mode or a single stream MIMO mode, neither E-DPDCH2 nor E-DPCCH2 may be configured or transmitted. More specifically, when a single E-DCH stream is being transmitted, the second set of E-DCH data and control channels may not be transmitted by the WTRU.

The DPCCH2 may be mapped to I or Q branch. In order to select the best channelization code for the DPCCH2, first, the available channelization code space is searched for the DPCCH2 by not selecting the code used by other channels on either I or Q branches to reduce the phase error during channel estimation. Depending on whether a DCH is configured or not, the available channelization code space obtained in the first step may be different. Among the available code space, the best channelization code is selected to obtain a smaller cubic metric (CM) value than other codes given a transmitter structure and configuration. For example, when using the transmitter 2400 with a CLTD mode configuration, if the DPCCH2 is configured on an I branch, the channelization code of the DPCCH2 may be selected as $C_{ch,256,32}$, and if the DPCCH2 is configured on a Q branch, the channelization code of the DPCCH2 may be selected as $C_{ch,256,2}$.

The OVSF codes Cc1, Cc2, Cd1, Cd2, Chs, Cec1, Cec2, Ced1, and Ced2 may be fixed in the standards or configured by the network.

Figure 26:
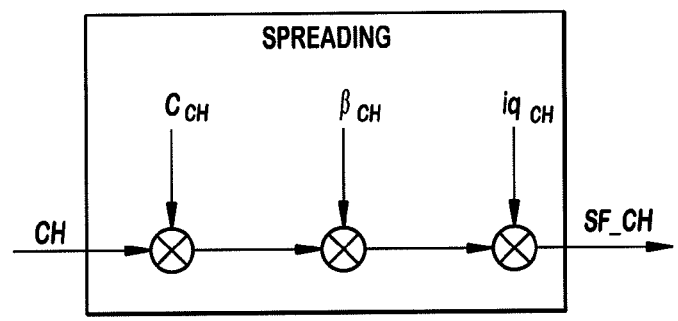
FIG. 26 shows the spreading operation, which includes spreading with a given channelization code, weighting, and IQ phase mapping.

FIG. 26 shows the spreading operation, which includes spreading with a given channelization code, weighting, and IQ phase mapping. The spreading operation is applied to every physical channel. The spreading operation may be represented by:

$$SF\_CH = CH * C_{CH} * \beta_{CH} * iq_{CH},\qquad\text{Equation (5)}$$

where, CH is the real-valued bits of the physical channel to be spread and weighted, $C_{CH}$ is the OVSF channelization code fixed in the standards or configured by the network, $\beta_{CH}$ is a gain factor that may be signaled or calculated based on the signaled parameters and the transport block size or number of information bits, $iq_{CH}$ is a complex value for the I or Q branch mapping, where $iq_{CH}=1$ or $iq_{CH}=j$.

After spreading operation, the streams of real-valued chips on I and Q branches are summed into two complex-valued streams which are then scrambled by one or two complex-valued scrambling codes configured by the network. The operation is carried out as follows: the WTRU receives a configuration message carrying scrambling code information. The WTRU applies the scrambling code to the complex-valued streams. Scrambling may be carried out after the spreading operation for each channel separately, after the spread channels are all summed together, or after summing of all non-precoded and pre-coded channels as shown in different transmitter embodiments described above. Optionally, the WTRU may apply the pre-coding weights to two complex scrambled streams if transmitter 2300 is used. The WTRU then transmits data on both antennas after filtering with transmit pulse, (e.g., a root raised-cosine filter).

Figure 27:
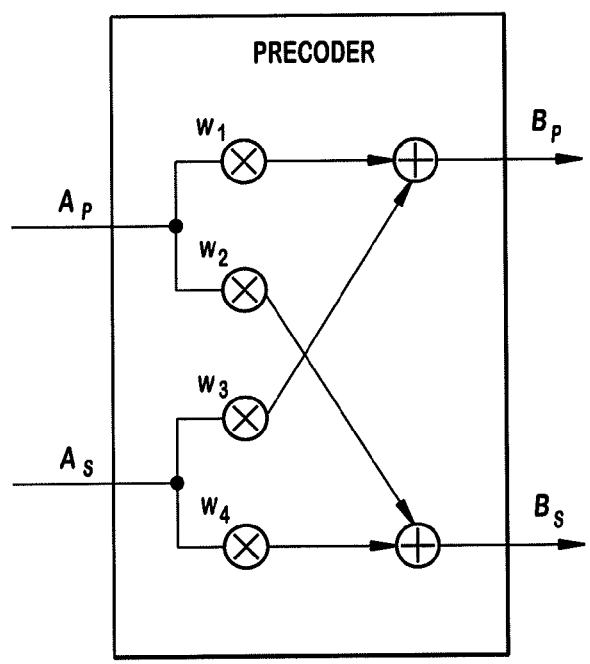
FIG. 27 shows an example pre-coder for the dual stream case.

Pre-coding operations are explained hereafter. FIG. 27 shows an example pre-coder for the dual stream case. The precoding operation may be represented as follows:

$$\begin{bmatrix} B_p \\ B_s \end{bmatrix} = W \begin{bmatrix} A_p \\ A_s \end{bmatrix} = \begin{bmatrix} w_1 & w_3 \\ w_2 & w_4 \end{bmatrix} \begin{bmatrix} A_p \\ A_s \end{bmatrix} = \begin{bmatrix} w_1 A_p + w_3 A_s \\ w_2 A_p + w_4 A_s \end{bmatrix}, \quad \text{Equation (6)}$$

$$\text{where } W = \begin{bmatrix} w_1 & w_3 \\ w_2 & w_4 \end{bmatrix}$$

is the pre-coding matrix. $A_p$ and $A_s$ may be complex or real values. After applying the pre-coding operation, $A_p$ and $A_s$ are distributed on the first and second transmit antenna, which are represented by $B_p = w_1 A_p + w_3 A_s$ and $B_s = w_2 A_p + w_4 A_s$, respectively.

When $A_s = 0$, (i.e., a single stream case), $B_p = w_1 A_p$ and $B_s = w_2 A_p$ are respectively sent on the first and second antenna.

Figure 28:
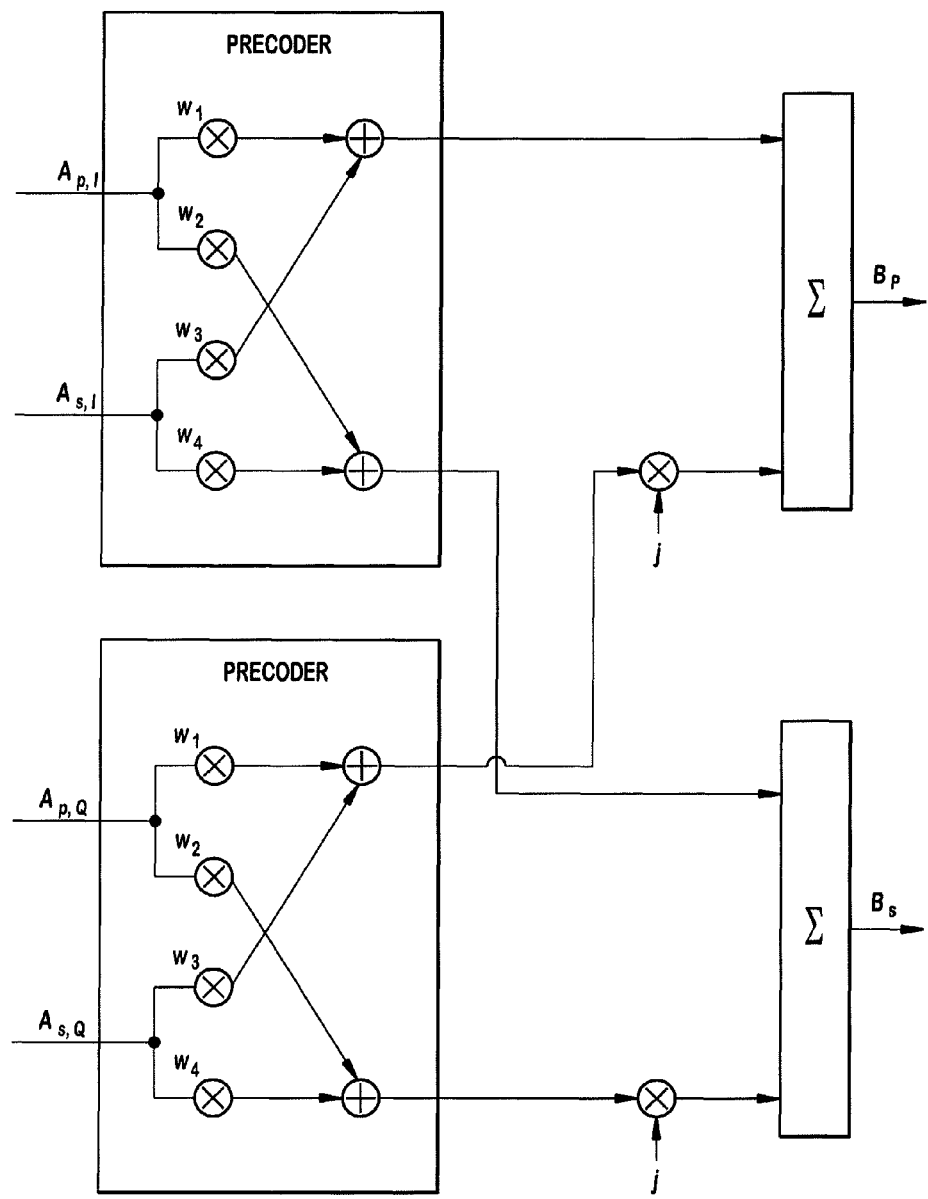
FIG. 28 shows another example pre-coder for the dual stream case.

FIG. 28 shows another example pre-coder for the dual stream case. In HSUPA, real-valued I/Q branches are separated before I/Q multiplexing. The pre-coding operation is applied to the I and Q branches of each of the primary and secondary streams $A_p$ and $A_q$, respectively, then I/Q multiplexing is performed on the pre-coded I/Q branch data. In accordance with this embodiment, the I/Q branches are processed in parallel, reducing the implementation complexity. Mathematically, the outputs of the two pre-coders are the same given the same input, which may be represented as follows:

$$\begin{bmatrix} B_p \\ B_s \end{bmatrix} = W \begin{bmatrix} A_p \\ A_s \end{bmatrix} = \begin{bmatrix} w_1 & w_3 \\ w_2 & w_4 \end{bmatrix} \quad \text{Equation (7)}$$

$$\begin{bmatrix} A_{p,I} + j A_{p,Q} \\ A_{s,I} + j A_{s,Q} \end{bmatrix} = \begin{bmatrix} w_1 & w_3 \\ w_2 & w_4 \end{bmatrix} \left( \begin{bmatrix} A_{p,I} \\ A_{s,I} \end{bmatrix} + j \begin{bmatrix} A_{p,Q} \\ A_{s,Q} \end{bmatrix} \right) =$$

$$\begin{bmatrix} w_1 & w_3 \\ w_2 & w_4 \end{bmatrix} \begin{bmatrix} A_{p,I} \\ A_{s,I} \end{bmatrix} + j \begin{bmatrix} w_1 & w_3 \\ w_2 & w_4 \end{bmatrix} \begin{bmatrix} A_{p,Q} \\ A_{s,Q} \end{bmatrix}$$

where $A_p = A_{p,I} + j A_{p,Q}$, $A_s = A_{s,I} + j A_{s,Q}$, and $A_{p,I}$ and $A_{s,I}$ are the real part (I branch) of the complex-valued $A_p$ and $A_s$, $A_{p,Q}$ and $A_{s,Q}$ are the image part (Q branch) of the complex-valued $A_p$ and $A_s$. The above two pre-coder embodiments may be used for one or more physical channels, and may be used in combination with any transmitter structures described herein.

In order to save on computing complexity, the pre-coding may be performed at the symbol level as opposed to the chip level. For these to be equivalent, the channelization codes (or spreading codes), gain factor and I/Q mapping need to be the same for both channels to pre-code, or the precoding weight matrix W is diagonal.

Figure 29:
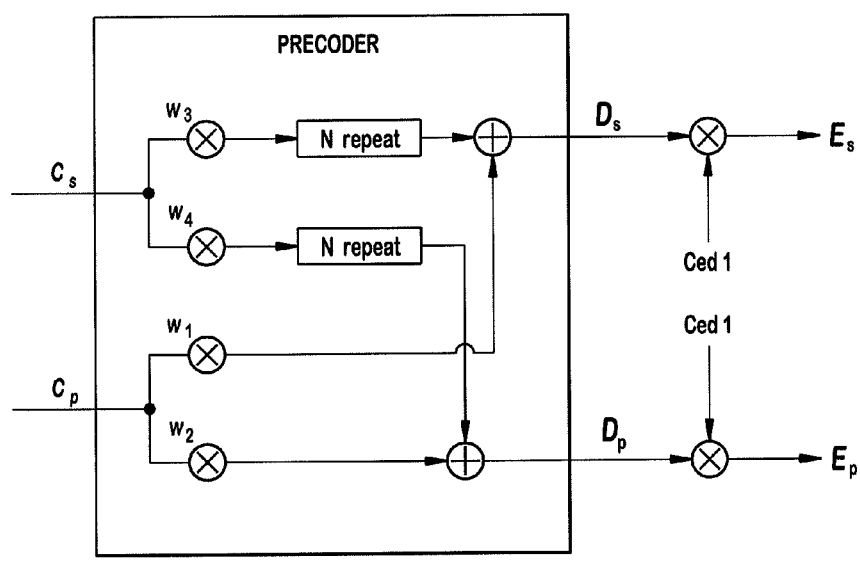
FIG. 29 shows another example pre-coder for the dual stream case.

FIG. 29 shows another example pre-coder for the dual stream case. If the two streams use different spreading factors, for the pre-coding-before-spreading be equivalent to the spreading-before-pre-coding the spreading code of the highest data rate channel needs to be constructed from a repetition of the spreading code for the lowest data rate channel. For example, assuming two channels with spreading factors 2 and 4 are being transmitted. If the channelization code for the channel with a spreading factor 2 is $C_{ch2} = [1\ -1]$, the channelization code for the channel with a spreading factor 4 may be $C_{ch4} = [C_{ch2}\ C_{ch2}] = [1\ -1\ 1\ -1]$.

In FIG. 29, the precoding is applied before spreading and two data streams $C_s$ and $C_p$ (assuming $C_{ed1}$ and $C_{ed2}$ are OVSF codes for data streams $C_s$ and $C_p$, respectively) use OVSFs with different spreading factors $SF_{ed1}$ and $SF_{ed2}$ with $SF_{ed2} = N \times SF_{ed1}$. The data stream with the lowest (or lower) symbol rate ($C_s$) is weighted and repeated N times before mixed with the other stream ($C_p$) that is weighted. At the output of the precoder, both streams $D_s$ and $D_p$ are spread with the channelization code of the smallest spreading factor of $SF_{ed1}$ and $SF_{ed2}$ ($C_{ed1}$ in this example).

Figure 30:
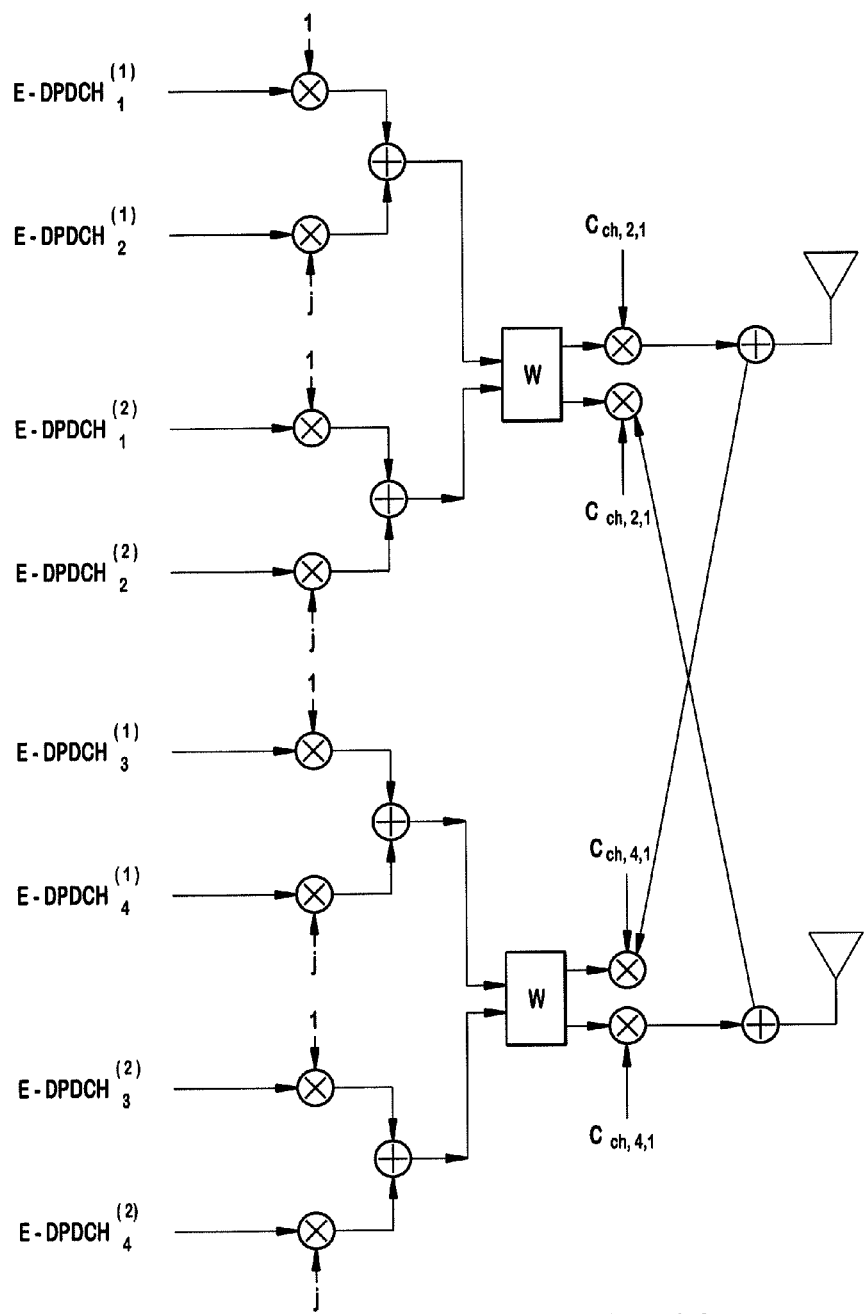
FIG. 30 shows an example transmitter for the two stream case.

The above embodiment may be applied for example to the E-DCH transmission with four E-DPDCHs. FIG. 30 shows an example transmitter for the two stream case. For applying pre-coding before spreading, the channels are grouped first with respect to their spreading factor, (i.e., channels of the same spreading factors are grouped together), and the data streams are pre-coded and then spread.

E-DPDCH$_k^{(l)}$ is defined as the $k^{th}$ E-DPDCH for the $l^{th}$ stream. Four E-DPDCHs are used for each of the two data streams. For each stream, the first and second E-DPDCHs are spread using the same channelization code of the same spreading factor, (e.g., 2), and the first E-DPDCH is mapped on the I branch and the second E-DPDCH is mapped on the Q branch, and the third and fourth E-DPDCHs are spread using the same channelization code of the same spreading factor, (e.g., 4), and the third E-DPDCH is mapped on the I branch and the fourth E-DPDCH is mapped on the Q branch. In FIG. 30, the first and second E-DPDCHs of the first stream are combined by a combiner 3002 into a complex signal, and the first and second E-DPDCHs of the second stream are combined by a combiner 3004 into a complex signal and then pre-coded by a pre-coder 3010, and the third and fourth E-DPDCHs of the first stream are combined by a combiner 3006 into a complex signal, and the third and fourth E-DPDCHs of the second stream are combined by a combiner 3008 into a complex signal and then pre-coded by a pre-coder 3012. After the pre-coding, the first and second E-DPDCHs of the two streams are spread by channelization blocks 3014, 3016 with a channelization code of the same spreading factor, (in this example, a channelization code of spreading factor 2 ($C_{ch,2,1}$)), and the third and fourth E-DPDCHs of the two streams are spread by channelization blocks 3018, 3020 with a channelization code of the same spreading factor, (in this example, a channelization code of spreading factor 4 ($C_{ch,4,1}$)). After spreading, the antenna components are combined by the combiners 3022, 3024 for transmission.

Other combination of pairs of E-DCHs may also be implemented. Up to two E-DPDCHs from the same stream mapped on different I/Q branches may be combined together for pre-coding. The inputs to the pre-coder may comprise two complex signals from each stream. If the spreading factor for all inputs to the pre-coder is the same, the channelization codes for input channels to the same pre-coder may be the same. If all inputs to the pre-coder do not have the same data rate or spreading factor, the lower data rate input(s) may be repeated for matching the highest data rate input.

A combination of the approaches illustrated in FIG. 28 and FIG. 29 may be used to optimize the computational complexity of applying the precoding operation.

It is further noted that the embodiments illustrated in FIGS. 28-30 may also be used to other pair of channels besides the E-DPDCH when the spreading code properties permits.

Embodiments for generating pre-coding weights are described. The pre-coding weights matrix W may be chosen from a set of pre-coder matrices, (i.e., codebook), or be determined without a codebook.

If codebook-based pre-coding is used, unitary matrices may be used as the pre-defined pre-coder matrix. One example codebook is as follows:

$$W \in \left\{ \frac{1}{\sqrt{2}}\begin{bmatrix} 1 & 1 \\ 1 & -1 \end{bmatrix}, \frac{1}{\sqrt{2}}\begin{bmatrix} 1 & 1 \\ j & -j \end{bmatrix}, \begin{bmatrix} \frac{1}{\sqrt{2}} & \frac{1}{\sqrt{2}} \\ \frac{1+j}{2} & \frac{-1-j}{2} \end{bmatrix}, \begin{bmatrix} \frac{1}{\sqrt{2}} & \frac{1}{\sqrt{2}} \\ \frac{1-j}{2} & \frac{-1+j}{2} \end{bmatrix}, \begin{bmatrix} 1 & 0 \\ 0 & 1 \end{bmatrix} \right\}.$$

DL MIMO pre-coding matrix may be reused for the UL MIMO, whose weights $w_1$, $w_2$, $w_3$ and $w_4$ of the 2×2 pre-coding matrix are defined as follows:

$$w_3 = w_1 = 1/\sqrt{2} \qquad \text{Equation (8)}$$

$$w_4 = -w_2, \qquad \text{Equation (9)}$$

$$w_2 \in \left\{ \frac{1+j}{2}, \frac{1-j}{2}, \frac{-1+j}{2}, \frac{-1-j}{2} \right\}. \qquad \text{Equation (10)}$$

If a single transport block is scheduled in one TTI, the pre-coding vector ($w_1$, $w_2$) may be used for transmission. If two transport blocks are scheduled in one TTI, two orthogonal pre-coding vectors may be used to transmit the two transport blocks. The pre-coding vector ($w_1$, $w_2$) may be called the primary pre-coding vector which is used for transmitting the primary transport block and the pre-coding vector ($w_3$, $w_4$) may be called the secondary pre-coding vector which is used for transmitting the secondary transport block, respectively.

If non-codebook-based pre-coding is used, the pre-coding may be based on transmit beamforming (TxBF), for example, eigen-beamforming based on singular value decomposition (SVD). For pre-coding using eigen-beamforming, the channel matrix H is decomposed using an SVD, (i.e., a pre-coding matrix W is a unitary matrix chosen such that $H=U\Sigma W^H$. The eigen-channel's signal-to-noise ratio (SNR) may be matched by selecting a suitable modulation and coding scheme (MCS) for each stream.

Generally, non-codebook-based pre-coding schemes give the better performance and more freedom to the size of the codebook than codebook-based pre-coding at the cost of feedback signaling overhead in the DL and potential control signaling overhead in the UL.

The special case of the identity matrix $$\left( \begin{bmatrix} 1 & 0 \\ 0 & 1 \end{bmatrix} \right)$$

as a pre-coding codebook is equivalent for certain transmitter structures in single stream operations to a switch antennas transmitter (thereby using switch antenna transmit diversity (SATD)). For example, this is the case for transmitter 2100 and 2500 and also 2300 and 2400 when the same scrambling code is used.

Embodiments for selecting and signaling the pre-coding weights are explained hereafter.

When channel-dependent MIMO schemes are used for HSUPA, channel-dependent information may be sent from a Node-B to a WTRU for pre-coding operation. This information allows the WTRU to adjust the pre-coding weights as a function of the channel propagation conditions. For example, this channel-dependent feedback information may comprise uplink pre-coding control indication (UPCI), channel state information (CSI), or CSI-related information (such as serving grants carried on an E-DCH absolute grant channel (E-AGCH), an E-DCH relative grant channel (E-RGCH) or TPC commands carried on DL DPCCH/F-DPCCH, etc.).

A Node-B may determine a set of pre-coding weights, and indicate it to the WTRU. For example, the set of pre-coding weights may be indicated to the WTRU via a control signal carrying uplink pre-coding control information (UPCI).

The UPCI may be transmitted by the Node-B using an E-DCH HARQ indicator channel (E-HICH) and an E-RGCH. The E-HICH and E-RGCH are both currently using a similar structure. Forty (40) signatures are defined with forty sequences which comprise a pre-defined signature hopping pattern over 3 radio slots. For normal operations, the network assigns one sequence per E-HICH or E-RGCH which are modulated by values +1, −1 or 0 (DTX) by the Node-B. In one implementation of UPCI signaling (which applies to both E-HICH and E-RGCH), the WTRU may receive the UPCI through a variation of this E-HICH/E-RGCH structure.

FIG. 31A shows an example UPCI signaling using an E-HICH. In this embodiment, a WTRU may be configured to listen to a specific E-HICH channelization code from, for example, an E-DCH serving cell. As shown in FIG. 31A, the first radio slot 3102 of the E-HICH subframe carries the conventional E-HICH signal while the subsequent two radio slots 3104 of the E-HICH subframe carry the signaling for the UPCI. Alternatively, the first two radio slots of the E-HICH subframe may carry the E-HICH signal while the last radio slot of the E-HICH subframe carry the signaling for the UPCI. Any other variations are also possible. This embodiment allows the network to save on channelization code space, at the expense of additional transmission power to maintain similar reliability level for the E-HICH. The same approach may also be used for the E-RGCH.

The WTRU may be configured to listen to the UPCI periodically, with a certain configured or pre-defined period. In case where the WTRU is not configured to listen to the UPCI, the conventional three radio slots of the E-HICH subframe may carry the conventional E-HICH information (if present). This allows reducing the amount of downlink signaling for support of UL MIMO operations. The same approach may also be used for the E-RGCH. FIG. 31B illustrates the case where one out of seven E-HICH subframes carries the UPCI field. Even if the Node-B has no ACK/NACK to transmit during those periods, the UPCI field may be transmitted.

In accordance with another embodiment, a new set of orthogonal signature sequences may be used to signal the UPCI via the E-HICH, the E-GRCH, or a different channel. The new signature sequences may or may not be used in combination with the signature hopping pattern of the E-HICH or the E-RGCH. For example, the new sequences may be modulated by +1, −1 by the UPCI information bits.

To carry more than one information bit, multiple sequences may be used. Alternatively, the information bits may modulate a given radio slot in the three slots sequence. For example, the first half of the sub-frame may be modulated by the first information bit of the UPCI, (e.g., a most significant bit (MSB)), while the second half may be modulated by the second information bit of the UPCI, (e.g., a least significant bit (LSB)). Alternatively, in case two UPCI information bits need to be transmitted, two of the three radio slots may be used to transmit the information and the remaining radio slot of the subframe may be DTXed. The radio slots for the UPCI information may not be consecutive, (e.g., the first and third radio slots may be used for the UPCI information and the second radio slot may be DTXed).

The signature sequences may be received by the WTRU at the same time as the conventional sequences over a channelization code that is orthogonal to the one used by the E-HICH/E-RGCH. The WTRU may be configured by the network to monitor one or more such new sequences on one or more E-HICH/E-RGCH. Alternatively, the WTRU may be configured to monitor these sequences for a specific instant of time, (e.g., periodically). This may allow the network to save on transmission power.

In accordance with another embodiment, the WTRU may be configured by the network, in addition to the conventional E-HICH/E-RGCH set, to monitor a dedicated set of E-HICH/E-RGCH conventional sequences that carry the UPCI information.

In accordance with another embodiment, a new feedback channel, (will he referred to as "E-DCH channel stated information channel (E-CSICH)") may be defined to signal the UPCI. In order to have a minimum impact on legacy E-HICH/E-RGCH channels, a new type of dedicated downlink feedback channel E-CSICH may be defined, where a channelization code different from the one used by the E-HICH/E-RGCH is used. The E-CSICH may use an orthogonal signature sequence as in the E-HICH/E-RGCH as a means to allow multiple users sharing the same channelization code and code multiplexing of UPCI bits for a specific WTRU. The signature sequences may comprise a set of orthogonal sequences with a length equal to one slot of the subframe and the sequence may be repeated over multiple slots of the subframe up to the duration of the E-CSICH.

Without loss of generality, in the following E-CSICH examples, two WTRUs in a cell, each having 2-bit UPCI information, are assumed as an example.

Figure 32:
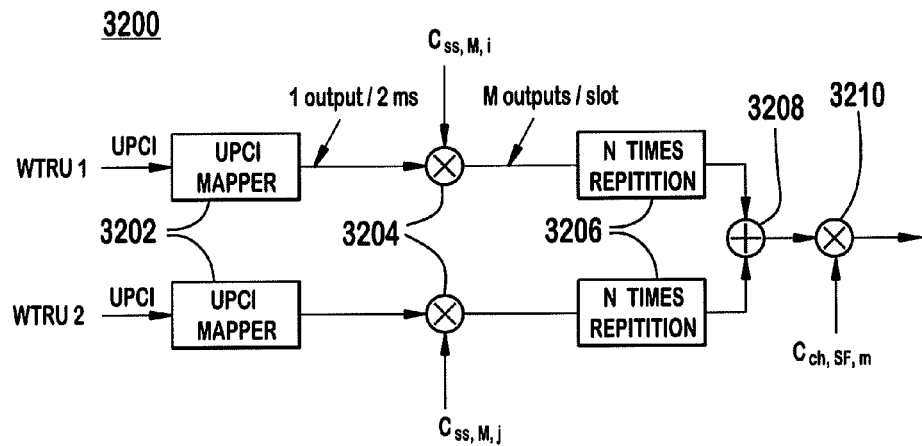
FIG. 32 shows an example transmitter for transmitting uplink precoding control information (UPCI) for two WTRUs via an E-DCH channel state information channel (E-CSICH) in accordance with one embodiment.

FIG. 32 shows an example transmitter 3200 for transmitting UPCI for two WTRUs via an E-CSICH in accordance with one embodiment. The transmitter 3200 includes UPCI mappers 3202, mixers 3204, repeaters 3206, a combiner 3208, and a channelization unit 3210. The two bits of UPCI for each WTRU are mapped to a certain value by the UPCI mapper 3202, respectively. The two UPCI bits may be generated once per TTI, (i.e., one output per 2 ms TTI). An example mapping of the two bit UPCI to a complex value is shown in Table 3. The mapped value of each WTRU is modulated with a different M-bit long orthogonal sequence by the mixer 3204, and then repeated over N times by the repeater 3206, where N may be 1 or higher integer. The resulting data for the two WTRUs are combined by the combiner 3208 and spread with a channelization code by the channelization unit 3210. With this embodiment, different WTRUs may share the same E-CSICH by using different orthogonal sequences.

TABLE 3

| UPCI value (decimal/binary) | Output of UPCI mapper |
| --- | --- |
| 0/00 | 1 + j |
| 1/01 | −1 + j |
| 2/10 | 1 − j |
| 3/11 | −1 − j |

Figure 33:
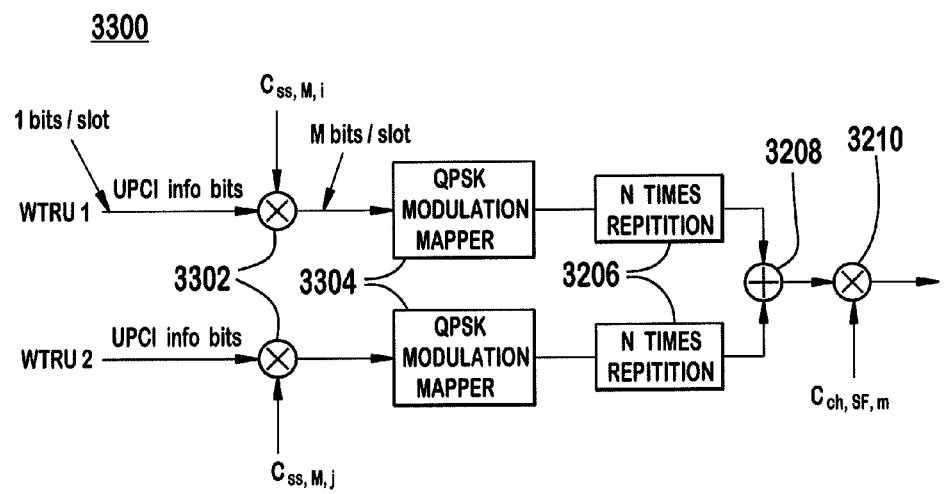
FIG. 33 shows another example transmitter for transmitting UPCI for two WTRUs via an E-CSICH in accordance with another embodiment.

FIG. 33 shows another example transmitter 3300 for transmitting UPCI for two WTRUs via an E-CSICH in accordance with another embodiment. In this embodiment, the UPCI information bits of a specific WTRU is time-multiplexed and E-CSICHs for different WTRUs are code-multiplexed. The transmitter 3300 includes mixers 3302, modulation mappers 3304, repeaters 3306, a combiner 3308, and a channelization unit 3310. The UPCI information bits, (e.g., one bit per slot), for each WTRU are modulated with a different signature sequence by the mixer 3302, respectively, which generates M bits per slot where M is the length of the signature sequence. The binary information bits may be mapped to +1 and −1 before applying a signature sequence. In this example, the two UPCI bits are modulated over two slots. The M bits per slot are modulated, (e.g., QPSK), by the modulation mapper 3304 and may be repeated over N times by the repeater 3306, where N is 1 or higher integer. The resulting two data are combined by the combiner 3308 and spread with a channelization code by the channelization unit 3310.

Figure 34:
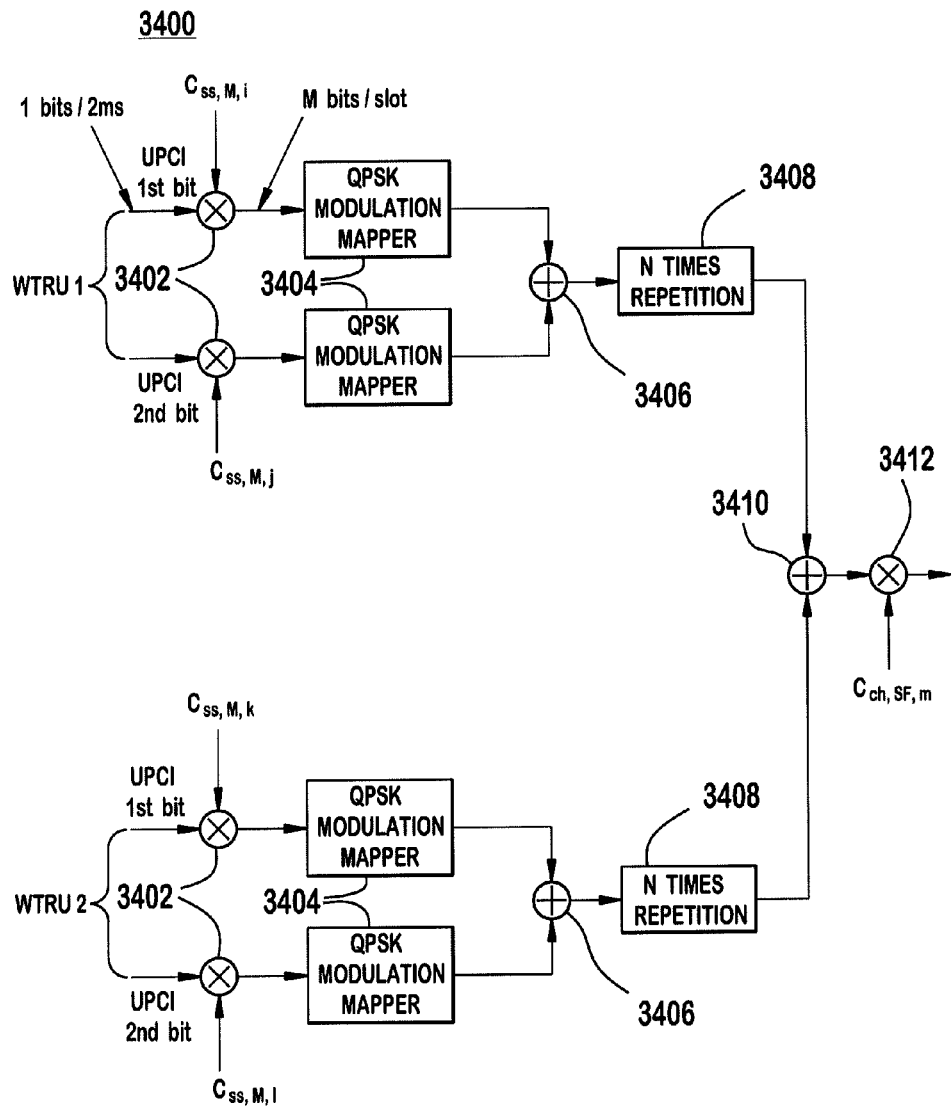
FIG. 34 shows another example transmitter for transmitting UPCI for two WTRUs via an E-CSICH in accordance with another embodiment.

FIG. 34 shows another example transmitter 3400 for transmitting UPCI for two WTRUs via an E-CSICH in accordance with another embodiment. In this embodiment, both UPCI information bits of a specific WTRU and E-CSICHs for different WTRUs are code-multiplexed. The transmitter 3400 includes mixers 3402, modulation mappers 3404, combiners 3406, 3410, repeaters 3408, and a channelization unit 3412. Each of the two UPCI bits for each WTRU is modulated with a different M-bit long orthogonal sequence by the mixer 3402. The binary information bits may be mapped to +1 and −1 before applying a signature sequence. The M bits are modulated by the modulation mapper 3404, (e.g., QPSK). The modulated UPCI signals for the same WTRU are combined by the combiner 3406, and then may be repeated over N times by the repeater 3408, where N may be 1 or higher integer. The resulting data for the two WTRUs are combined by the combiner 3410 and spread with a channelization code by the channelization unit 3412.

For M=40, the legacy 40-bit long signature sequences may be reused for the orthogonal signature sequences. Alternatively, For M=20, the following twenty 20-bit long sequences may be used as the orthogonal signature sequences.

$$C_{ss,20} = \begin{bmatrix} A & A & B & C \\ -B & -C & A & A \\ -A & A & C & -B \\ -C & B & -A & A \end{bmatrix}$$

where $$A = \begin{bmatrix} -1 & 1 & 1 & 1 & 1 \\ 1 & -1 & 1 & 1 & 1 \\ 1 & 1 & -1 & 1 & 1 \\ 1 & 1 & 1 & -1 & 1 \\ 1 & 1 & 1 & 1 & -1 \end{bmatrix};$$

$$B = \begin{bmatrix} 1 & -1 & 1 & 1 & -1 \\ -1 & 1 & -1 & 1 & 1 \\ 1 & -1 & 1 & -1 & 1 \\ 1 & 1 & -1 & 1 & -1 \\ -1 & 1 & 1 & -1 & 1 \end{bmatrix};$$

$$C = \begin{bmatrix} 1 & 1 & -1 & -1 & 1 \\ 1 & 1 & 1 & -1 & -1 \\ -1 & 1 & 1 & 1 & -1 \\ -1 & -1 & 1 & 1 & 1 \\ 1 & -1 & -1 & 1 & 1 \end{bmatrix}.$$

In accordance with another embodiment, the pre-coding weights may be indicated using the E-AGCH. The current 3GPP Release 6 E-AGCH carries up to 6 information bits (5 bits for the absolute grant information and one bit for the absolute grant scope). In accordance with one embodiment, a new E-AGCH structure may be defined to carry the UPCI field in addition to the conventional fields. When a WTRU receives an E-AGCH, the WTRU may use the UPCI weights indicated in the E-AGCH until the next E-AGCH (with potentially different set of UPCI weights to use). This embodiment provides a solution with a small amount of downlink signaling.

In accordance with another embodiment, the absolute grant field of the E-AGCH may be reduced from 5 bits to a smaller value, (e.g., 3 bits), and the free bits may be used for the UPCI field. This allows the network to use similar power level on the E-AGCH and maintain the same level of reliability, at the expense of some granularity on the absolute grant.

In accordance with another embodiment, the pre-coding weights may be indicated using a high speed shared control channel (HS-SCCH). Currently, an HS-SCCH order may be used for activation and deactivation of DTX, discontinues reception (DRX), and HS-SCCH-less operation, for high speed downlink shard channel (HS-DSCH) serving cell change indication, and for the activation and deactivation of secondary serving HS-DSCH cell and secondary uplink frequency. When associated to a high speed physical downlink shared channel (HS-PDSCH), the HS-SCCH carries control information for demodulating the HS-PDSCH.

In accordance with one embodiment, the HS-SCCH order may be used to carry the UPCI by introducing a new HS-SCCH order type. The order bits (3-bits long) of the HS-SCCH may be used to carry the UPCI. For example, any two of the 3 order bits, $x_{ord,1}$, $x_{ord,2}$, $x_{ord,3}$ may indicate 4 possible UPCI values. Alternatively, all 3 order bits may be used to indicate up to 8 possible UPCI values to provide fine granularity of pre-coding weights.

In accordance with another embodiment, as the WTRU needs to monitor up to four HS-SCCHs, the decoded HS-SCCH number may implicitly signal the UPCI. For example, if (the decoded HS-SCCH number) MOD 4=0, 1, 2 and 3 may indicate 4 possible UPCI values, respectively. In the case of multicarrier high speed downlink packet access (MC-HS-DPA) where more than one downlink carrier is activated simultaneously, the HS-SCCH number may refer to the HS-SCCH number carried on the DL carrier associated with the UL carrier which the signaled UPCI will be applied to.

In accordance with another embodiment, the HS-SCCH type 1 and 3 physical channels may be used to signal the UPCI by using and reinterpreting the unused field of the HS-SCCH. For example, 2 more bits may be freed from the channelization code set bits $x_{ccs,1}$, $x_{ccs,2}$, . . . , $x_{ccs,7}$ by only signaling P (15 codes need 4 bits) if O can be signaled via higher layer.

When the WTRU receives an HS-SCCH (either HS-SCCH order or HS-SCCH physical channel), the WTRU may use the UPCI carried in the HS-SCCH until the next HS-SCCH (with potentially different set of UPCI weights to use).

In accordance with another embodiment, the pre-coding weights may be indicated using a fractional dedicated physical channel (F-DPCH). The current 3GPP Release 9 F-DPCH is designed to carry up to 2 bits of TPC command every slot. By assigning a WTRU specific timing offset or slot format, it is possible to multiplex up to 10 WTRUs onto one channelization code for F-DPCH.

In accordance with one embodiment, a second F-DPCH may be transmitted with a different channelization code to signal the UPCI. Given the same time offset of the F-DPCHs, the two F-DPCHs for the same WTRU may be transmitted with the same or different F-DPCH slot format. For the second F-DPCH, the UPCI may be transmitted every slot or every TTI, (e.g., 3 slots). If the UPCI is updated every TTI, the same UPCI may be repeatedly transmitted on 3 consecutive slots, or the updated UPCI may be transmitted on one of the 3 slots and the unused 2 slots may be DTXed or used for signaling the UPCI or TPC commands for other WTRUs.

Alternatively, given the same F-DPCH slot format, two F-DPCHs transmitted to one WTRU may use the same time offset of the F-DPCH for determining the uplink frame time. The two F-DPCHs transmitted to one WTRU may use the different time offset.

Figure 35:
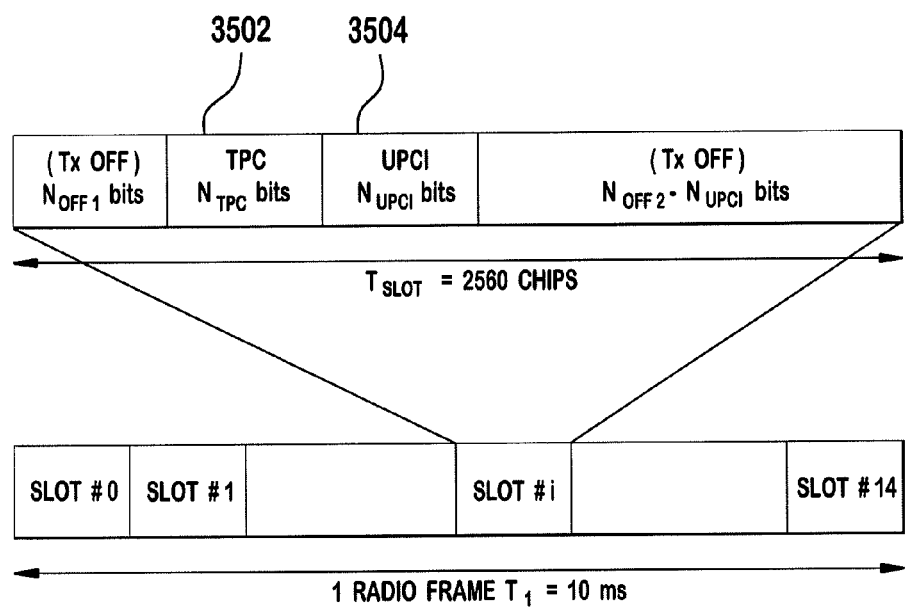
FIG. 35 shows an F-DPCH format in accordance with this embodiment.

Alternatively, a Node-B may transmit one F-DPCH to a WTRU with a different F-DPCH format. FIG. 35 shows an F-DPCH format in accordance with this embodiment. As shown in FIG. 35, both the TPC field 3502 and the UPCI field 3504 are transmitted in one F-DPCH. By appropriately assigning an F-DPCH slot format, it is possible to time multiplex up to 5 WTRUs configured for uplink MIMO or less than 10 WTRUs configured for MIMO or non-MIMO onto one channelization code for F-DPCH.

The appropriate slot format should be configured for different WTRUs to make sure that there is no overlap between a UPCI field of one WTRU and a TPC field of the other WTRU. For example, 5 odd-numbered slot formats may be configured, (i.e., the F-DPCH slot format number=1, 3, 5, 7, 9) to 5 MIMO WTRUs onto one channelization code for the F-DPCH.

Embodiments for the WTRU to select pre-coding weights are disclosed hereafter.

In accordance with one embodiment, a WTRU may select the pre-coding weights based on the received UPCI. The mapping between the pre-coding weights and the UPCI may be pre-defined in the specification. For example, the pre-coding weights may be mapped to 4 possible UPCI values, (i.e., $w_2^{pref}$), as shown in Table 4. In Table 4, the first pre-coding weight $w_1^{pref}$ of the preferred primary pre-coding vector ($w_1^{pref}$, $w_2^{pref}$) is constant, and therefore, the 2-bit UPCI is sufficient to indicate the pre-coding weight $w_2^{pref}$ For antenna 2. It should be understood that Table 2 is provided as an example, and the mapping between pre-coding weights and the UPCI may be set differently. For the single stream case, some implementation issues such as power imbalance may happen for some of the MIMO codebook. In order to mitigate this power imbalance problem, a restriction may be applied on the uplink codebook choice for the single stream case, (i.e., only a subset of preferred precoding vectors $w_2^{pref}$ may be used.

TABLE 4

| $w_2^{pref}$ | UPCI value |
|---|---|
| $\frac{1+j}{2}$ | 0 |
| $\frac{1-j}{2}$ | 1 |
| $\frac{-1+j}{2}$ | 2 |
| $\frac{-1-j}{2}$ | 3 |

The WTRU may select the preferred primary pre-coding vector ($w_1^{pref}$, $w_2^{pref}$) based on the UPCI from Node-B, and then select the secondary pre-coding vector which may be a unique function of the primary pre-coding vector. For example, the secondary pre-coding vector may be selected to be orthogonal to the primary pre-coding vector. Specifically, if a single transport block is scheduled in a TTI, the WTRU may use the pre-coding vector ($w_1^{pref}$, $w_2^{pref}$) for transmission of that transport block. If two transport blocks are scheduled in a TTI, the WTRU may use two orthogonal pre-coding vectors to transmit the two transport blocks.

In accordance with another embodiment, the WTRU may select the pre-coding weights based on the received full channel matrix or eigen-value components of the channel matrix.

In accordance with another embodiment, the WTRU may select the pre-coding weights based on one or more downlink (DL) control signals and previous pre-coding weights, which may be treated as the implicitly closed-loop transmit diversity scheme.

For a certain time duration, if the WTRU receives the DL control information indicating the reliable transmission, the WTRU may continue to use the same pre-coding weights as the previous one. If the WTRU receives the DL control information indicating unreliable transmission, the WTRU may select the pre-coding weights which form the beam indicating the opposite direction of the previous one. If the WTRU receives the DL control information indicating a mix of reliable and unreliable transmissions, the WTRU may select the pre-coding weights which may or may not be the same pre-coding weights as the previous one.

More specifically, given three inputs: the pre-coding vector used for last transmission (PV(n−1)), trigger, and trigger duration (parameter "period"), the WTRU may select the pre-coding vector for the coming transmission (PV(n)) by the generic feedback control function as follows:

$$PV(n)=f(PV(n-1),\text{trigger}(n-\text{period}+1:n)), \quad \text{Equation (11)}$$

where n is the time index of TTI or slot depending on the pre-coding vector update rate, and trigger (n-period+1:n) denotes the trigger that the WTRU has received for the time duration by which the WTRU selects the pre-coding vector PV(n). The parameter "period" may be pre-defined or configured by network.

The trigger may be based on any of the following control signals: a received serving grant on DL E-AGCH/E-RGCH from a Node-B, a TPC command pattern on DL DPCCH or F-DPCCH, the sequence of positive acknowledgement (ACK), negative acknowledgement (NACK) or DTX values received, for example, from the E-DCH serving cell, a normalized remaining power margin (NRPM), WTRU power headroom (instantaneous and/or averaged over longer period of time, for example UE power headroom (UPH), and the like.

The function $f(PV(n-1), \text{trigger}(n-\text{period}+1:n))$ denotes the generic feedback control scheme, by which the WTRU may select the pre-coding vector PV(n) to be one of the following options based on the pre-coding vector PV(n−1) used for the last transmission and received triggers for last "period" time duration.

Option A: the same pre-coding vector may be used continuously as in the last transmission, (i.e., PV(n)=PV(n−1));

Option B: a new pre-coding vector PV(n) may be selected to be opposite to the last pre-coding vector PV(n−1);

Option C: a new pre-coding vector PV(n) may be selected by any of the following: (1) a default value configured by network, (e.g., via radio resource control (RRC) signaling), (2) a default value set in the specifications, a next pre-coding index (modulo the number of elements in the codebook), (3) a previous pre-coding vector index, (4) a random selection by any of the following: uniformly distributed among all pre-coding vectors, uniformly distributed among all other pre-coding vectors, uniformly distributed among all other precoding vectors excluding the orthogonal vector, and no particular distribution specified, (5) the mostly used pre-coding vector in the past N time intervals, where N may be any pre-defined or configured value, (6) the vector orthogonal to the mostly used pre-coding vector in the past N time intervals, (7) other vectors in UL MIMO pre-coding codebook except the pre-coding vector selected by Option A or Option B, etc.

For initialization of the function $f(PV(n-1), \text{trigger}(n-\text{period}+1:n))$, PV(0) may be pre-defined value in the specifications, or configured by network via RRC signaling, or any pre-code vector randomly selected in the UL MIMO codebook. For time duration n=1, PV(n)=PV(0).

Example implementations of the above embodiment for selecting the pre-coding vector using the function $f(PV(n-1), \text{trigger}(n-\text{period}+1:n))$ are given below.

In the first example implementation, the WTRU may select the pre-coding weights based on trigger 1, (i.e., based on the received serving grant (SG) on the E-AGCH and the E-RGCH from the Node-B), by using the following feedback control scheme. If the WTRU receives continuously increased SG for a period, the WTRU may select the PV(n) by Option A. If the WTRU receives continuously decreased SG for a period, the WTRU may select the PV(n) by Option B. If the WTRU receives alternatively increased and decreased SG for a period, the WTRU may select the PV(n) by Option C.

In the second example implementation, the WTRU may select the pre-coding weights based on trigger 2, (i.e., a TPC command pattern on DL DPCCH/F-DPCCH from the Node-B), by using the following feedback control scheme. If the WTRU receives continuously decreased TPC command, (i.e., TPC_cmd=−1), for a period, the WTRU may select the PV(n) by Option A. If the WTRU receives continuously increased TPC commands, (i.e., TPC_cmd=1), for a period, the WTRU may select the PV(n) by Option B. If the WTRU receives alternatively increased and decreased TPC commands, (e.g., TPC_cmd=1,−,1,−1 . . . ), for a period, the WTRU may select the PV(n) by Option C.

In the third example implementation, the WTRU may select the pre-coding weights based on trigger 3, (i.e., the sequence of ACK/NACK/DTX values received, for example, from the E-DCH serving cell), by using the following feedback control scheme. If the WTRU receives continuously ACK for a period, the WTRU may select the PV(n) by Option A. If the WTRU receives continuously NACK for a period, the WTRU may select the PV(n) by Option B. If the WTRU receives ACK and NACK, or ACK, NACK, and DTX, alternately, (or DTX), for a period, the WTRU may select the PV(n) by Option C.

In the fourth example implementation, the WTRU may select the pre-coding weights based on trigger 4, (i.e., a NRPM), by using the following feedback control scheme. If the WTRU determines continuously increased NRPM for a period, the WTRU may select the PV(n) by Option A. If the WTRU determines continuously decreased NRPM for a period, the WTRU may select the PV(n) by Option B. If the WTRU determines alternatively increased and decreased NRPM for a period, the WTRU may select the PV(n) by Option C.

The pre-coding weights for the primary stream in a dual-stream transmission may not be selected to be the same as the weights for the single-stream transmission. This is due to the fact that the weight generation for diversity may be different from the one for spatial-multiplexing. Thus, the WTRU may have to select from two sets of weights depending on the number of streams being transmitted. For example, the Node-B may indicate to the WTRU two sets of preferred weights: one set of preferred weights in case of single-stream transmission and another set of weights for dual-stream transmission. The WTRU, for example, may apply the appropriate weights on a TTI by TTI basis depending on the number of stream. This method may be applied to any weight selection described above and below.

When WTRU is in soft handover, the pre-coder weights may be selected based on the following two embodiments.

In accordance with a first embodiment, a radio network controller (RNC) may emphasize the E-DCH serving cell to determine the preferred pre-coding weights. In this case, all cells in the active set reports their estimated channel matrix (or channel state information (CSI)), to the RNC, and then the antenna weight vector (W) may be determined by the RNC so as to maximize the criteria function P:

$$P = W^H(\alpha(H_1^H H_1) + (1-\alpha)(H_2^H H_2 + \ldots))W, \quad \text{Equation (12)}$$

where $H_k$ is the estimated channel matrix at cell k, cell #1 is the E-DCH serving cell, and coefficient $\alpha$ is the pre-defined parameter that is less than or equal to 1. For example, $\alpha=0.7$ to emphasize the serving cell performance. The UPCI may be feedback to the WTRU to select the pre-coding weights.

In accordance with a second embodiment, the WTRU may use a majority rule to select the pre-coding weights based on multiple received UPCIs from different cells in the active set.

In accordance with a third embodiment, the WTRU may use the pre-coding weights signaled by the serving E-DCH cell, or derived from the serving E-DCH cell signals.

Embodiments for a WTRU to signal the pre-coding weights are disclosed hereafter. After the selected pre-coding weights are applied by the WTRU, the UL pre-coding vector may or may not be signaled to the UTRAN. If the WTRU is not allowed to override the signaled pre-coding weights by the Node-B, it is not necessary for the WTRU to signal it. If the WTRU is allowed to override the signaled pre-coding weights by the Node-B or the WTRU may determine the preferred pre-coding weights, the WTRU needs to signal it to the UTRAN.

The pre-coding weight information may be indicated by using a different second pilot sequence pattern that is sent on an UL DPCCH2. For example, in case where the DL MIMO pre-coding matrix is reused for the UL MIMO, whose weights $w_1$, $w_2$, $w_3$ and $w_4$ of the 2×2 pre-coding matrix are given by Equations (12)-(14), 4 different pilot patterns are needed to map to 4 possible selection of $w_2$. Alternatively, the pre-coding weight information may be carried on a non-pilot field of the second UL DPCCH, (i.e., DPCCH2). Alternatively, the pre-coding weight information may be carried on the second UL E-DPCCH, (i.e., E-DPCCH2), by replacing the happy bit. Since the happy bit field may carry 1 bit of information, this approach may in practice be applicable to antenna switching, as an example. Additional signaling or codeword restriction may be necessary if additional information needs to be transmitted.

Embodiments for a Node-B to transmit channel state information are explained hereafter.

Instead of the codebook index, a Node-B may feed back to the WTRU quantized phase and amplitude/power offsets between two transmit antennas of the WTRU. In addition, for spatial multiplexing, the rank information needs to be fed back to the WTRU. The embodiments for sending the UPCI disclosed above and/or their combinations may be reused or extended to signal the channel station information and/or the rank information. For example, the E-CSICH may be used to send the index of quantized phase offset indication (PHI), the index of power offset indication (POI), and rank indication (RI).

Example transmitter structures of using E-CSICH to signal the channel state information UPCI, PHI, POI, and RI for two MIMO WTRUs are disclosed below. Without loss of generality, 2-bit UPCI, 2-bit PHI, 2-bit POI and 1-bit RI are assumed.

Figure 36:
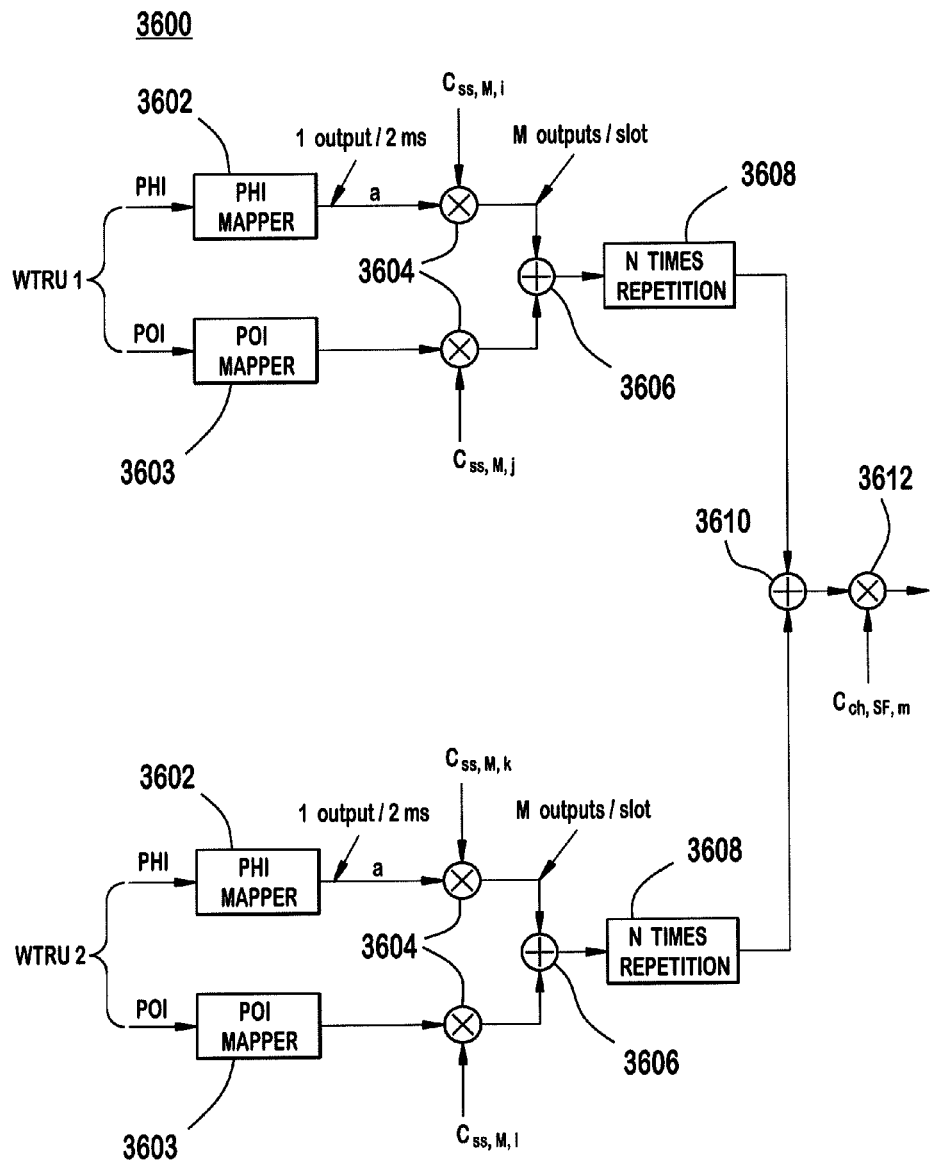
FIGS. 36 and 37 show signaling of PHI and POI using the transmitter structure shown in FIGS. 32 and 34, respectively.
Figure 37:
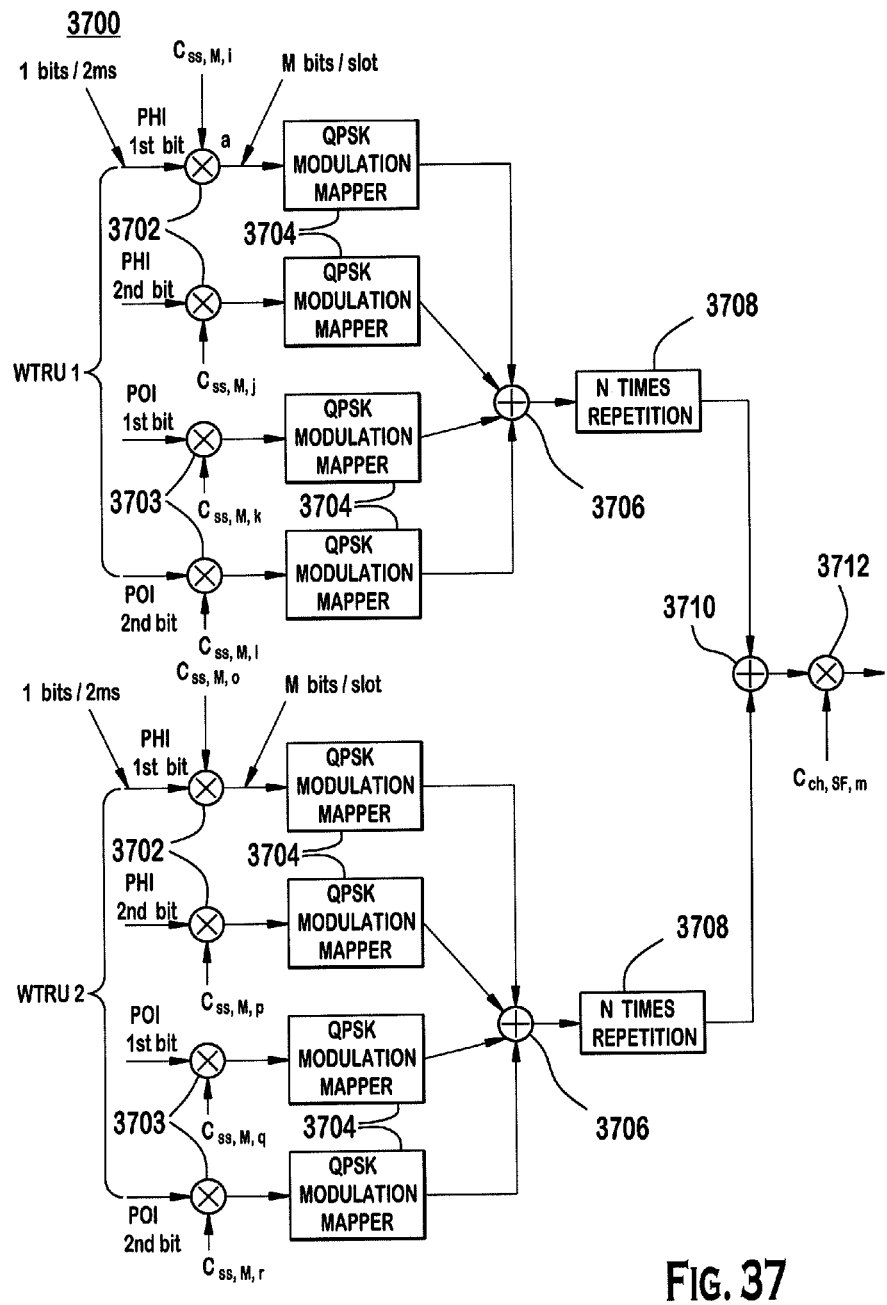

FIGS. 36 and 37 show signaling of PHI and POI using the transmitter structure shown in FIGS. 32 and 34, respectively.

In FIG. 36, the transmitter 3600 includes PHI mappers 3602, POI mappers 3603, mixers 3604, a combiner 3606, 3610, repeaters 3608, and a channelization unit 3610. The PHI bits and POI bits for each WTRU are mapped to a certain value by the PHI mapper 3602 and POI mapper 3603, respectively. The PHI and POI mappers 3602, 3603 may use the UPCI value mapping given in Table 3. The mapped value of each WTRU is modulated with a different M-bit long orthogonal sequence by the mixer 3604, and then combined by the combiner 3606, and then repeated over N times by the repeater 3608, where N may be 1 or higher integer. The resulting data for the two WTRUs are combined by the combiner 3610 and spread with a channelization code by the channelization unit 3612.

The transmitter 3700 in FIG. 37 includes mixers 3702, 3703, modulation mappers 3704, combiners 3706, 3710, repeaters 3708, and a channelization unit 3712. The PHI and POI bits for each WTRU are modulated with a different M-bit long orthogonal sequence by the mixer 3702, 3703, respectively. The binary information bits may be mapped to +1 and −1 before applying a signature sequence. The M bits are modulated by the modulation mapper 3704, (e.g., QPSK). The modulated UPCI signals for the same WTRU are combined by the combiner 3706, and then may be repeated over N times by the repeater 3708, where N may be 1 or higher integer. The resulting data for the two WTRUs are combined by the combiner 3710 and spread with a channelization code by the channelization unit 3712.

Figure 38:
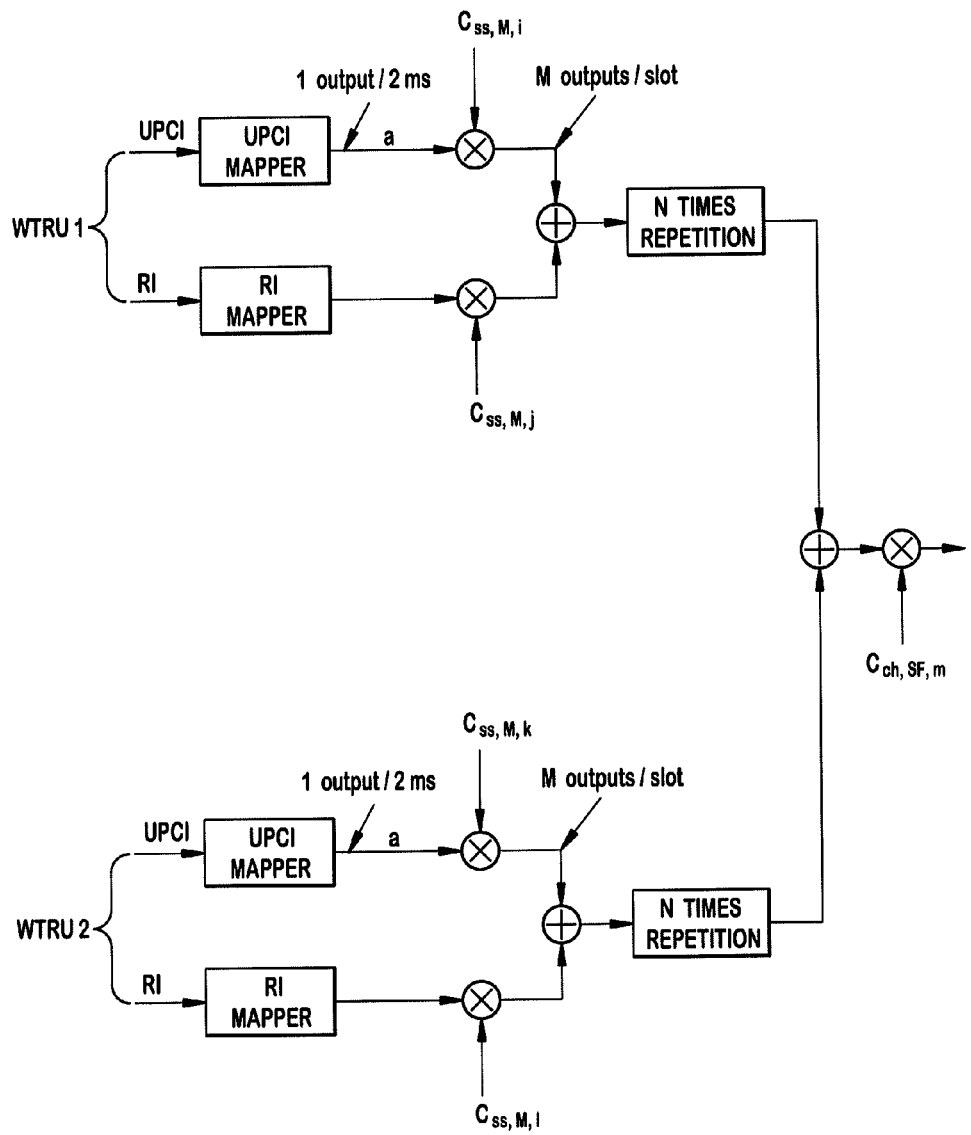
FIGS. 38 and 39 show signaling of UPCI and rank indication (RI) using the transmitter structure shown in FIGS. 32 and 34, respectively.
Figure 39:
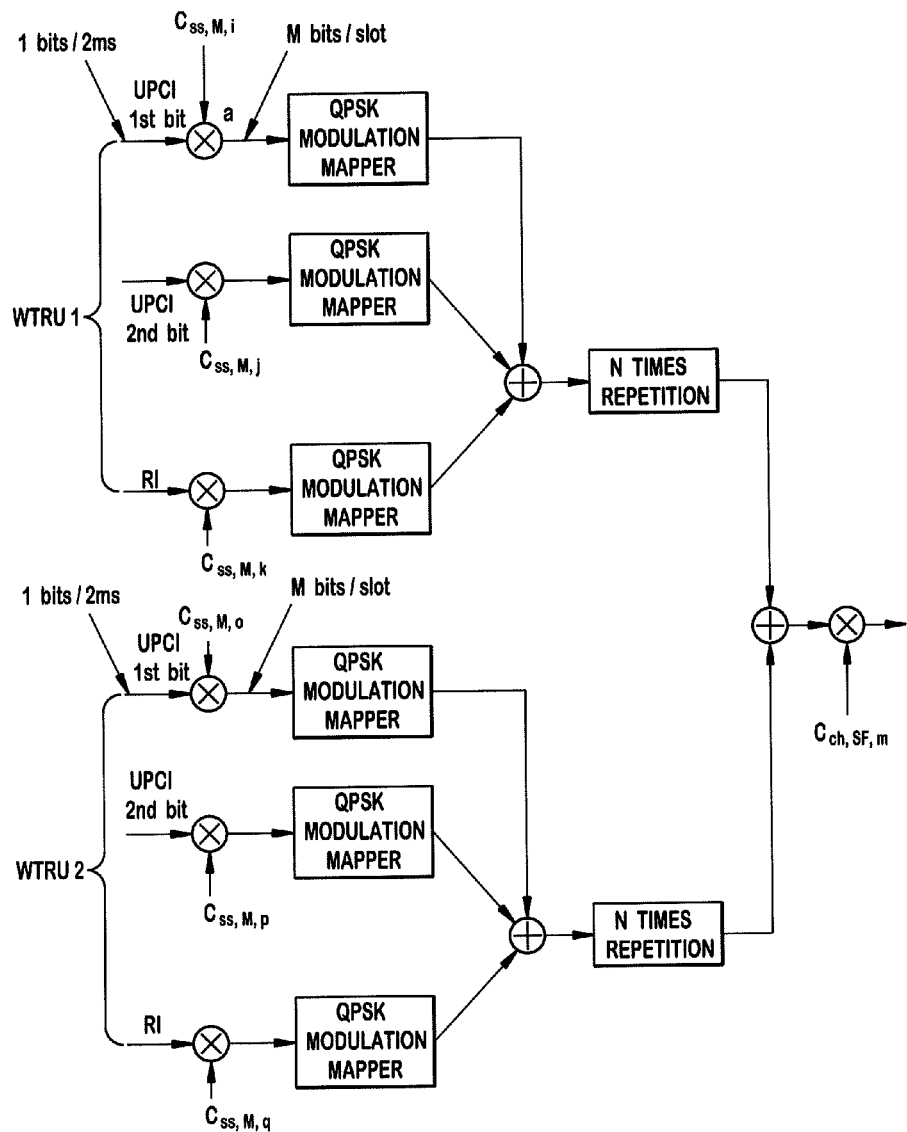

FIGS. 38 and 39 show signaling of UPCI and RI using the transmitter structure shown in FIGS. 32 and 34, respectively. The transmitter structure of FIGS. 38 and 39 are substantially similar to the transmitter structure in FIGS. 36 and 37, respectively. Therefore, the details of the transmitter structure in FIGS. 38 and 39 will not be explained for simplicity. Example RI mapping is given in Table 5.

TABLE 5

| Rank | RI value (decimal/binary) | Output of RI mapper |
|---|---|---|
| 1 | 1/0 | 1 + j |
| 2 | 2/1 | −1 + j |

Figure 40:
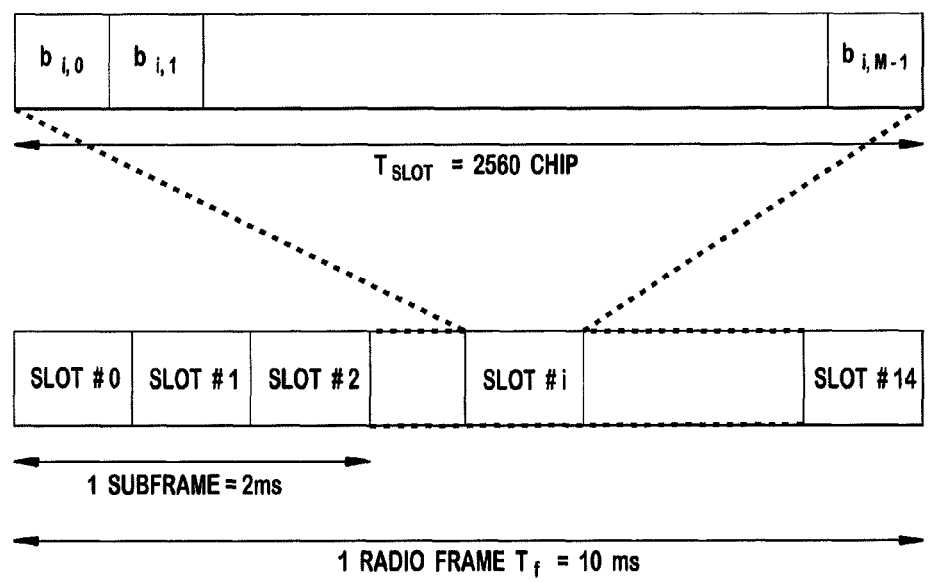
FIG. 40 shows an example frame format for the E-CSICH.

FIG. 40 shows an example frame format for the E-CSICH. For 2 ms TTI, the duration of the E-CSICH may be 2 ms, and for 10 ms TTI, the duration of E-CSICH may be 10 ms.

The sequence $b_{i,0}$, $b_{i,1}$, ..., $b_{i,M-1}$ transmitted in slot i in FIG. 40 is given by $b_{i,j} = aC_{ss,M,m(i),j}$, where 'a' is the output of the RI/UPCI/POI/PCI mapper for the transmitter structure in FIG. 32, and $a = +1/-1$ for the transmitter structure in FIGS. 33 and 34. The index m(i) in slot i may take value from 0 to M−1.

The E-AGCH may be used to carry the channel state information. For example, for MIMO-capable WTRUs, the E-AGCH may use a spreading factor of 128 so that CSI may be multiplexed with absolute grant value and absolute grant scope.

Upon reception of the CSI at the receiver, the WTRU applies the received values for transmission. The RI indicates how many streams the WTRU may transmit in the next time interval, (e.g., until reception of a new RI). If the RI indicates dual-stream transmission, the WTRU may transmit up to two transport blocks simultaneously. The RI may be indicated to the MAC layer for E-TFC selection which provides up to two transport blocks according to the available grant, power and data. Alternatively, when the RI indicates dual-stream transmission, the WTRU may multiplex coded bits of a single transport block onto two physical streams.

The PHI and POI indicate the phase offset index and the power offset index of the second antenna with respect to the first antenna. The WTRU then determines the phase offset value ($\phi$) and the power offset value ($\gamma$).

The WTRU may apply a unity weight to the first antenna ($w_1=1$) and calculates the weight for the second antenna ($w_2$) using one of the following equations, depending on the actual meaning of the power offset.

$$w_2 = \sqrt{\gamma} e^{i\phi} \text{ or} \quad\quad\quad\quad \text{Equation (13)}$$

$$w_2 = e^{\sqrt{\gamma}+i\phi}. \quad\quad\quad\quad \text{Equation (14)}$$

Alternatively, the WTRU may calculate the weight for the first and second antennas to have a unit transmission gain across the two antennas. This may be achieved, for instance by normalizing $w_1$ and $w_2$ as calculated above using equations (19) and (20) (using, without loss of generality, the first expression for $w_2$ above):

$$w_1 = \frac{1}{\sqrt{1+\gamma}}, \text{ and} \quad\quad\quad\quad \text{Equation (15)}$$

$$w_2 = \frac{\sqrt{\gamma}}{\sqrt{1+\gamma}} e^{i\varphi}. \quad\quad\quad\quad \text{Equation (16)}$$

The secondary pre-coding vector may then be calculated as the orthogonal vector to the calculated primary pre-coding weight as follows.

$$w_3 = \frac{-\sqrt{\gamma}}{\sqrt{1+\gamma}}, \text{ and} \quad\quad\quad\quad \text{Equation (17)}$$

$$w_2 = \frac{1}{\sqrt{1+\gamma}} e^{i\varphi}. \quad\quad\quad\quad \text{Equation (18)}$$

The whole unitary precoding matrix may be expressed as:

$$W = \begin{bmatrix} w_1 & w_3 \\ w_2 & w_4 \end{bmatrix}. \quad\quad\quad\quad \text{Equation (19)}$$

This approach allows maintaining a unitary precoding matrix while having a non-zero power offset between the two antenna elements thus potentially providing better performance.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented in a wireless transmit/receive unit (WTRU) for uplink transmission using multiple antennas, the method comprising:
   processing at least one enhanced dedicated channel (E-DCH) dedicated physical data channel (E-DPDCH), a first dedicated physical control channel (DPCCH), and a second DPCCH to generate a first data stream and a second data stream, wherein the first data stream includes the first DPCCH and the second data stream includes the second DPCCH;
   applying pre-coding weights to the generated first data stream and the second data stream; and
   transmitting the first data stream and the second data stream via a plurality of antennas, wherein the first stream and the second stream carry a same pilot sequence and the first stream and the second stream are transmitted using different channelization codes.

2. The method of claim 1 wherein the first data stream includes at least one of an E-DCH dedicated physical control channel (E-DPCCH), a high speed dedicated physical control channel (HS-DPCCH), or a dedicated physical data channel (DPDCH).

3. The method of claim 1 wherein a pre-coding weight matrix of the pre-coding weights is diagonal.

4. A wireless transmit/receive unit (WTRU) for uplink transmission using multiple antennas, the WTRU comprising:
   a physical layer processing block configured to process at least one enhanced dedicated channel (E-DCH) dedicated physical data channel (E-DPDCH), a first dedicated physical control channel (DPCCH), and a second DPCCH to generate a first data stream and a second data stream, wherein the first data stream includes the first DPCCH and the second data stream includes the second DPCCH;
   a pre-coding block configured to apply pre-coding weights to the generated first data stream and the second data stream; and
   a plurality of antennas for transmitting the first data stream and the second data stream, wherein the first stream and the second stream carry a same pilot sequence and the first stream and the second stream are transmitted using different channelization codes.

5. The WTRU of claim 4 wherein the first data stream includes at least one of an E-DCH dedicated physical control channel (E-DPCCH), a high speed dedicated physical control channel (HS-DPCCH), or a dedicated physical data channel (DPDCH).

6. The WTRU of claim 4 wherein a pre-coding weight matrix of the pre-coding weights is diagonal.

* * * * *